US012669924B2

(12) United States Patent
George

(10) Patent No.: US 12,669,924 B2
(45) Date of Patent: Jun. 30, 2026

(54) INTERACTIVE PATENT VISUALIZATION SYSTEMS AND METHODS

(71) Applicant: Magic Number, Inc., Durham, NC (US)

(72) Inventor: JiNan Glasgow George, Durham, NC (US)

(73) Assignee: Magic Number, Inc., Durham, NC (US)

( * ) Notice: Subject to any disclaimer, the term of this patent is extended or adjusted under 35 U.S.C. 154(b) by 0 days.

(21) Appl. No.: 19/091,082

(22) Filed: Mar. 26, 2025

(65) Prior Publication Data

US 2025/0251850 A1     Aug. 7, 2025

Related U.S. Application Data

(63) Continuation-in-part of application No. 18/750,531, filed on Jun. 21, 2024, which is a continuation-in-part of application No. 18/650,963, filed on Apr. 30, 2024, which is a continuation of application No. 17/226,791, filed on Apr. 9, 2021, now Pat. No. 11,977,722, which is a continuation-in-part of
(Continued)

(51) Int. Cl.
| | |
|---|---|
| *G06F 16/00* | (2019.01) |
| *G06F 3/0481* | (2022.01) |
| *G06F 3/04842* | (2022.01) |
| *G06F 16/93* | (2019.01) |
| *G06N 5/04* | (2023.01) |
| *G06Q 50/18* | (2012.01) |
| *H04L 41/22* | (2022.01) |

(52) U.S. Cl.
CPC ........ *G06F 3/04842* (2013.01); *G06F 3/0481* (2013.01); *G06F 16/93* (2019.01); *G06N 5/04* (2013.01); *G06Q 50/184* (2013.01); *H04L 41/22* (2013.01); *G06F 2216/11* (2013.01)

(58) Field of Classification Search
CPC .... G06F 3/04842; G06F 3/0481; G06F 16/93; G06F 2216/11; G06F 16/26; G06F 16/9038; G06F 16/904; G06F 16/906; G06N 5/04; G06N 20/00; G06Q 50/184; G06Q 30/02011; G06Q 30/0202; H04L 41/22
See application file for complete search history.

(56) References Cited

U.S. PATENT DOCUMENTS

| | | | |
|---|---|---|---|
| 5,680,475 A | 10/1997 | Zwierski et al. | |
| 5,774,833 A | 6/1998 | Newman | |

(Continued)

OTHER PUBLICATIONS

Yaakov Yaari "Texplore" Feb. 28, 2003.

*Primary Examiner* — Paul Kim
(74) *Attorney, Agent, or Firm* — Neo IP

(57) ABSTRACT

An interactive, dynamic GUI for visualization of patent documents including content-dense graphics illustrating the number, content size, type of a multiplicity of patent documents (issued or granted patent versus published pending application), distributed over time, with comparison to similar patent documents, market events, and expert insights based upon content of specification or detailed description and claims, all within a predetermined technology sector having at least one sub-sector or category within the technology sector.

20 Claims, 55 Drawing Sheets
(50 of 55 Drawing Sheet(s) Filed in Color)

Related U.S. Application Data application No. 16/242,220, filed on Jan. 8, 2019, now Pat. No. 11,100,151.

(60) Provisional application No. 62/614,737, filed on Jan. 8, 2018.

(56) References Cited

U.S. PATENT DOCUMENTS

| | | | |
|---|---|---|---|
| 6,049,811 A | 4/2000 | Petruzzi et al. | |
| 6,078,327 A | 6/2000 | Liman et al. | |
| 6,271,846 B1 | 8/2001 | Martinez et al. | |
| 6,298,327 B1 | 10/2001 | Hunter et al. | |
| 6,339,767 B1 | 1/2002 | Rivette et al. | |
| 6,449,026 B1 | 9/2002 | Min et al. | |
| 6,499,026 B1 | 12/2002 | Rivette et al. | |
| 6,738,761 B1 | 5/2004 | Oura | |
| 7,171,619 B1 | 1/2007 | Bianco | |
| 7,290,223 B2 | 10/2007 | Decombe | |
| 7,353,464 B1 | 4/2008 | Kundu et al. | |
| 7,644,360 B2 | 1/2010 | Beretich, Jr. et al. | |
| 7,716,226 B2 | 5/2010 | Barney | |
| 7,739,133 B1 | 6/2010 | Hail et al. | |
| 7,770,107 B2 | 8/2010 | Jiang et al. | |
| 7,797,336 B2 | 9/2010 | Blair et al. | |
| 7,949,728 B2 | 5/2011 | Rivette et al. | |
| 8,117,192 B1 | 2/2012 | Pogodin | |
| 8,131,701 B2 | 3/2012 | Barney | |
| 8,145,640 B2 | 3/2012 | Williams | |
| 8,196,030 B1 | 6/2012 | Wang et al. | |
| 8,335,998 B1 | 12/2012 | Rubinger et al. | |
| 8,504,560 B2 | 8/2013 | Barney | |
| 8,694,504 B2 | 4/2014 | Beretich, Jr. et al. | |
| 8,818,996 B2 | 8/2014 | Barney | |
| 9,075,849 B2 | 7/2015 | Barney | |
| 9,104,648 B2 | 8/2015 | Glasgow | |
| 9,336,304 B2 | 5/2016 | Speier | |
| 9,430,756 B2 | 8/2016 | Glasgow | |
| 9,483,551 B2 | 11/2016 | Beretich, Jr. et al. | |
| 9,542,449 B2 | 1/2017 | Guiliano et al. | |
| 9,922,383 B2 | 3/2018 | George | |
| 9,959,582 B2 | 5/2018 | Sukman et al. | |
| 10,095,778 B2 | 10/2018 | Barney | |
| 10,133,791 B1 | 11/2018 | Chan | |
| 10,157,352 B1 | 12/2018 | Chan et al. | |
| 10,866,996 B2 | 12/2020 | Pogrebezky et al. | |
| 10,891,701 B2 | 1/2021 | Jessen et al. | |
| 10,997,679 B2 | 5/2021 | Shirasaka et al. | |
| 11,023,721 B2 | 6/2021 | Mikami et al. | |
| 11,275,935 B2 | 3/2022 | Schuster | |
| 11,321,631 B1 | 5/2022 | Chan et al. | |
| 11,397,780 B2 | 7/2022 | Pogrebezky et al. | |
| 2001/0049707 A1 | 12/2001 | Tran | |
| 2002/0000998 A1 | 1/2002 | Scott et al. | |
| 2002/0007373 A1 | 1/2002 | Blair et al. | |
| 2002/0022974 A1 | 2/2002 | Lindh | |
| 2002/0103809 A1 | 8/2002 | Starzl et al. | |
| 2002/0107896 A1 | 8/2002 | Ronai | |
| 2002/0184254 A1 | 12/2002 | Williams et al. | |
| 2002/0188608 A1 | 12/2002 | Nelson et al. | |
| 2003/0014415 A1 | 1/2003 | Weiss et al. | |
| 2003/0033295 A1 | 2/2003 | Adler et al. | |
| 2003/0061243 A1 | 3/2003 | Kim et al. | |
| 2003/0065637 A1 | 4/2003 | Glasgow | |
| 2003/0093755 A1 | 5/2003 | O'Carroll | |
| 2003/0154204 A1 | 8/2003 | Chen-Wright et al. | |
| 2004/0015481 A1 | 1/2004 | Zinda | |
| 2004/0073850 A1 | 4/2004 | Opaterny | |
| 2004/0078192 A1 | 4/2004 | Poltorak | |
| 2004/0215612 A1 | 10/2004 | Brody | |
| 2004/0243387 A1 | 12/2004 | Brabander | |
| 2005/0071349 A1 | 3/2005 | Jordan et al. | |
| 2005/0192968 A1 | 9/2005 | Beretich et al. | |
| 2005/0234685 A1 | 10/2005 | Tanigawa | |
| 2006/0224982 A1 | 10/2006 | Albrecht et al. | |
| 2007/0022110 A1 | 1/2007 | Suda et al. | |
| 2007/0233692 A1 | 10/2007 | Lisa et al. | |
| 2007/0294664 A1 | 12/2007 | Joshi | |
| 2010/0190143 A1 | 7/2010 | Gal et al. | |
| 2012/0278244 A1 | 11/2012 | Lee et al. | |
| 2012/0290487 A1 | 11/2012 | Lee et al. | |
| 2012/0290571 A1 | 11/2012 | Lee et al. | |
| 2012/0317041 A1* | 12/2012 | Shaffer | G06Q 90/00 |
| | | | 705/310 |
| 2013/0339337 A1 | 12/2013 | Alkhateeb et al. | |
| 2014/0156567 A1 | 6/2014 | Scholtes | |
| 2014/0317051 A1* | 10/2014 | Isaacs | G06F 16/287 |
| | | | 707/798 |
| 2014/0379590 A1 | 12/2014 | Germeraad | |
| 2015/0089366 A1* | 3/2015 | Beckett | G06F 3/0484 |
| | | | 715/716 |
| 2015/0187033 A1 | 7/2015 | Sukman et al. | |
| 2015/0193895 A1* | 7/2015 | Joao | G06Q 50/184 |
| | | | 705/310 |
| 2016/0148327 A1 | 5/2016 | Buchholz | |
| 2016/0350886 A1* | 12/2016 | Jessen | G06Q 50/184 |
| 2017/0046398 A1 | 2/2017 | Beretich, Jr. et al. | |
| 2017/0220938 A1 | 8/2017 | Sainani et al. | |
| 2018/0018564 A1 | 1/2018 | Erenrich et al. | |
| 2018/0075384 A1 | 3/2018 | Luo | |
| 2018/0218451 A1 | 8/2018 | Bebber | |
| 2019/0179839 A1 | 6/2019 | Elias | |
| 2019/0213208 A1 | 7/2019 | Brockman et al. | |
| 2019/0244313 A1 | 8/2019 | Guiliano et al. | |
| 2019/0279073 A1 | 9/2019 | Adibowo | |
| 2020/0089740 A1 | 3/2020 | Tsai | |
| 2021/0082070 A1 | 3/2021 | Shanahan et al. | |
| 2021/0216578 A1 | 7/2021 | Brockman et al. | |
| 2021/0240334 A1 | 8/2021 | Brockman et al. | |
| 2021/0358064 A1 | 11/2021 | Kudo | |
| 2022/0036487 A1 | 2/2022 | Guiliano et al. | |
| 2022/0343444 A1 | 10/2022 | Chan et al. | |
| 2022/0374918 A1 | 11/2022 | Moussa et al. | |
| 2022/0398273 A1 | 12/2022 | Dearing et al. | |
| 2023/0086106 A1 | 3/2023 | Andrews | |
| 2023/0086930 A1 | 3/2023 | Lee et al. | |
| 2023/0087206 A1 | 3/2023 | Lee et al. | |
| 2023/0089425 A1 | 3/2023 | Lee et al. | |
| 2023/0090090 A1 | 3/2023 | Dutta et al. | |
| 2024/0020642 A1 | 1/2024 | Akamine et al. | |
| 2024/0361890 A1 | 10/2024 | George | |
| 2025/0259255 A1* | 8/2025 | Penrose | G06F 16/7844 |

* cited by examiner

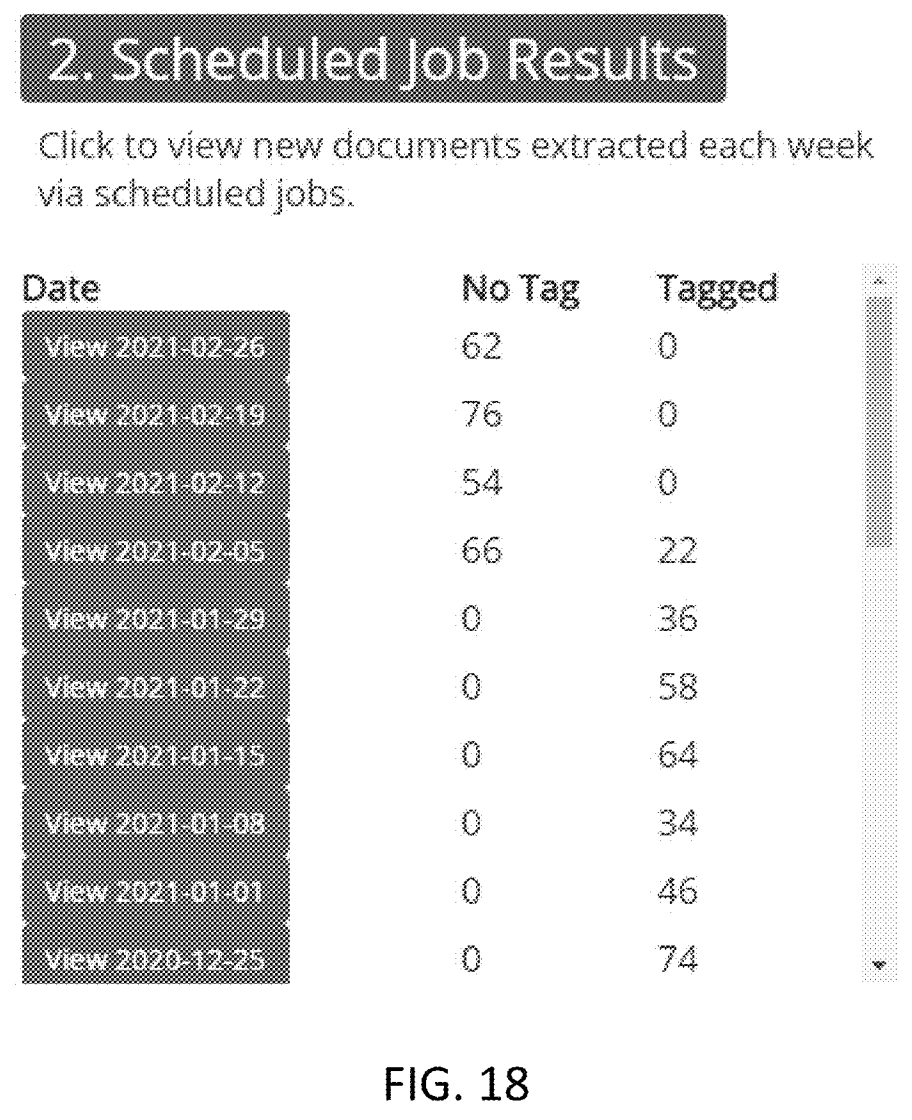

2. Scheduled Job Results

Click to view new documents extracted each week via scheduled jobs.

| Date | No Tag | Tagged |
|---|---|---|
| View 2021-02-26 | 62 | 0 |
| View 2021-02-19 | 76 | 0 |
| View 2021-02-12 | 54 | 0 |
| View 2021-02-05 | 66 | 22 |
| View 2021-01-29 | 0 | 36 |
| View 2021-01-22 | 0 | 58 |
| View 2021-01-15 | 0 | 64 |
| View 2021-01-08 | 0 | 34 |
| View 2021-01-01 | 0 | 46 |
| View 2020-12-25 | 0 | 74 |

FIG. 18

Figure 19:
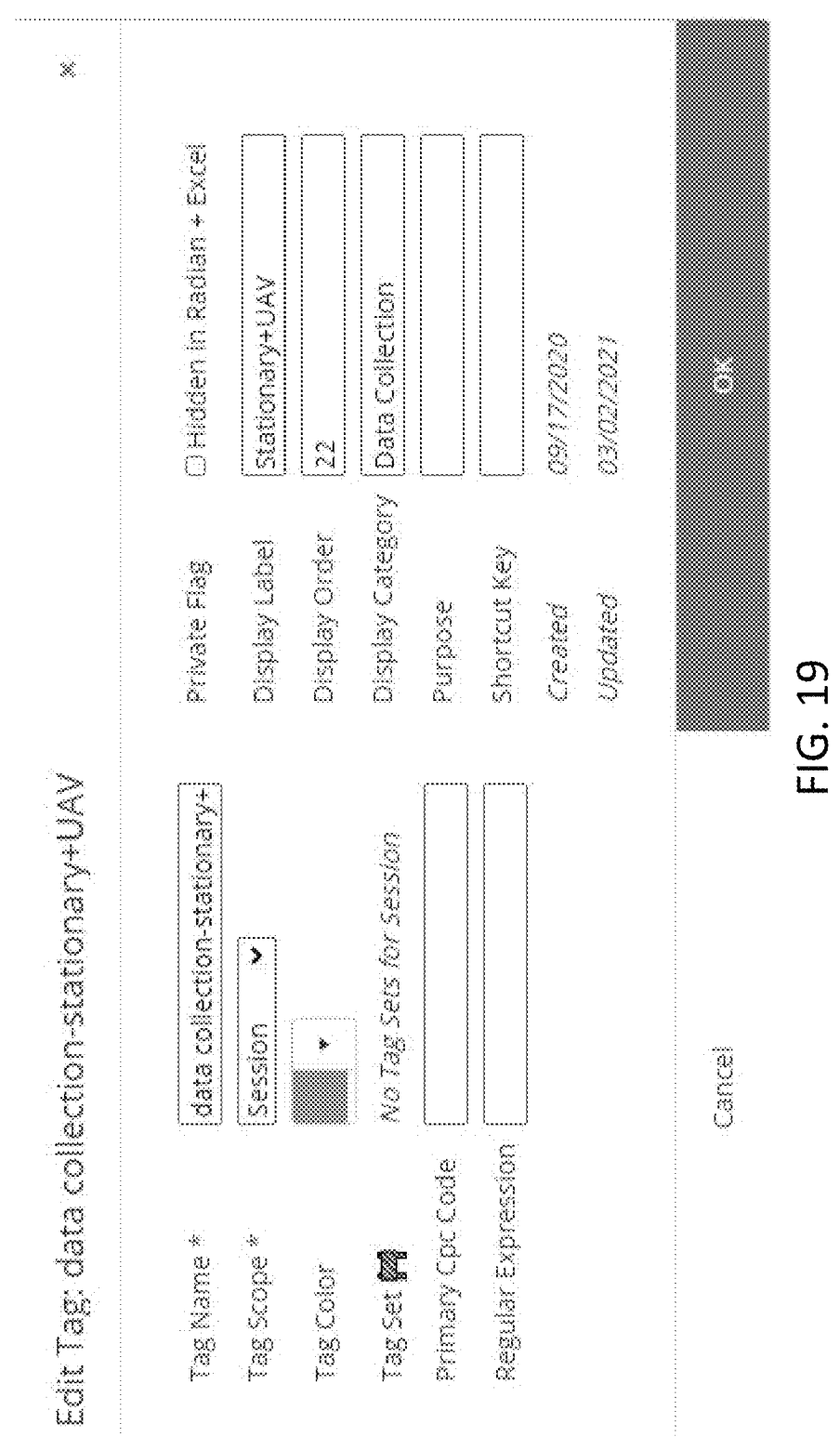

Edit Tag: data collection-stationary+UAV

| Field | Value |
|---|---|
| Tag Name * | data collection-stationary+ |
| Tag Scope * | Session ▾ |
| Tag Color | ▾ |
| Tag Set | |
| Primary Cpc Code | No Tag Sets for Session |
| Regular Expression | |

| Field | Value |
|---|---|
| Private Flag | ☐ Hidden in Radian + Excel |
| Display Label | Stationary+UAV |
| Display Order | 22 |
| Display Category | Data Collection |
| Purpose | |
| Shortcut Key | |
| Created | 09/17/2020 |
| Updated | 03/02/2021 |

OK

Cancel

Core Assignee Detail

Stem

TOYOTA MOTOR

Displayed Name · Google Search · Google News

Toyota Motor Corporation

Corporate Logo · Google Images

Choose File | No file chosen    Upload Image

Core Assignee Session Spotlights

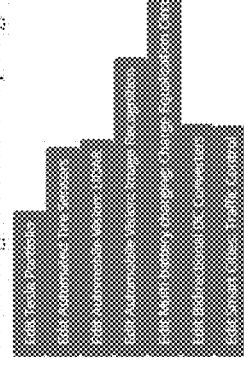

Smart Cities: Traffic Control

Corporate Market Profile

Corporate Website URL: http://www.toyota-global.com/

LinkedIn URL: https://www.linkedin.com/company/toyota/

Year Founded: 1937

Highlight Color for Radian

User Selected
eb0009

Corporate Postal Address

Addr 1: 1 Toyota-cho

Addr 2:

City: Toyota City apply

Figure 26:
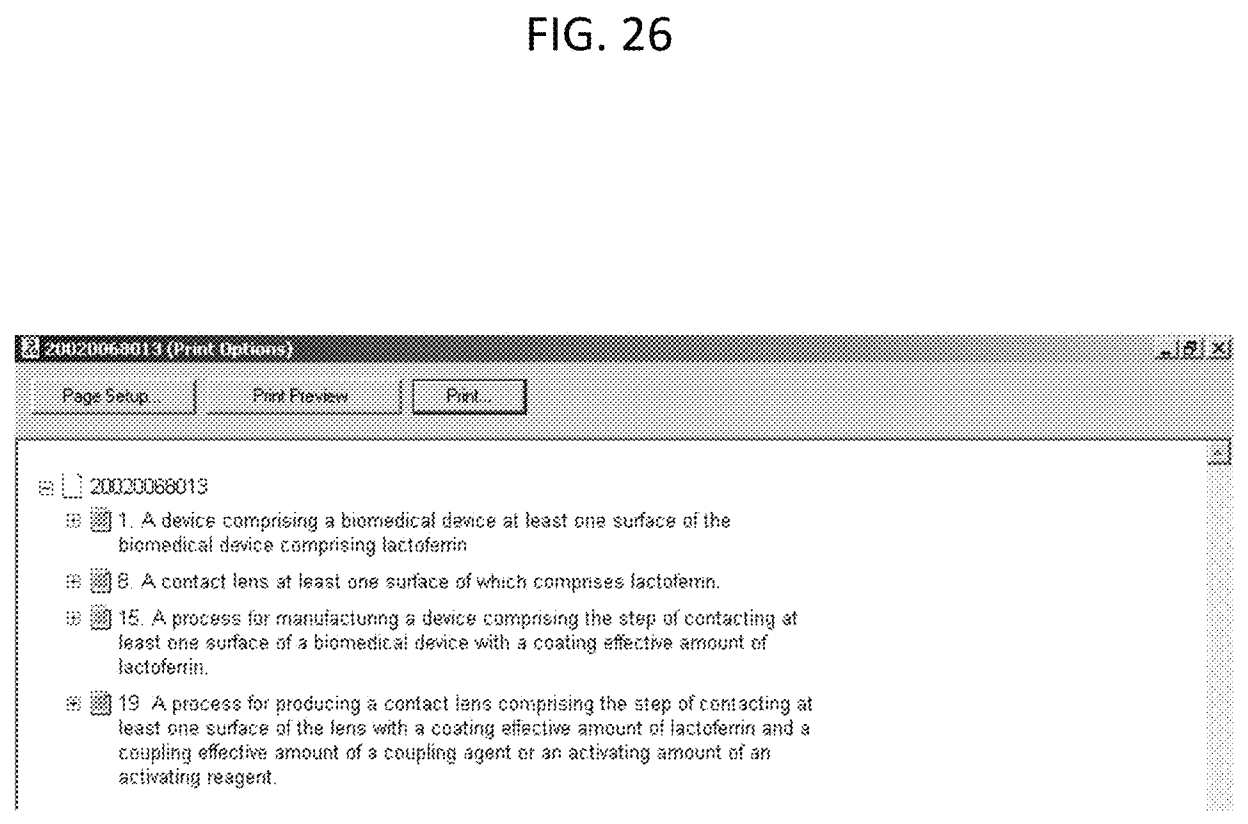

Documents1 (Print Options)

Page Setup | Print Preview | Print

2003036013

1. A device comprising a biomedical device at least one surface of the biomedical device comprising lactoferrin 8. A contact lens at least one surface of which comprises lactoferrin.

15. A process for manufacturing a device comprising the step of contacting at least one surface of a biomedical device with a coating effective amount of lactoferrin.

19. A process for producing a contact lens comprising the step of contacting at least one surface of the lens with a coating effective amount of lactoferrin and a coupling effective amount of a coupling agent or an activating amount of an activating reagent.

Figure 30:
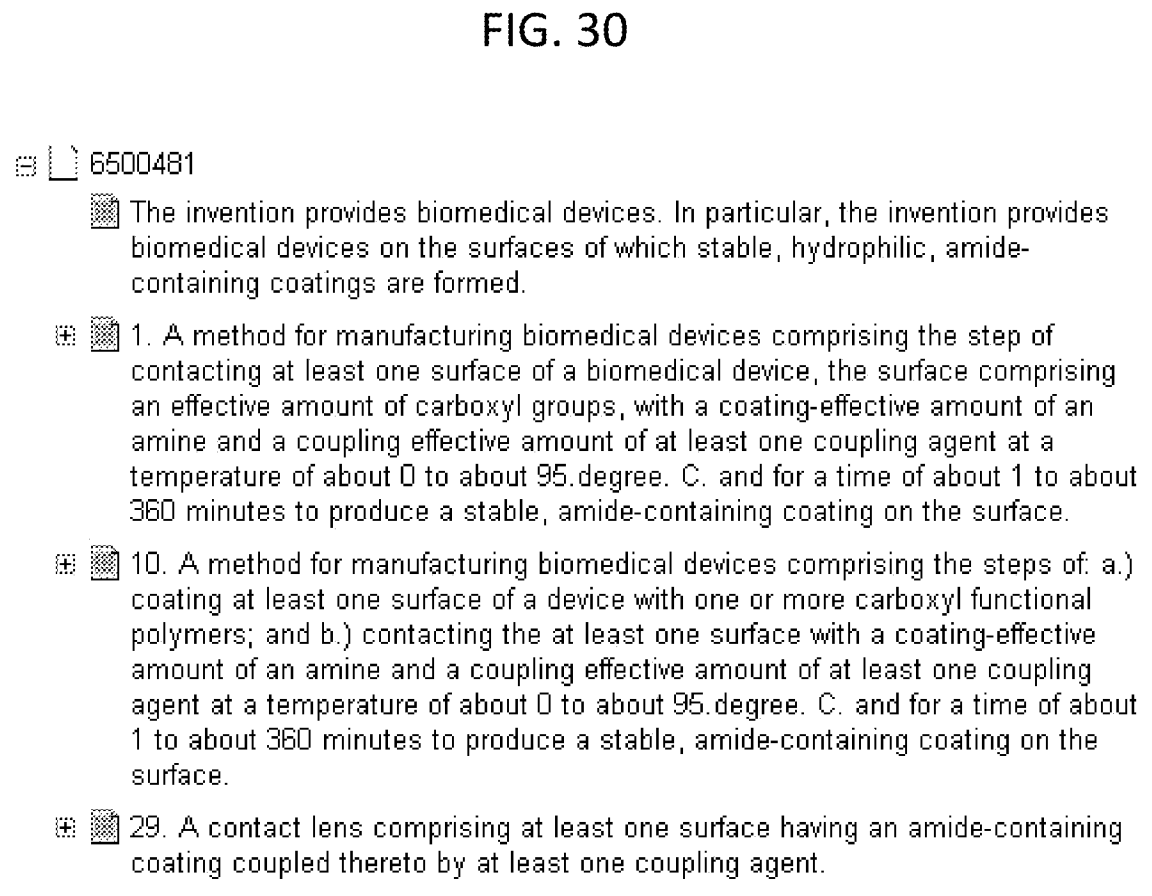

The invention provides biomedical devices. In particular, the invention provides biomedical devices on the surfaces of which stable, hydrophilic, amide-containing coatings are formed.

1. A method for manufacturing biomedical devices comprising the step of contacting at least one surface of a biomedical device, the surface comprising an effective amount of carboxyl groups, with a coating-effective amount of an amine and a coupling effective amount of at least one coupling agent at a temperature of about 0 to about 95.degree. C. and for a time of about 1 to about 360 minutes to produce a stable, amide-containing coating on the surface.

10. A method for manufacturing biomedical devices comprising the steps of: a.) coating at least one surface of a device with one or more carboxyl functional polymers; and b.) contacting the at least one surface with a coating-effective amount of an amine and a coupling effective amount of at least one coupling agent at a temperature of about 0 to about 95.degree. C. and for a time of about 1 to about 360 minutes to produce a stable, amide-containing coating on the surface.

29. A contact lens comprising at least one surface having an amide-containing coating coupled thereto by at least one coupling agent.

FIG. 31

Patent Import

Import By Patent Number

Enter the patent number associated with the patent you would like to import

Patent Number    20020088013

Patent Type    USPTO-PUBLISHED APPLICATIONS ▼

OK    Cancel

PATENT MATRIX

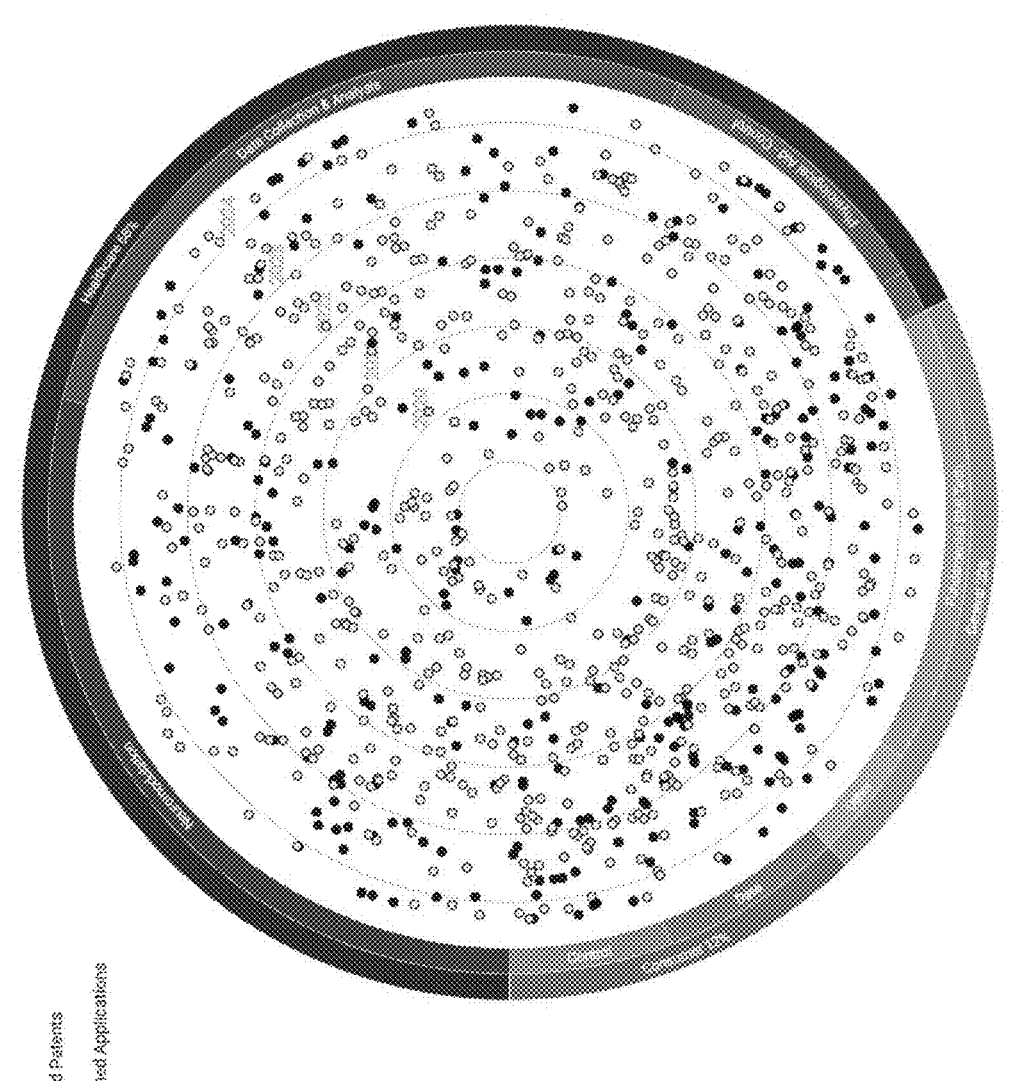
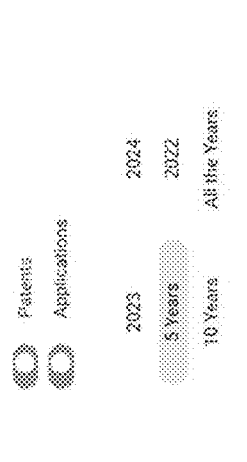
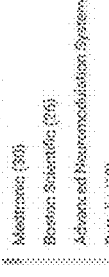
FIG. 41

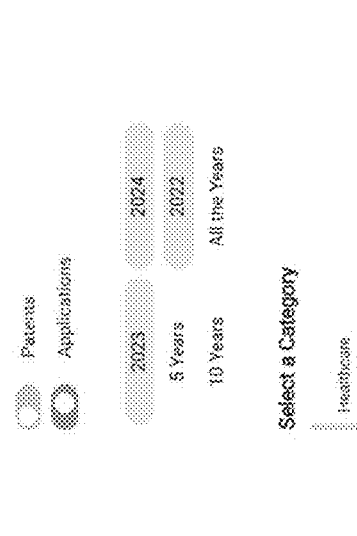
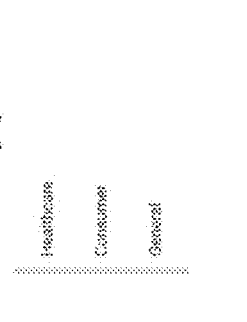
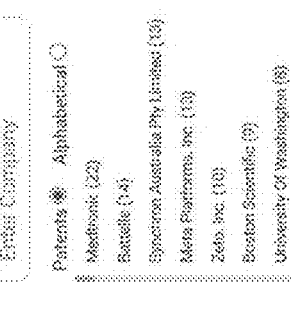
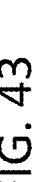
FIG. 43

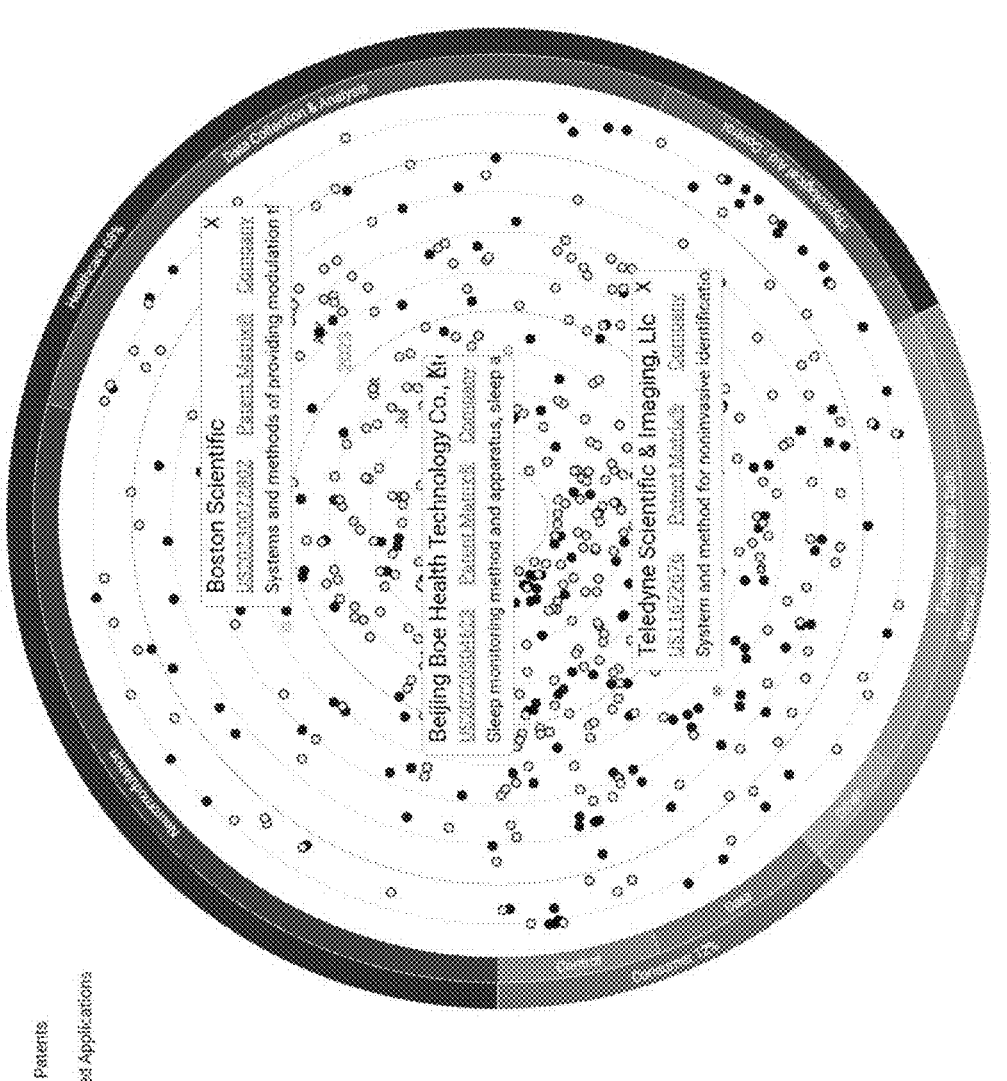
FIG. 44

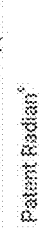
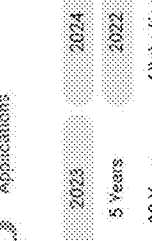
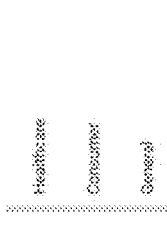
FIG. 45

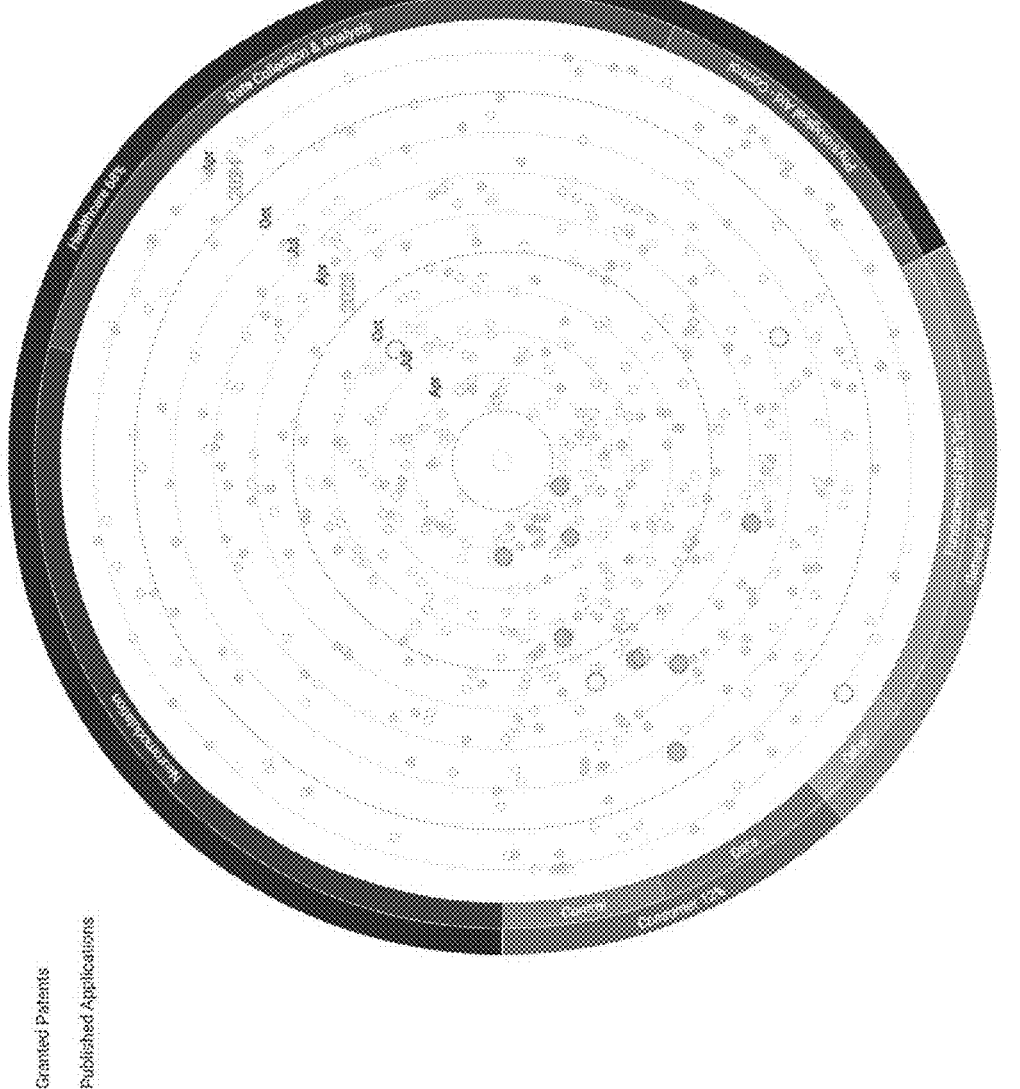
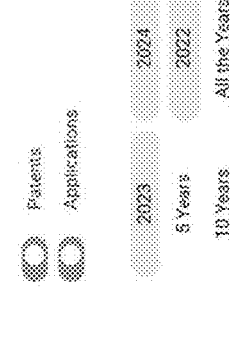
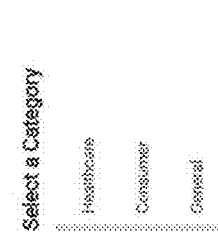
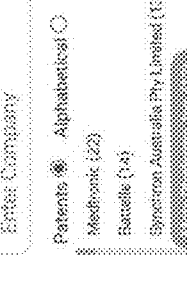
FIG. 46

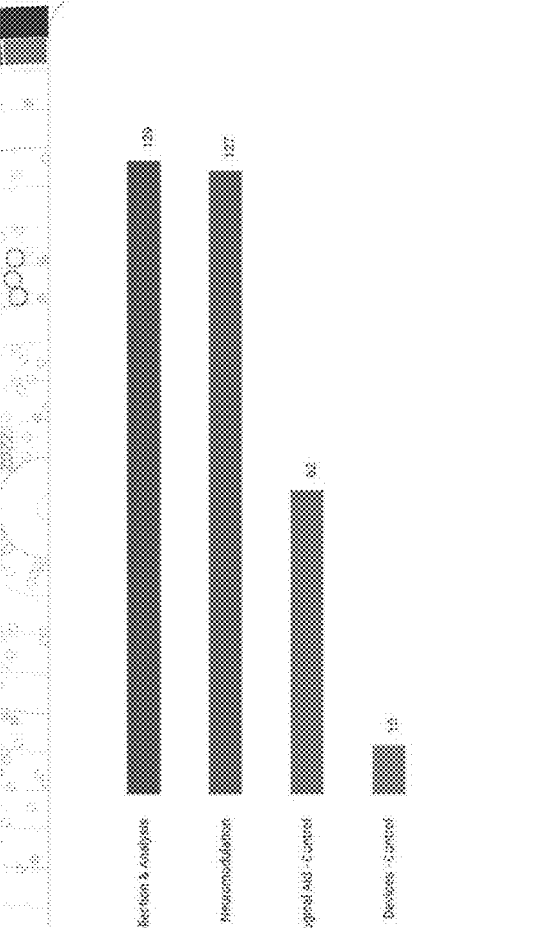
FIG. 48

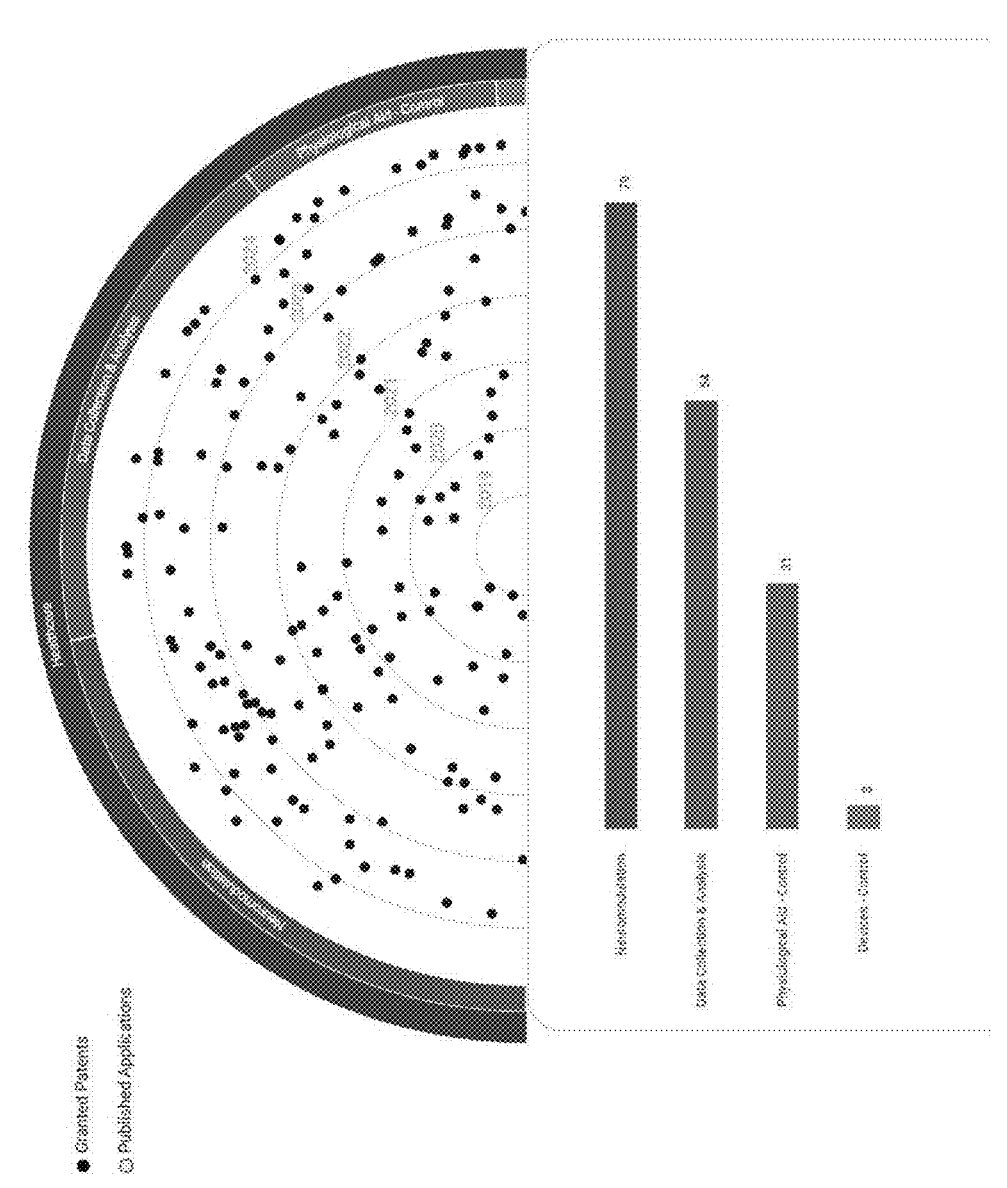
FIG. 51

Brain Machine Interface

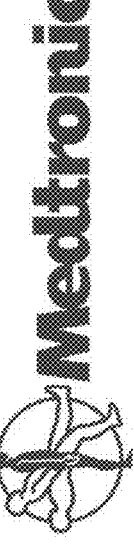

Medtronic | Website | LinkedIn | Stock Symbol: MDT | Headquarters: Dublin, Ireland Medtronic Medtronic Owned Patent Documents in this Patent Forecast Show 10 entries Search All Companies in this Patent Forecast Search:

| Document Number | Title | A-Z Issue / Pub | Company Owner |
|---|---|---|---|
| US2022/0331588 | NEUROSTIMULATION RESPONSE AND CONTROL | 2022-10-20 | Medtronic |
| US2022/0287646 | DENOISING SENSED SIGNALS FROM ARTIFACTS FROM CARDIAC SIGNALS | 2022-09-15 | Medtronic |
| US2022/0280047 | AUTOMATIC ALERT CONTROL FOR ACUTE HEALTH EVENT | 2022-09-08 | Medtronic |
| US2022/0096839 | NOISE DETECTION AND MODULATION OF CLOSED-LOOP THERAPY ACTION | 2022-03-31 | Medtronic |
| US2022/0096829 | NEUROMODULATION CATHETER DEVICES AND SYSTEMS HAVING ENERGY DELIVERING THERMOCOUPLE ASSEMBLIES AND ASSOCIATED METHODS | 2022-03-31 | Medtronic |
| US2022/0062639 | ANALYZING ECAP SIGNALS | 2022-03-03 | Medtronic |
| US2022/0062638 | PHASE ALIGNMENT OF ECAPs | 2022-03-03 | Medtronic |
| US2022/0044465 | IMPLANTABLE LEAD MIGRATION MONITORING USING ECAP | 2022-02-10 | Medtronic |
| US2022/0008726 | ANALYZING ECAP SIGNALS | 2022-01-13 | Medtronic |

Showing 1 to 9 of 9 entries

Previous  1  Next

FIG. 54

INTERACTIVE PATENT VISUALIZATION SYSTEMS AND METHODS

CROSS-REFERENCES TO RELATED APPLICATIONS

The present application is related to and claims priority from the following U.S. patent documents: this application is a continuation-in-part of U.S. patent application Ser. No. 18/750,531, filed Jun. 21, 2024, which is a continuation-in-part of U.S. patent application Ser. No. 18/650,963, filed Apr. 30, 2024, which is a continuation of U.S. patent application Ser. No. 17/226,791, filed Apr. 9, 2021, which is a continuation-in-part of U.S. patent application Ser. No. 16/242,220, filed Jan. 8, 2019, which claims priority from U.S. Provisional Patent Application No. 62/614,737, filed Jan. 8, 2018, each of which is incorporated herein by reference in its entirety.

BACKGROUND OF THE INVENTION

(1) Field of the Invention

The present invention relates generally to automated work systems and, more particularly, to automated work systems and methods for analyzing patent documents using interactive graphic user interface visualization.

(2) Description of the Prior Art

The number of patent applications is increasing yearly. From 1963 through 1983, approximately 100,000 patent applications per year were filed at the United States Patent & Trademark Office (USPTO); in 2001 alone, 326,508 patent applications were filed; and most recently in fiscal year 2016-2017 USPTO reported 647,388 patent applications were filed. Technology innovation, which needs patent protection to attract capital for development and commercialization, is driving this trend. Interestingly, technology is also facilitating the trend: word processing, remote electronic database searching, and similar technologies are facilitating the patent application process, both for high-technology and low-technology inventions. This large increase in patent applications, and patents in general, means that the ability to understand and communicate patent documents and competitive position with respect to a large field of other patent property is a difficult task, and is only becoming more difficult with time.

Thus, a need exists for automated systems and methods to provide for dynamic visualization of patent documents that provide for interactive graphic user interface (GUI) visuals relating to issued patents and/or patent applications.

Prior art patent documents include the following:

U.S. Pat. No. 10,997,679 for patent map display device, patent map display method, and computer-readable recording medium including patent map display program stored therein by inventor Hajime Shirasaka, et. al, filed Nov. 27, 2019 and issued May 4, 2021, is directed to a patent map display device that displays a patent map on a user terminal that can be operated by a user and includes an information acquisition unit that acquires instruction information input to the user terminal by the user, a bibliographic DB that stores prior patent information, an analysis unit including a comparison section that compares the instruction information with the patent information and an evaluation section that performs patent evaluation of the instruction information by comparing the instruction information with the patent information on the basis of the comparison section, a patent map generation unit including a generation section that generates a map and a character representing an attribute related to an analysis result of the instruction information on the basis of attribute information including the patent evaluation and a disposition section that disposes the character in the map, and a display unit that displays a patent map generated by the patent map generation unit.

US Patent Pub. No. 2023/0086930 for intellectual-property analysis platform by inventor Lewis C. Lee, et. al., filed Sep. 17, 2021 and published Mar. 23, 2023, is directed to systems and methods for generation and use of intellectual-property (IP) analysis platform architectures. A scoring component may be utilized to produce scores for IP assets using user seeded searches in varying areas of interest, such as, for example, target technical fields, targeted publications, targeted products, and/or competitor entity portfolios. The scoring component may be further utilized to produce an interactive graphical element including a spatial representation of the scoring of IP assets. The interactive graphical element may include various functionalities and/or information associated with the of IP assets. The scoring component may utilize data from a coverage component, an opportunity component and/or an exposure component to assess a comprehensive score associated with a group of IP assets of a targeted entity.

US Patent Pub. No. 2023/0090090 for intellectual property analysis platform by inventor Rohitasva Dutta, et. al., filed Sep. 17, 2021 and published Mar. 23, 2023 is directed to systems and methods for generation and use of intellectual-property (IP) analysis platform architectures. A scoring component may be utilized to produce scores for IP assets using user seeded searches in varying areas of interest, such as, for example, target technical fields, targeted publications, targeted products, and/or competitor entity portfolios. The scoring component may be further utilized to produce an interactive graphical element including a spatial representation of the scoring of IP assets. The interactive graphical element may include various functionalities and/or information associated with the of IP assets. The scoring component may utilize data from a coverage component, an opportunity component and/or an exposure component to assess a comprehensive score associated with a group of IP assets of a targeted entity.

US Patent Pub. No. 2023/0089425 for intellectual-property analysis platform by inventors Lewis C. Lee., et. al., filed Sep. 17, 2021 and published Mar. 23, 2023, is directed to systems and methods for generation and use of intellectual-property (IP) analysis platform architectures. A scoring component may be utilized to produce scores for IP assets using user seeded searches in varying areas of interest, such as, for example, target technical fields, targeted publications, targeted products, and/or competitor entity portfolios. The scoring component may be further utilized to produce an interactive graphical element including a spatial representation of the scoring of IP assets. The interactive graphical element may include various functionalities and/or information associated with the of IP assets. The scoring component may utilize data from a coverage component, an opportunity component and/or an exposure component to assess a comprehensive score associated with a group of IP assets of a targeted entity.

US Patent Pub. No. 2023/0087206 for intellectual-property analysis platform by inventors Lewis C. Lee, et. al., filed Sep. 17, 2021 and published Mar. 23, 2023, is directed to systems and methods for generation and use of intellectual-property (IP) analysis platform architectures. A scoring component may be utilized to produce scores for IP assets using user seeded searches in varying areas of interest, such as, for example, target technical fields, targeted publications, targeted products, and/or competitor entity portfolios. The scoring component may be further utilized to produce an interactive graphical element including a spatial representation of the scoring of IP assets. The interactive graphical element may include various functionalities and/or information associated with the of IP assets. The scoring component may utilize data from a coverage component, an opportunity component and/or an exposure component to assess a comprehensive score associated with a group of IP assets of a targeted entity.

US Patent Pub. No. 2023/0086106 for intellectual-property analysis platform by inventor David Craig Andrews, filed Sep. 17, 2021 and published Mar. 23, 2023, is directed to systems and methods for generation and use of intellectual-property (IP) analysis platform architectures. A scoring component may be utilized to produce scores for IP assets using user seeded searches in varying areas of interest, such as, for example, target technical fields, targeted publications, targeted products, and/or competitor entity portfolios. The scoring component may be further utilized to produce an interactive graphical element including a spatial representation of the scoring of IP assets. The interactive graphical element may include various functionalities and/or information associated with the of IP assets. The scoring component may utilize data from a coverage component, an opportunity component and/or an exposure component to assess a comprehensive score associated with a group of IP assets of a targeted entity.

US Patent Pub. No. 2022/0374918 for data-driven index for identification and ranking of companies for a selected technology by inventors Yaseen Tamer Refaie Moussa, et. al., filed May 7, 2021 and published Nov. 24, 2022, is directed to one example method including identifying companies involved in development and/or use of a technology, and identifying the companies includes identifying datasets from which features are to be extracted, wherein each feature comprises an aspect of one of the companies that relates to the technology, and extracting the features from the datasets. Next, the method includes selecting a subset of the identified companies, for each feature assigned to a company in the subset, normalizing a value of the feature relative to respective values of all other features assigned to that company, assigning a weight to each of the features whose value has been normalized, calculating, for each company in the subset, an index value based on the features assigned to that company and the weights assigned to those features, and generating an index that ranks the companies in the subset by their respective index values.

US Patent Pub. No. 2022/0343444 for artificial intelligence, machine learning, and predictive analysis for patent and non-patent documents by inventors Alex Chan, et. al., filed May 2, 2022 and published Oct. 27, 2022, is directed to systems, methods, and computer program methods for modifying a configuration of a document management system. In some implementation document data are received as machine learning inputs, where the document data represent one or more documents. Then, a pattern is recognized in the one or more documents using machine learning. Based on the recognized pattern, a configuration of a document management system is modified.

U.S. Pat. No. 10,133,791 for data mining and analysis system and method for legal documents by inventor Alex Chan, filed Sep. 8, 2015 and issued Nov. 20, 2018, is directed to systems, methods, and computer program methods for assessing a validity or invalidity of a patent. A plurality of legal documents associated with a plurality of legal cases can be received, where at least one of the plurality of legal cases can be associated with a legal proceeding. The legal proceeding can be associated with a determination of a validity or invalidity of a patent. The patent can include at least one claim. The plurality of legal documents can be stored in one or more databases. One or more predetermined patterns can be applied to the plurality of legal documents to identify reference data. The reference data can be analyzed to develop one or more analytical or statistical models. The validity or invalidity of the patent can be assessed based on the one or more analytical or statistical models.

U.S. Pat. No. 10,157,352 for artificial intelligence machine learning, and predictive analytic for patent and non-patent documents by inventors Alex Chan, et. al., filed Feb. 11, 2016, and issued Dec. 18, 2018, is directed to systems, methods, and computer program methods for modifying a configuration of a document management system. In some implementation document data are received as machine learning inputs, where the document data represent one or more documents. Then, a pattern is recognized in the one or more documents using machine learning. Based on the recognized pattern, a configuration of a document management system is modified.

U.S. Pat. No. 11,321,631 for artificial intelligence, machine learning, and predictive analytics for patent and non-patent documents by inventors Alex Chan, et. al., filed Oct. 28, 2018, and issued May 3, 2022, is directed to systems, methods, and computer program methods for modifying a configuration of a document management system. In some implementation document data are received as machine learning inputs, where the document data represent one or more documents. Then, a pattern is recognized in the one or more documents using machine learning. Based on the recognized pattern, a configuration of a document management system is modified.

US Patent Pub. No. 2022/0036487 for patent collaboration and analysis system by inventors Jay Guiliano, et. al., filed Apr. 24, 2021, and published Feb. 3, 2022, is directed to an advanced relational database and user interface system used for the evaluation, analysis and generation of specialized reports in any of a plurality data analysis environments. The database and analysis system can be utilized for many purposes, but particularly and preferably to support the analysis of patent claims and more specifically claim construction, infringement, written description, invalidity and/or patentability, among other matters of intellectual property litigation and analysis.

U.S. Pat. No. 9,542,449 for collaboration and analysis system for disparate information sources by inventors Jay Guiliano, et. a., filed Mar. 15, 2013, and issued Jan. 10, 2017, is directed to an advanced relational database and user interface system used for the evaluation, analysis and generation of specialized reports in any of a plurality data analysis environments. The database and analysis system can be utilized for many purposes, but particularly and preferably to support the analysis of patent claims and more specifically claim construction, infringement, written description, invalidity and/or patentability, among other matters of intellectual property litigation and analysis.

US Patent No. 2019/0244313 for patent collaboration and analysis system by inventors Jay Guiliano, et. al., filed Sep. 8, 2018, and published Aug. 8, 2019, is directed to an advanced relational database and user interface system used for the evaluation, analysis and generation of specialized reports in any of a plurality data analysis environments. The database and analysis system can be utilized for many purposes, but particularly and preferably to support the analysis of patent claims and more specifically claim construction, infringement, written description, invalidity and/ or patentability, among other matters of intellectual property litigation and analysis.

US Patent Pub. No. 2021/0082070 for database and machine learning enabled system for patent analytics, distribution and management by inventors Nicole Ann Shanahan, et. al., filed Jul. 27, 2020, and published Mar. 18, 2021, is directed to a machine learning model is trained on a plurality of patents. The present invention couples the machine learning model to a platform where a partner can discover inventions identified by the machine learning model and contact the patent owner in the real world to engage in discussions about acquiring the patent or the technology. The goal of the present invention is to enhance broader access to patent and technology rights across the innovation ecosystem.

U.S. Pat. No. 11,397,780 for automated method and system for clustering enriched company seeds into cluster and selecting best values for each attribute within the cluster to generate a company profile by inventors Eli Pogrebezky, et. al., filed Nov. 20, 2020, and issued Jul. 26, 2022, is directed to methods and systems are provided for automatically generating company profiles. Independent seed source services each crawl web pages to collect seeds from different web-based sources. A seed enricher module can then fetch additional information for each of the collected seeds from other different web-based sources and generate an enriched company seed for each collected seed. The enriched company seeds can then be automatically clustered into different clusters that each represent a particular company. A particular value for each attribute of each cluster that is determined to have the highest score can then be selected for inclusion in a corresponding company profile for that cluster.

U.S. Pat. No. 10,866,996 for automated method and system for clustering enriched company seeds into a cluster and selecting best values for each attribute within the cluster to generate a company profile by inventors Eli Pogrebezky, et. al., filed Jan. 29, 2019, and issued Dec. 15, 2020, is directed to methods and systems are provided for automatically generating company profiles. Independent seed source services each crawl web pages to collect seeds from different web-based sources. A seed enricher module can then fetch additional information for each of the collected seeds from other different web-based sources and generate an enriched company seed for each collected seed. The enriched company seeds can then be automatically clustered into different clusters that each represent a particular company. A particular value for each attribute of each cluster that is determined to have the highest score can then be selected for inclusion in a corresponding company profile for that cluster.

US Patent Pub. No. 2020/0089740 for structural patent-claim-graphic automatic displaying equipment by inventor Hong-Shin Tsai, filed Sep. 18, 2019, and published Mar. 19, 2020, is directed to a structural patent-claim-graphic automatic displaying equipment, including a paragraph-content-and-paragraph-hierarchical-level-value determining device, an element noun data obtaining device, an interrelationship data obtaining device, and a division content obtaining device, automatically transfers a patent claim to a structural patent-claim-graphic automatic displaying equipment and displays the structural patent-claim-graphic automatic displaying equipment.

US Patent Pub. No. 2018/0218451 for intellectual property portfolio management system by inventor Jurgen Bebber, filed Mar. 23, 2018, and published Aug. 2, 2018, is directed to a computer system based intellectual property (IP) portfolio management system. The system includes a data store configured to store data including user account data for a plurality of user accounts, a client interface providing user access to the system via a communication network by user computer systems or devices, a system controller in data communication with the client interface and data store via the communication network. The system controller includes a user interface and display module configured to facilitate data display to a user and receiving user input via the client interface, a user account module configured create user accounts and maintain user account information inclusive of access control of data stored in the data store for storing, updating and retrieving data stored in the data store, the data for each user including user account data, a portfolio activity controller configured to create and automatically administer a plurality of types of IP matters, each IP matter being associated with a user account, provide automated guidance of one or more activities in relation to each type of IP matter to a user and facilitate action for one or more activities in relation to an IP matter, and one or more integration modules, each configured to facilitate machine to machine communication between the system and an external IP system, whereby transactions between the external IP system and the system are executed under control of the portfolio activity controller.

US Patent Pub. No. 2018/0075384 for a data-driven innovation decision support system, and method by inventor Jianxi Luo, filed Sep. 18, 2017, and published Mar. 15, 2018, is directed to a data processor implemented method for assessing an innovation entity within a network map of various technology domains as nodes. The method comprises generating and visualizing the network map; assessing and visualizing a level of strength of the innovation entity in each technology domain; and providing at least one suggestion for the innovation entity for at least two nodes of the network map. It is advantageous that the provision of the at least one suggestion is based on a weight of a link between the at least two nodes of the network map. A graphical user interface enabling the method is also provided.

U.S. Pat. No. 10,891,701 for method and system for evaluating intellectual property by inventors Carl Jessen, et. al., filed Jul. 12, 2016, and issued Jan. 12, 2021, is directed to computer processor generated analysis and presentation of patent and business data in a common interface. The aggregation and analysis includes a method and system for evaluating a patent or patent application and proposed claim text by examining claim related information maintained in databases as well as image related information maintained in databases. The method includes deriving unique signatures of individual claims and ascertaining scope of individual claims relative to other claims in a collection, such as claims found in a classification schema and also deriving unique characteristics from images and ascertaining the scope of similarity between the images. A signature and scope of the patent claims and images may be graphically depicted to a user using various graphic elements in a user interface.

US Patent Pub. No. 2012/0278244 for evaluating intellectual property by inventors Lewis Lee, et. al., filed Apr. 15, 2012, and published Nov. 1, 2012, is directed to aggregation, analysis, and presentation of patent and business data in a common interface. The analysis includes techniques for evaluating a patent or patent application by examining claim-related information. These techniques include deriving unique signatures of individual claims and ascertaining scope of individual claims relative to other claims in a collection (such as claims found in a common class). The signature and scope of patent claims may be graphically depicted using various graphics elements in a user interface.

US Patent Pub. No. 2016/0148327 for intelligent engine for analysis of intellectual property by inventor Rolf Buchholz, filed Nov. 24, 2014, and published May 26, 2016, is directed to an intelligent intellectual property (IP) engine (IIPE) retrieving IP-related data from public or proprietary IP databases. Public IP databases include, for example, Espacenet, USPTO, EPO and other websites. IP-related data may be, for example, patents, non-patent literature, R&D information. The retrieved IP-related data is processed to structure, visualize, analyze and interpret the data in an individual context, thereby enabling users to make operational and strategic business decisions.

US Patent Pub. No. 2013/0339337 for auto tagging method and system by inventors Raad Alkhateeb, et. al., filed May 29, 2013, and published Dec. 19, 2013, is directed to a method for categorizing content from a website associated with an enterprise company for ranking of said company, said method performed by a computing device having a processing structure; and a memory including instructions executable by said processing structure to cause said processing structure to at least: request a uniform resource locator (URL) associated with the website; validate the URL; create a profile associated with the enterprise company and storing the URL in the memory; automatically crawl the website for content and to create a site index; parse the content to determine the occurrence of a predefined set of keywords pertaining to products and services and business activities of the company, and rank the keywords according to relevance pertaining to at least one category; categorize the website into at least one industry category; and determine whether the website is properly categorized.

US Patent Pub. No. 2012/0290571 for evaluating intellectual property by inventors Lewis Lee, et. al., filed Apr. 15, 2012, and published Nov. 15, 2012, is directed to aggregation, analysis, and presentation of patent and business data in a common interface. The analysis includes techniques for evaluating a patent or patent application by examining claim-related information. These techniques include deriving unique signatures of individual claims and ascertaining scope of individual claims relative to other claims in a collection (such as claims found in a common class). The signature and scope of patent claims may be graphically depicted using various graphics elements in a user interface.

US Patent Pub. No. 2012/0290487 for evaluating intellectual property by inventors Lewis Lee, et. al., filed Apr. 15, 2012, and published Nov. 15, 2012, is directed to aggregation, analysis, and presentation of patent and business data in a common interface. The analysis includes techniques for evaluating a patent or patent application by examining claim-related information. These techniques include deriving unique signatures of individual claims and ascertaining scope of individual claims relative to other claims in a collection (such as claims found in a common class). The signature and scope of patent claims may be graphically depicted using various graphics elements in a user interface.

US Patent Pub. No. 2012/0278244 for evaluating intellectual property by inventors Lewis Lee, et. al., filed Apr. 15, 2012 and published Nov. 1, 2012, is directed to aggregation, analysis, and presentation of patent and business data in a common interface. The analysis includes techniques for evaluating a patent or patent application by examining claim-related information. These techniques include deriving unique signatures of individual claims and ascertaining scope of individual claims relative to other claims in a collection (such as claims found in a common class). The signature and scope of patent claims may be graphically depicted using various graphics elements in a user interface.

U.S. Pat. No. 8,145,640 for system and method for patent evaluation and visualization of the results thereof by inventor Allan Williams, filed Aug. 11, 2004 and issued Mar. 27, 2012, is directed to a method for evaluating a patent document, which includes the steps of introducing a set of one or more patent indices, characterizing different aspects of the patent document; combining said patent indices into a Patent Quality index (the PQ), characterizing value of the patent document; and visualizing the value of the patent document by using a color coding of the patent document according to the value of the PQ index. Conveniently, a correspondence between the value of the Patent Quality index of the patent document and the wavelength of a selected color of a visible part of the light spectrum is provided. A corresponding method and system for visualizing results of evaluation of a patent portfolio are also described.

U.S. Pat. No. 10,095,778 for method and system for probabilistically quantifying and visualizing relevance between two or more citationally or contextually related data objects by inventor Jonathan Barney, filed Jul. 6, 2015, and issued Oct. 9, 2018, is directed to a method for probabilistically quantifying a degree of relevance between two or more citationally or contextually related data objects, such as patent documents, non-patent documents, web pages, personal and corporate contacts information, product information, consumer to behavior, technical or scientific information, address information, and the like is provided. In another embodiment a method for visualizing and displaying relevance between two or more citationally or contextually related data objects is provided. In another embodiment a search input/output interface that utilizes an iterative self-organizing mapping technique to automatically generate a visual map of relevant patents and/or other related documents desired to be explored, searched or analyzed is provided. In another embodiment, a search input/output interface that displays and/or communicates search input criteria and corresponding search results in a way that facilitates intuitive understanding and visualization of the logical relationships between two or more related concepts being searched is provided.

U.S. Pat. No. 9,075,849 for method and system for probabilistically quantifying and visualizing relevance between two or more citationally or contextually related data objects by inventor Jonathan Barney, filed Jul. 22, 2014, and issued Jul. 7, 2015, is directed to a method for probabilistically quantifying a degree of relevance between two or more citationally or contextually related data objects, such as patent documents, non-patent documents, web pages, personal and corporate contacts information, product information, consumer to behavior, technical or scientific information, address information, and the like is provided. In another embodiment a method for visualizing and displaying relevance between two or more citationally or contextually related data objects is provided. In another embodiment a search input/output interface that utilizes an iterative self-organizing mapping technique to automatically generate a visual map of relevant patents and/or other related documents desired to be explored, searched or analyzed is provided. In another embodiment, a search input/output interface that displays and/or communicates search input criteria and corresponding search results in a way that facilitates intuitive understanding and visualization of the logical relationships between two or more related concepts being searched is provided.

U.S. Pat. No. 8,818,996 for method and system for probabilistically quantifying and visualizing relevance between two or more citationally or contextually related data objects by inventor Jonathan Barney, filed Aug. 2, 2013, and issued Aug. 26, 2014, is directed to a method for probabilistically quantifying a degree of relevance between two or more citationally or contextually related data objects, such as patent documents, non-patent documents, web pages, personal and corporate contacts information, product information, consumer to behavior, technical or scientific information, address information, and the like. In another embodiment a method for visualizing and displaying relevance between two or more citationally or contextually related data objects is provided. In another embodiment a search input/output interface that utilizes an iterative self-organizing mapping technique to automatically generate a visual map of relevant patents and/or other related documents desired to be explored, searched or analyzed is provided. In another embodiment, a search input/output interface that displays and/or communicates search input criteria and corresponding search results in a way that facilitates intuitive understanding and visualization of the logical relationships between two or more related concepts being searched is provided.

U.S. Pat. No. 8,504,560 for method and system for probabilistically quantifying and visualizing relevance between two or more citationally or contextually related data objects by inventor Jonathan Barney, filed Mar. 2, 2012, and issued Aug. 6, 2013, is directed to a method for probabilistically quantifying a degree of relevance between two or more citationally or contextually related data objects, such as patent documents, non-patent documents, web pages, personal and corporate contacts information, product information, consumer to behavior, technical or scientific information, address information, and the like. In another embodiment a method for visualizing and displaying relevance between two or more citationally or contextually related data objects is provided. In another embodiment a search input/output interface that utilizes an iterative self-organizing mapping technique to automatically generate a visual map of relevant patents and/or other related documents desired to be explored, searched or analyzed is provided. In another embodiment, a search input/output interface that displays and/or communicates search input criteria and corresponding search results in a way that facilitates intuitive understanding and visualization of the logical relationships between two or more related concepts being searched is provided.

U.S. Pat. No. 8,131,701 for method and system for probabilistically quantifying and visualizing relevance between two or more citationally or contextually related data objects by inventor Jonathan Barney, filed Mar. 29, 2010, and issued Mar. 6, 2012, is directed to a novel method for probabilistically quantifying a degree of relevance between two or more citationally or contextually related data objects, such as patent documents, non-patent documents, web pages, personal and corporate contacts information, product information, consumer to behavior, technical or scientific information, address information, and the like. In another embodiment the present invention provides a novel method for visualizing and displaying relevance between two or more citationally or contextually related data objects. In another embodiment the present invention provides a novel search input/output interface that utilizes an iterative self-organizing mapping ("SOM") technique to automatically generate a visual map of relevant patents and/or other related documents desired to be explored, searched or analyzed. In another embodiment the present invention provides a novel search input/output interface that displays and/or communicates search input criteria and corresponding search results in a way that facilitates intuitive understanding and visualization of the logical relationships between two or more related concepts being searched.

U.S. Pat. No. 7,716,226 for method and system for probabilistically quantifying and visualizing relevance between two or more citationally or contextually related data objects by inventor Jonathan Barney, filed Sep. 27, 2005, and issued May 11, 2010, is directed to a novel method for probabilistically quantifying a degree of relevance between two or more citationally or contextually related data objects, such as patent documents, non-patent documents, web pages, personal and corporate contacts information, product information, consumer behavior, technical or scientific information, address information, and the like. In another embodiment the present invention provides a novel method for visualizing and displaying relevance between two or more citationally or contextually related data objects. In another embodiment the present invention provides a novel search input/output interface that utilizes an iterative self-organizing mapping ("SOM") technique to automatically generate a visual map of relevant patents and/or other related documents desired to be explored, searched or analyzed. In another embodiment the present invention provides a novel search input/output interface that displays and/or communicates search input criteria and corresponding search results in a way that facilitates intuitive understanding and visualization of the logical relationships between two or more related concepts being searched.

U.S. Pat. No. 11,275,935 for patent analysis applications and corresponding user interface features by inventor Michael Schuster, filed Apr. 19, 2019, and issued Mar. 15, 2022, is directed to various embodiments for patent analysis applications. A computing device may be directed to parse an electronic version of a patent document having a detailed description, a claims section, and at least one drawing. In various embodiments, parsing the electronic version of the patent document may include applying an OCR process to the electronic document, obtaining a list of claim terms used in the claims section, identifying instances of the claim terms used in the detailed description, identifying a reference numeral corresponding to the claim terms from the detailed description, and identifying portions of the drawing that includes the reference numeral. In response to user interaction with a claim term, a dialog may be shown proximate to the claim term, where the dialog includes a portion of the detailed description that includes the claim term and/or the drawing that comprises the reference numeral corresponding to the claim term.

US Patent Pub. No. 2019/0279073 for computer generated determination of patentability by inventor Sasmito Adibowo, filed Mar. 7, 2018, and published Sep. 12, 2019, directed to a system, method, and computer program product embodiments for generating a patentability metric and training a patentability model. In an embodiment, a patent analysis system generates and updates a patentability model. The patentability model utilizes vectorized patent publication data and public corpus data to generate a function for predicting the likelihood of patent grant. The patentability model also considers patent grant statistics in generating the function. After generating the function, the patent analysis system may maintain and/or update the patentability model based on new publications and idea disclosures. In this manner, the patent analysis system may analyze vectorized versions of idea disclosures to generate an indicator for predicting patentability.

U.S. Pat. No. 9,959,582 for intellectual property information retrieval by inventors Jesse Sukman, et. al., filed Oct. 23, 2014, and issued May 1, 2018, directed to methods, systems, and media for creating, storing, and using an interactive hierarchical arrangement of technical elements useful for conducting efficient patent infringement and similar analysis. The hierarchical arrangement of technical elements is adapted to be displayed on a user-engageable computer display in a manner that allows a user to select and de-select particular technical elements. Methods and systems include storing records of technical elements in hierarchical relationships, which elements are correlated to specific patent claims during an annotation process. The hierarchical arrangement of technical elements is displayed so as to indicate genus-species relationships among the technical elements, while the stored correlations are used as a basis to perform highly efficient claims-based patent analysis.

U.S. Pat. No. 9,336,304 for patent analytics system by inventor Gary Speier, filed Nov. 10, 2009 and issued May 10, 2016, directed to a method of maintaining a database of patent claim entries. The patent claim entries are associated with one or more patent documents as well as one or more parameters characterizing a patent claim. The database may be accessed to retrieve a selection of one or more patent claim entries. This may be accomplished by retrieving the one or more parameters associated with the selection of the one or more patent claim entries. Additionally, one or more of the parameters characterizing a patent claims may be selected. A report chart is presented on a display device. The report chart depicts relationships between the selected parameters and the one or more patent claim entries retrieved from the database. The relationships are depicted as a plurality of data points. Also a visualization option may be selected and the report chart may be modified based on the selection. The visualization options may include highlighting related data points, presenting claim language associated with a data point, and presenting more parameters associated with the data point.

U.S. Pat. No. 8,335,998 for interactive global map by inventors Bruce Rubinger, et. al., filed Oct. 8, 2009, and issued Dec. 18, 2012, directed to systems and methods are provided for generating an interactive map for displaying and analyzing a compressive intellectual property landscape within a given field. Based on content analysis of relevant patents and patent applications, this prior art map provides a systematic review of vast quantities of data, thereby allowing the user to discern critical technology and product trends, prior art references, and the strategies of both leading and emerging competitors. Each patent represented on the map can be analyzed within the context of the prior art landscape to uncover novel features, strong claims, and business and technology trends. This comprehensive view can provide a foundation for creating effective corporate strategies in-tune with the realities of the intellectual property terrain.

US Patent Pub. No. 2021/0358064 for patent strategy chart graphic representation method, digital system for assisting in graphic representation of patent strategy chart, patent strategy chart, patent strategy chart generation method, management system, computer program, and patent strategy chart component by inventor Hiroshi Kudo, filed Apr. 9, 2021 and published Nov. 18, 2021, directed to embodiments are expressed by a point, and the scope of the patent claims is expressed by a fan shape. Where a patentee of one patent is identical to a practitioner of one embodiment, a center angle of the fan shape representing the scope of the patent claims is disposed to overlap the point representing the embodiments or to be near the point. When there are plural fan shapes, the fan shapes are radially disposed. Where the practitioner is a third party, when the embodiments are included in the scope of the patent claims, the point representing the embodiments is disposed to be positioned inside the fan shape representing the scope of the patent claims, and when the embodiments are not included in the scope of the patent claims, the point representing the embodiments is disposed to be positioned outside the fan shape representing the scope of the patent claims.

U.S. Pat. No. 11,023,721 for document information evaluating device, document information evaluating method, and document information evaluating program by inventors Takashi Mikami, et. al., filed Jul. 22, 2020, and issued Jun. 1, 2021, directed to an information acquiring unit configured to acquire input information input from a user terminal that is able to be operated by a user from the user terminal, a storage unit configured to store a plurality of pieces of document information, a calculation unit configured to decompose the input information into predetermined constituent units and calculate a matching condition with one piece of document information among the plurality of pieces of document information stored in the storage unit as a score for each decomposed constituent unit, an output unit configured to output a comparison table representing a degree of difference between the input information and the document information for each constituent unit on the basis of the score, and an input unit configured to input a self-evaluation of the document information that is performed by the user to the comparison table.

US Patent Pub. No. 2022/0398273 for software-aided consistent analysis of documents by inventors Joseph F. Dearing, et. al., filed Jun. 9, 2022, and published Dec. 15, 2022, directed to a system for automatic analysis and segregation of documents. The system provides a graphical user interface for receiving inputs pertaining to a first document of a plurality of documents in a document analysis project. For example, the graphical user interfaces may receive a classification input classifying the first document with a first classification. The system automatically analyzes other documents in the plurality of documents to identify a subset of documents that are similar to the first document, and automatically classify the subset of the documents that are similar to the first document with the first classification. Further, the present technology pertains to conducting a patent analysis project by a team of analysts, including presenting a detailed analysis user interface for reviewing patent-related documents, where the detailed analysis user interface includes text of a first patent-related document to be analyzed and categories and related subcategories.

US Patent Pub. No. 2024/0020642 for patent valuation using artificial intelligence by inventors Yoshikazu Akamine, et. al., filed Sep. 26, 2023, and published Jan. 18, 2024, directed to a system and method for using artificial intelligence for patent valuation. The method includes obtaining a master list of patent classification codes used by a patent office. The method also includes, for each patent issued by the patent office: obtaining a respective set of patent classification codes assigned to the respective patent and forming a respective training vector. Each element in the respective training vector is a categorical variable that specifies whether a patent classification code is included in the respective set of classification codes. The system receives a respective user-specified value metric for each patent. The method also includes training a machine learning model according to a training data table that includes the training vectors. The machine learning model is configured to predict value metrics for patents according to their corresponding patent classification codes.

US Patent Pub. No. 2006/0224982 for graphical application interface product using a browser by inventors Paul Albrecht, et. al., filed Apr. 1, 2005, and published Oct. 5, 2006, directed to embodiments of a graphical application interface product using a browser, such as a web browser.

SUMMARY OF THE INVENTION

The present invention provides a system, method, and dynamic, interactive graphical user interface (GUI) for visualization and for analyzing patent documents, including text-based descriptions, diagrams or figures, and intellectual property as set forth in the patent document claims for each of the multiplicity of patent documents.

In one aspect, the system includes: at least one device in network-based communication with a remote computer and/or cloud-based computing system having a database of patent documents including figures and text descriptions and claims.

The present invention provides a patent forecast diagram for providing information about technology evolution in predetermined technology sectors including an interactive, dynamic GUI for visualization of patent documents including content-dense graphics illustrating the number, content size, type of a multiplicity of patent documents (issued or granted patent versus published pending application), distributed over time, with comparison to similar patent documents based upon content of specification or detailed description and claims, and visual enunciation of human and computer determined insights and similarities regarding single patents or groups of patents, all within a predetermined technology sector having at least one sub-sector or category within the technology sector.

In one embodiment, the present invention is directed to a system for interactive patent visualization, including at least one platform configured for network communication with at least one user device, wherein the at least one platform includes an intelligence engine module, wherein the at least one platform is operable to provide a graphical user interface (GUI) to the at least one user device, wherein the at least one platform is operable to automatically generate a diagram based on patent data from at least one database using the intelligence engine, wherein the diagram is a circular interactive visualization comprising a multiplicity of graphical elements distributed based on a dynamic timeline, wherein each graphical element represents a patent document, wherein the dynamic timeline is modifiable, wherein a timeline indicator is shown within the diagram, wherein a center of the diagram represents an oldest date in time and a perimeter of the diagram represents a most recent date in time, wherein the at least one user device is operable to display the diagram via the GUI, wherein the GUI is operable to expand and contract the scaling of the diagram based on a selected time scale, wherein the at least one platform is operable to assign each of a multiplicity of documents with one of a multiplicity of primary category labels automatically using the intelligence engine or based on a user selection, wherein the intelligence engine module is operable to automatically generate at least one suggested category label for at least one additional document based on the multiplicity of primary category labels assigned to the multiplicity of documents, wherein the distribution throughout the circular interactive visualization is grouped based on at least one of the multiplicity of primary category labels and further distributed by at least one sub-category label, wherein the selection of the at least one category label dynamically changes the diagram to an interactive semi-circular interactive visualization, and wherein the at least one platform is operable to automatically apply at least one color and/or at least one shading to each of the multiplicity of graphical elements representing a multiplicity of documents assigned to at least one patent owner upon receiving a selection of the at least one patent owner, and wherein at least one color and/or at least one shading of each of a multiplicity of graphical elements representing a multiplicity of documents not assigned to the at least one patent owner is different than the at least one color and/or the at least one shading of each of the multiplicity of graphical elements representing the multiplicity of documents assigned to at least one patent owner.

In another embodiment, the present invention is directed to a system for interactive patent visualization, including at least one at least one platform configured for network communication with at least one user device, wherein the at least one platform includes an intelligence engine module, wherein the at least one platform is operable to provide a graphical user interface (GUI) to the at least one user device, wherein the at least one platform is operable to automatically generate a diagram based on patent data from at least one database using the intelligence engine, wherein the diagram is a circular interactive visualization comprising a multiplicity of graphical elements distributed based on a dynamic timeline, wherein each graphical element represents a patent document, wherein the dynamic timeline is modifiable, wherein a timeline indicator is shown within the diagram, wherein a center of the diagram represents an oldest date in time and a perimeter of the diagram represents a most recent date in time, wherein the at least one platform is operable to assign each of a multiplicity of documents with one of a multiplicity of primary category labels automatically using the intelligence engine or based on a user selection, wherein the intelligence engine module is operable to automatically generate at least one suggested category label for at least one additional document based on the multiplicity of primary category labels assigned to the multiplicity of documents, wherein the distribution throughout the circular interactive visualization is grouped based on at least one of the multiplicity of primary category labels and further distributed by at least one sub-category label, wherein the selection of the at least one primary category label dynamically changes the diagram to an interactive semi-circular interactive visualization, wherein the at least one platform is operable to receive a selection of at least one patent owner, wherein the at least one platform is operable to automatically apply at least one color and/or at least one shading to each of the multiplicity of graphical elements representing a multiplicity of documents assigned to the at least one patent owner upon receiving the selection of the at least one patent owner, and wherein the at least one platform is operable to automatically reduce the opacity of each of the multiplicity of graphical elements representing a multiplicity of documents not assigned to the at least one patent owner upon receiving the selection of the at least one patent owner.

In yet another embodiment, the present invention is directed to a method for interactive patent visualization, including providing at least one platform configured for network communication with at least one user device, wherein the at least one platform includes an intelligence engine module, wherein the at least one platform provides a graphical user interface (GUI) to the at least one user device, the at least one platform automatically generating at least one diagram based on patent data from at least one database using the intelligence engine, wherein at least one diagram is a circular interactive visualization comprising a multiplicity of graphical elements distributed based on a dynamic timeline, wherein each graphical element represents a patent document, wherein the dynamic timeline is modifiable, the at least one diagram including a timeline indicator shown within the at least one diagram, wherein a center of the at least one diagram represents an oldest date in time and a perimeter of the at least one diagram represents a most recent date in time, the at least one platform causing the at least one user device to display the at least one diagram via the GUI, the GUI expanding or contracting the scaling of the at least one diagram based on a selected time scale, the at least one platform assigning each of a multiplicity of documents with one of a multiplicity of primary category labels automatically using the intelligence engine or based on a user selection, the intelligence engine module automatically generating at least one suggested category label for at least one additional document based on the multiplicity of primary category labels assigned to the multiplicity of documents, the at least one platform distributing the multiplicity of documents throughout the circular interactive visualization based on at least one grouping of the multiplicity of primary category labels and further distributing the multiplicity of documents based on at least one grouping of at least one sub-category label, wherein the selection of the at least one category label dynamically changes the diagram to an interactive semi-circular interactive visualization, and the at least one platform automatically applying at least one color and/or at least one shading to each of the multiplicity of graphical elements representing a multiplicity of documents assigned to at least one patent owner upon receiving a selection of at least one patent owner.

These and other aspects of the present invention will become apparent to those skilled in the art after a reading of the following description of the preferred embodiment when considered with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 16 is a screen view of a query interface according to one embodiment of the present invention.

FIG. 17 is a screen view of a query results interface according to one embodiment of the present invention.

FIG. 18 is a screen view of a query scheduler according to one embodiment of the present invention.

FIG. 19 is a screen view of a tag creation interface according to one embodiment of the present invention.

FIG. 21 is a screen view of an assignee search interface according to one embodiment of the present invention.

FIG. 22 is a screen view of an assignee detail interface according to one embodiment of the present invention.

FIG. 24 is a screen view of a document exporter according to one embodiment of the present invention.

Figure 25:
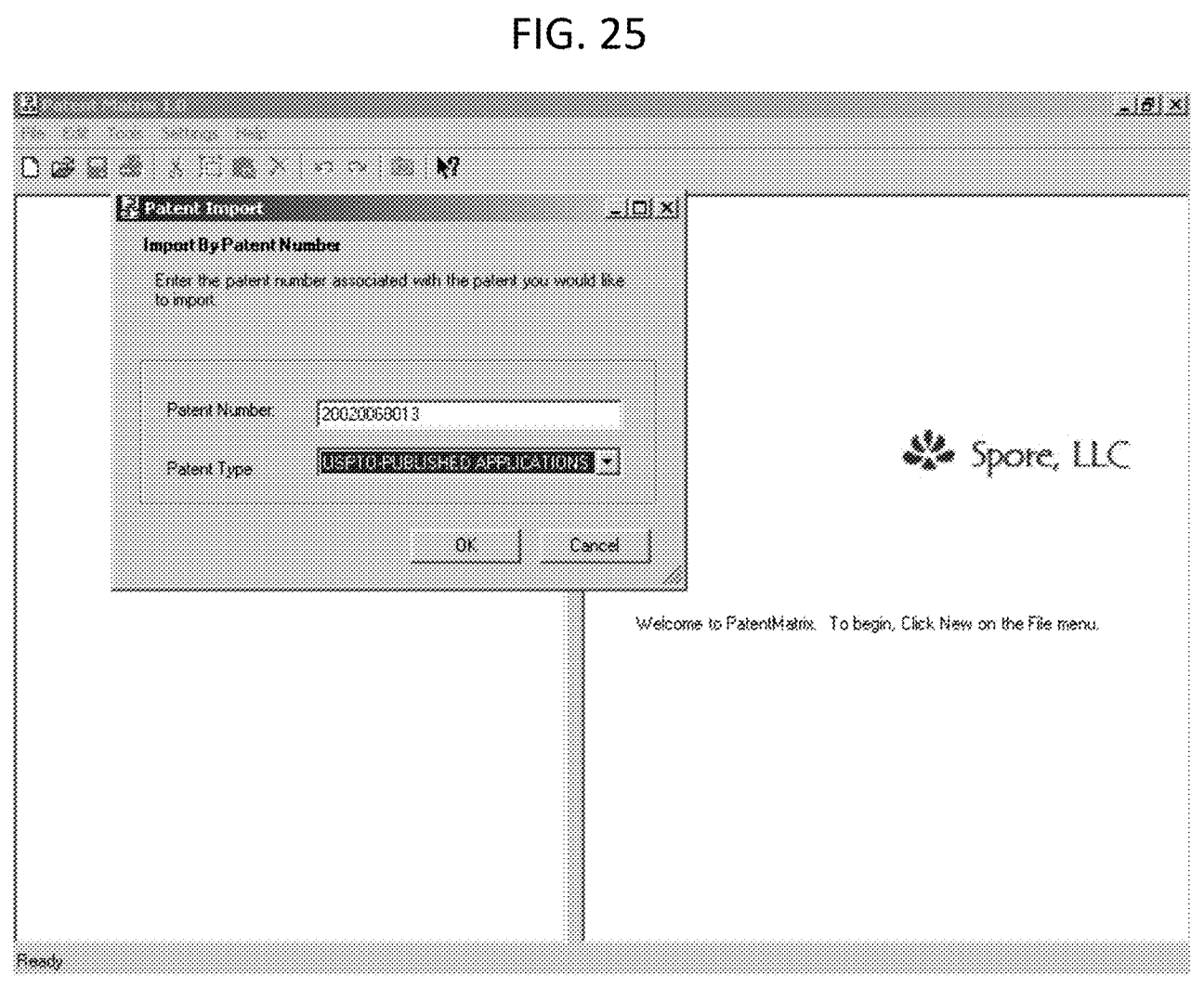

FIG. 25 is a screen view of an automated system according to one embodiment of the present invention.

FIG. 26 is a screen view of an automated system according to one embodiment of the present invention.

FIG. 29 is a screen view of an automated system according to one embodiment of the present invention.

FIG. 30 is a screen view of an automated system according to one embodiment of the present invention.

FIG. 31 is a screen view of an automated system according to one embodiment of the present invention.

FIG. 41 is an image of a graphic user interface (GUI) displaying five years of data according to one embodiment of the present invention.

FIG. 43 is an image of a graphic user interface (GUI) displaying only published applications according to one embodiment of the present invention.

FIG. 44 is an image of a graphic user interface (GUI) according to one embodiment of the present invention.

FIG. 45 an image of a graphic user interface (GUI) including a patent owner retrieval interface according to one embodiment of the present invention.

FIG. 46 is an image of a graphic user interface (GUI) with documents from a single patent owner selected according to one embodiment of the present invention.

FIG. 48 is an image of a graphic user interface (GUI) displaying a single category with documents from a single patent owner selected according to one embodiment of the present invention.

FIG. 51 is an image of a graphic user interface (GUI) displaying a single category displaying only issued patents according to one embodiment of the present invention.

FIG. 54 is a screen view of a patent owner detail interface according to one embodiment of the present invention.

DETAILED DESCRIPTION OF THE PREFERRED EMBODIMENTS

Figure 1:
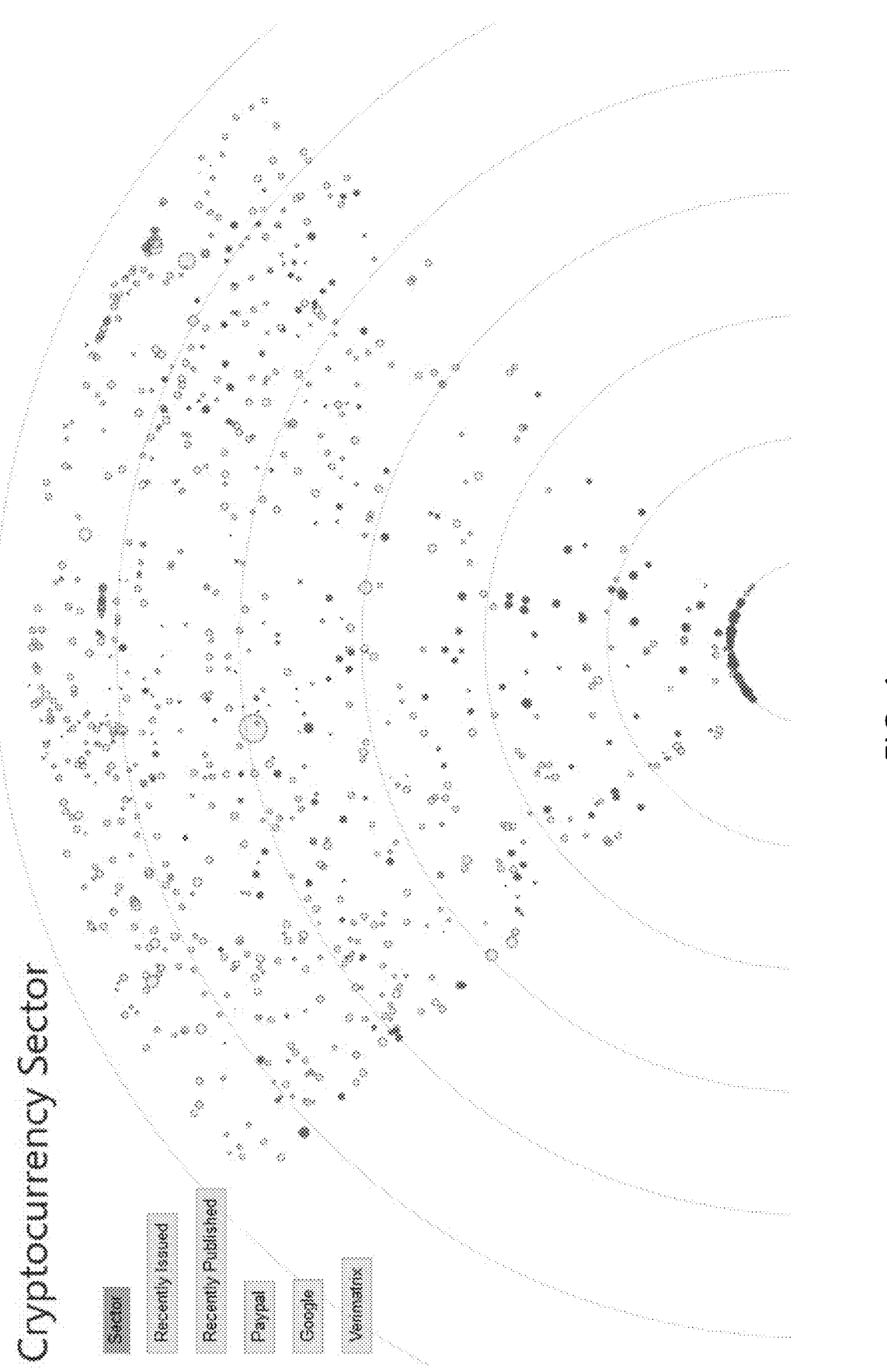
FIG. 1 is an image of a graphic user interface (GUI) according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

In one embodiment, the present invention is directed to a system for interactive patent visualization, including at least one platform configured for network communication with at least one user device, wherein the at least one platform includes an intelligence engine module, wherein the at least one platform is operable to provide a graphical user interface (GUI) to the at least one user device, wherein the at least one platform is operable to automatically generate a diagram based on patent data from at least one database using the intelligence engine, wherein the diagram is a circular interactive visualization comprising a multiplicity of graphical elements distributed based on a dynamic timeline, wherein each graphical element represents a patent document, wherein the dynamic timeline is modifiable, wherein a timeline indicator is shown within the diagram, wherein a center of the diagram represents an oldest date in time and a perimeter of the diagram represents a most recent date in time, wherein the at least one user device is operable to display the diagram via the GUI, wherein the GUI is operable to expand and contract the scaling of the diagram based on a selected time scale, wherein the at least one platform is operable to assign each of a multiplicity of documents with one of a multiplicity of primary category labels automatically using the intelligence engine or based on a user selection, wherein the intelligence engine module is operable to automatically generate at least one suggested category label for at least one additional document based on the multiplicity of primary category labels assigned to the multiplicity of documents, wherein the distribution throughout the circular interactive visualization is grouped based on at least one of the multiplicity of primary category labels and further distributed by at least one sub-category label, wherein the selection of the at least one category label dynamically changes the diagram to an interactive semi-circular interactive visualization, and wherein the at least one platform is operable to automatically apply at least one color and/or at least one shading to each of the multiplicity of graphical elements representing a multiplicity of documents assigned to at least one patent owner upon receiving a selection of the at least one patent owner, and wherein at least one color and/or at least one shading of each of a multiplicity of graphical elements representing a multiplicity of documents not assigned to the at least one patent owner is different than the at least one color and/or the at least one shading of each of the multiplicity of graphical elements representing the multiplicity of documents assigned to at least one patent owner.

In another embodiment, the present invention is directed to a system for interactive patent visualization, including at least one at least one platform configured for network communication with at least one user device, wherein the at least one platform includes an intelligence engine module, wherein the at least one platform is operable to provide a graphical user interface (GUI) to the at least one user device, wherein the at least one platform is operable to automatically generate a diagram based on patent data from at least one database using the intelligence engine, wherein the diagram is a circular interactive visualization comprising a multiplicity of graphical elements distributed based on a dynamic timeline, wherein each graphical element represents a patent document, wherein the dynamic timeline is modifiable, wherein a timeline indicator is shown within the diagram, wherein a center of the diagram represents an oldest date in time and a perimeter of the diagram represents a most recent date in time, wherein the at least one platform is operable to assign each of a multiplicity of documents with one of a multiplicity of primary category labels automatically using the intelligence engine or based on a user selection, wherein the intelligence engine module is operable to automatically generate at least one suggested category label for at least one additional document based on the multiplicity of primary category labels assigned to the multiplicity of documents, wherein the distribution throughout the circular interactive visualization is grouped based on at least one of the multiplicity of primary category labels and further distributed by at least one sub-category label, wherein the selection of the at least one primary category label dynamically changes the diagram to an interactive semi-circular interactive visualization, wherein the at least one platform is operable to receive a selection of at least one patent owner, wherein the at least one platform is operable to automatically apply at least one color and/or at least one shading to each of the multiplicity of graphical elements representing a multiplicity of documents assigned to the at least one patent owner upon receiving the selection of the at least one patent owner, and wherein the at least one platform is operable to automatically reduce the opacity of each of the multiplicity of graphical elements representing a multiplicity of documents not assigned to the at least one patent owner upon receiving the selection of the at least one patent owner.

In yet another embodiment, the present invention is directed to a method for interactive patent visualization, including providing at least one platform configured for network communication with at least one user device, wherein the at least one platform includes an intelligence engine module, wherein the at least one platform provides a graphical user interface (GUI) to the at least one user device, the at least one platform automatically generating at least one diagram based on patent data from at least one database using the intelligence engine, wherein at least one diagram is a circular interactive visualization comprising a multiplicity of graphical elements distributed based on a dynamic timeline, wherein each graphical element represents a patent document, wherein the dynamic timeline is modifiable, the at least one diagram including a timeline indicator shown within the at least one diagram, wherein a center of the at least one diagram represents an oldest date in time and a perimeter of the at least one diagram represents a most recent date in time, the at least one platform causing the at least one user device to display the at least one diagram via the GUI, the GUI expanding or contracting the scaling of the at least one diagram based on a selected time scale, the at least one platform assigning each of a multiplicity of documents with one of a multiplicity of primary category labels automatically using the intelligence engine or based on a user selection, the intelligence engine module automatically generating at least one suggested category label for at least one additional document based on the multiplicity of primary category labels assigned to the multiplicity of documents, the at least one platform distributing the multiplicity of documents throughout the circular interactive visualization based on at least one grouping of the multiplicity of primary category labels and further distributing the multiplicity of documents based on at least one grouping of at least one sub-category label, wherein the selection of the at least one category label dynamically changes the diagram to an interactive semi-circular interactive visualization, and the at least one platform automatically applying at least one color and/or at least one shading to each of the multiplicity of graphical elements representing a multiplicity of documents assigned to at least one patent owner upon receiving a selection of at least one patent owner.

The present invention provides systems and methods for automatically generating from patent research data a patent forecast diagram for providing information about technology evolution in predetermined technology sectors and patent market value based on relevant context including but not limited to patent context and market or commercial data, the patent forecast diagram including an interactive, dynamic GUI for visualization of patent documents including content-dense graphics illustrating the number, content size, type of a multiplicity of patent documents (issued or granted patent versus published pending application), distributed over time, with comparison to similar patent documents based upon content of specification or detailed description and claims, visual enunciation of human and computer determined insights and similarities regarding single patents or groups of patents, and visual representation of related real world events including news articles, press releases, product announcements, and professional opinion articles, all within a predetermined technology sector having at least one sub-sector or category within the technology sector.

The systems and methods of research, analysis and visualization of the present invention provide for enhanced tagging, grouping, or association features for research results (e.g., documents or data elements) that provide for automatic links directly to the Cooperative Patent Classification (CPC) number that corresponds to each patent document, i.e., US issued patent document and/or US published pending application document, plus user defined and computer automated tagging connectivity among similar and dissimilar patent documents derived by incorporating patent document properties including claim text, abstract text, activity dates, CPC classifications, and user defined metadata.

The present invention provides for a system for automatically generating from patent research data a patent forecast diagram for providing information about technology evolution in predetermined technology sectors and patent market value based on relevant context including but not limited to patent context and market or commercial data, the patent forecast diagram including an interactive, dynamic GUI for visualization of patent documents including content-dense graphics illustrating a number or volume, a content size, a type of a multiplicity of patent documents selected from issued or granted patents and published pending applications, distributed over time, with comparison to similar patent documents based upon content of specification or detailed description and claims, visual enunciation of human and computer determined insights and similarities regarding single patents or groups of patents, and a visual representation of related business events information including news articles, press releases, product announcements, and professional opinion articles, all within a predetermined technology sector having at least one sub-sector or category within the technology sector. The automated research, analysis, and visualization functions of the present invention provide for automated tagging, grouping, and association for research results based upon machine learning of software comparing data from network-based sources in real time.

Also, the business events information is distributed over a multiplicity of websites on the internet, which could not be automatically performed without the use of machine learning software code within the present invention, which also provide for the business events information to be automatically searched and retrieved by at least one programmed command. At least one programmed command is generated by the machine learning software for automatically curating the business events information and prioritizing it based upon relevance to the predetermined technology sector and recency. The automated research, analysis, and visualization functions provide for automated tagging, grouping, and association for research results based upon machine learning of software comparing data from network-based sources in real time.

Preferably, the research results include electronic documents or data elements having automatic links directly to a company website hosted on the internet and real time stock status and price for public companies. Also, the research results include electronic documents or data elements having automatic links directly to a Cooperative Patent Classification (CPC) number that corresponds to each patent document.

Preferably, automated tagging connectivity provided among similar and dissimilar patent documents is generated by artificial intelligence (AI) or machine learning algorithms in software code for automatically incorporating patent document properties including claim text, abstract text, activity dates, CPC classifications, and metadata. In one embodiment, the present invention provides an AI model configured for supervised, unsupervised, or reinforced learning or training. In one embodiment, the AI model is based on multiple sets of training data. The multiple sets of training data are a subset of user input data. For example, a user device is enabled to tag patent documents with category labels, and those patent documents tagged with category labels by the user device are used for training the AI model. Each of U.S. Pat. No. 9,922,286 titled "Detecting and Correcting Anomalies in Computer-Based Reasoning Systems" and U.S. application Ser. No. 15/900,398 is incorporated herein by reference in its entirety.

The AI model is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The AI model is operable to use any of the aforementioned learning techniques alone or in combination.

Further, the AI model is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The AI model is preferably operable to recommend and/or perform actions based on historical data, external data sources, ML, AI, NNs, and/or other learning techniques. The AI model is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment of the present invention, the display label can be different from the tagging label. A tag is a standalone classification based upon predetermined criteria; a tag can be a CPC or linked to a CPC. It provides for tagging within a sector. A visualization is operable to automatically display tags within a sector and the visualization can be modified selectively to display alternative tags within the sector, i.e., tags that were not used automatically for grouping results within a data set for a sector. If tags are linked to at least one CPC, then the tag is automatically highlighted in a detailed view for each of the multiplicity of individual patent documents. Also, the present invention provides for automatic click-select or preprogrammed keys to switch detailed view for other documents. A sector category input can be received by the system from user inputs via interactive graphic user interface (GUI) so that documents can be grouped by sector in addition to being identified by tags or tagging. Tags are user-assigned or automatically assigned by the computer software based on relevance criteria.

The dynamic, interactive visualization of the present invention provides for displaying result sets according to various criteria established during the research phase when inputs are provided for CPC and/or key word research on database, i.e., Structured Query Language (SQL) or N-Gram or N-Graph fuzzy search performed on the database.

The present invention systems and methods provide for content-dense visualization via dynamic, interactive GUIs that display patent document information in combination with insights; patent data is configurable for visual representation and order by time dimensions and further includes: highlighting and association based upon patent asset ownership or assignment recordation for each patent document; drilling into detailed information, such as by way of example and not limitation, patent claims tree diagrams; visually connecting similar patent documents, i.e., related by owner and/or technology classification or sub-classification; and/or visually connecting news events, press releases and/or expert insights to the patent data and its visual representation in the GUI.

Additionally, the database systems and methods of the present invention provide for functionality including: automatically importing documents from one or more direct sources accessible via a network; enabling automated recovery and least cost acquisition of data via the network and at least one source of data; enabling artificial intelligence (AI) or machine learning for automated associations and grouping of data elements and/or enabling human insight and association override of AI-based grouping or associations of data elements; enabling structured and/or fuzzy data retrieval and analysis automatically based upon technology sector targets and search queries; and/or automatically generating a technology sector based on patent data from at least one database using an intelligence engine.

In a preferred embodiment, a system according to the present invention submits queries to national patent office electronic depositories across one or more electronic network in real-time and receives the query results from the national patent office electronic depositories across one or more electronic networks in near-real-time. Thus, a method of the present invention includes the steps of submitting queries in real-time across an electronic network to a national patent office depository and receiving the query results in near-real-time across the electronic network from the national patent office depository.

In one embodiment, the present invention provides systems and methods for interactive patent visualization. At least one user device is constructed and configured for network communication with at least one server platform. The at least one server platform provides an interactive and dynamic graphical user interface (GUI) to the at least one user device. The at least one server platform comprises an intelligence engine including an artificial intelligence (AI) model. The at least one server platform accesses at least one national patent database, and generates a patent forecast diagram based on patent data from the at least one national patent database. In one embodiment, the at least one server platform is operable to automatically generate a patent forecast diagram based on patent data from at least one national patent database using the intelligence engine. The patent forecast diagram comprises a multiplicity of graphics distributed over time and by category, representing a distribution of patent documents for a predetermined technology sector over time, with each graphic representing a patent document. The at least one user device displays the patent forecast diagram via the interactive and dynamic GUI. The at least one user device is enabled to click-select one of the multiplicity of graphics and display related patent data represented by the click-selected one of the multiplicity of graphics. The category comprises at least one category label. In one embodiment, the intelligence engine automatically creates the at least one category label and tag the patent documents with the at least one category label based on patent document information including claim text, abstract text, activity dates, CPC codes, and metadata. In one embodiment, the at least one user device tags a multiplicity of patent documents with the at least one category label. The intelligence engine is operable to train the AI model based on the multiplicity of patent documents tagged by the at least one user device. In one embodiment, the size of each of the graphics represents a length of the patent document. In one embodiment, the size of each of the graphics represents other quality indicators of the patent document. In one embodiment, the multiplicity of graphics comprises at least one geometric shape, and the at least one geometric shape comprises at least one circle. In one embodiment, the at least one circle comprises a filled circle representing an issued patent document. In one embodiment, the at least one circle comprises an unfilled circle representing a published pending patent application.

In one embodiment, the at least one server platform is further operable to access to a multiplicity of market related databases, and generate a visual representation of market information including news articles, press releases, product announcements, and professional opinion articles for the predetermined technology sector. The at least one user device is enabled to display the visual representation of market information via the interactive and dynamic GUI. In one embodiment, the at least one server platform is operable to search and retrieve the market information from the multiplicity of market related databases. In one embodiment, the at least one server platform comprises an intelligence engine including a machine learning model operable to automatically curate and prioritize the market information based upon a relevancy value and a recency value for the predetermined technology sector. In one embodiment, the intelligence engine is operable to curate and prioritize the market information based upon a patent portfolio associated with a company and/or an individual. Alternatively, the intelligence engine is operable to curate and prioritize the market information based upon historical patent activity and/or market activity associated with a company and/or an individual. The market information includes electronic documents or data elements having automatic links directly to a company website hosted on the internet, real time stock status and price for public companies. In one embodiment, the at least one server platform performs advanced analytics and provides insights for the predetermined sector based on the patent data and the market information.

To provide a full view of a patent document owner and generate predictive analytics for, but not limited to, competitive intelligence, investment trends, identification of market disrupters, competitive threats, corporate partnerships or acquisition targets, and/or potential identification of potential infringers, the at least one server platform is operable to access a multiplicity of third-party company profile databases, and automatically generate a company profile associated with the third-party data, including, but not limited to, financial information, current operating status, employee count, and number of exits. In one embodiment, the at least one server platform is operable to automatically update the company profiles at set time intervals using the intelligence engine module. In one embodiment, the at least one server platform is operable to automatically update the company profiles at least once a week, at least once a month, at least every other month, at least every six months, and/or at least once a year.

FIGS. 1-7 illustrate various screen shot views of a display for the dynamic, interactive visualization of data by the present invention. FIG. 1 illustrates an example advanced technology sector pertaining to cryptocurrency inventions wherein the circles on the display each represent a unique patent document, i.e., either a published pending patent application or issued patent document. The size of the circle indicates the length of the document itself, i.e., a larger or longer document is represented by a circle having a larger diameter than others within the sector. A solid or shaded circle indicates an issued patent; by contrast, a published pending patent application is represented by an open circle without solid center, i.e., it is empty within the circumference, or it is illustrated with lighter shading. The systems and methods of the present invention also automatically update the technology sector and all data that meets the criteria for the sector as any new data are available, e.g., for patent data, new publications of patent applications and new patent grants are available on a weekly basis from their direct source, which is the patent office for each country or the governing authority or government agency responsible for the publications and issuances of patent applications and patents, respectively. The systems and methods ensure reliable data acquisition from the direct source via software automation, failover methods, and prioritization of direct source based on timeliness and cost.

The display provides for patent documents to be distributed over a radial, scatter plot, or circular diagram, with the patent documents distributed from the origin to the extent based on publication or issue date. In one embodiment, the patent documents are distributed from the periphery of the diagram based upon publication or issue date. In a preferred embodiment, the oldest patent documents are at the origin of the diagram and the most recently published or issued at the extent. Other criteria for distributing the patent documents are also provided for. For example, the patent documents can be distributed by application date, priority date, assignment date, rejection date, decision date, or market event date, such as financing event announcement or press release date. In one embodiment, the display provides for graphics representing patent documents to be distributed over a circular interactive visualization.

Figure 2:
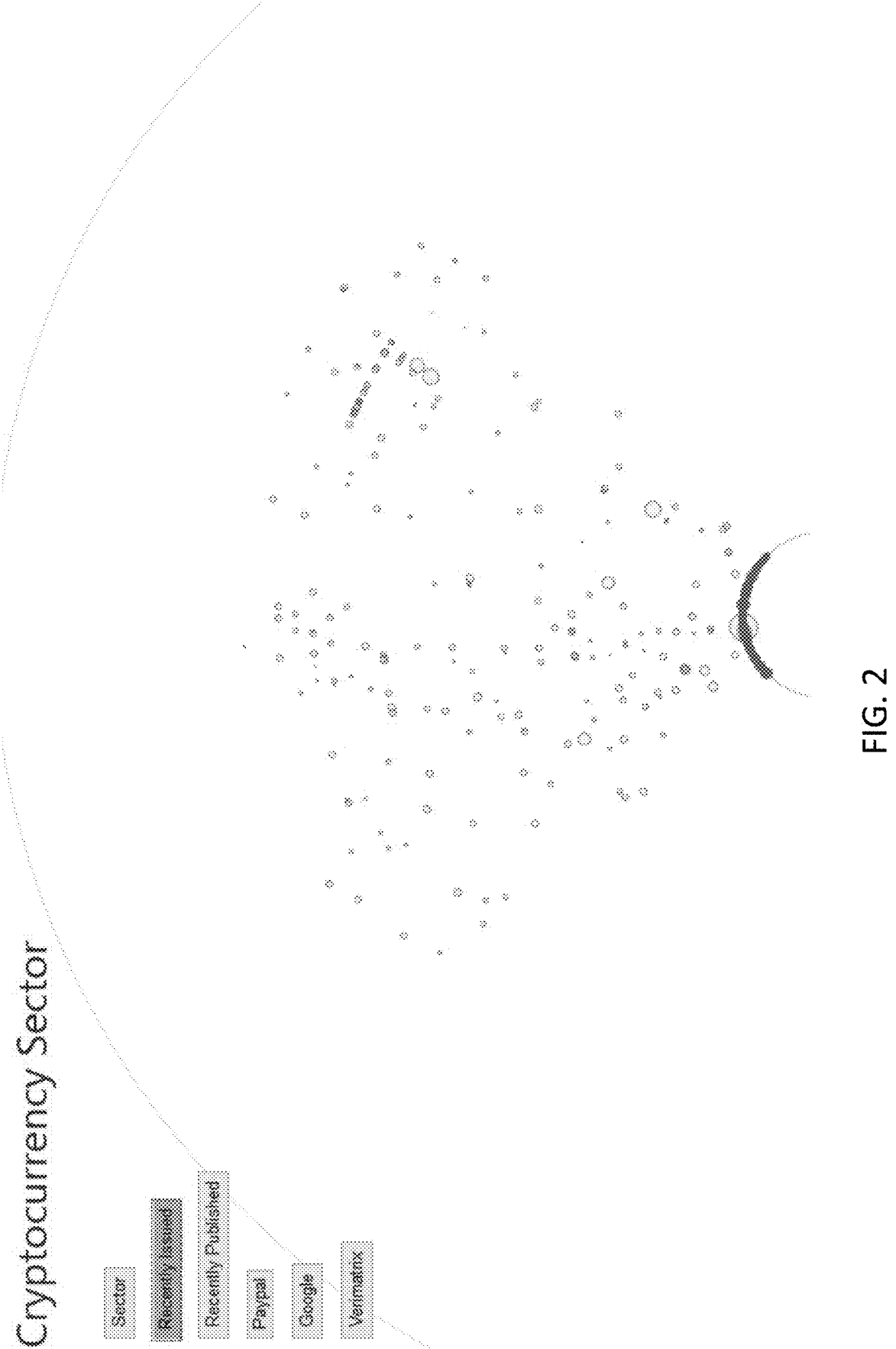
FIG. 2 is an image of a graphic user interface (GUI) according to one embodiment of the present invention.
Figure 3:
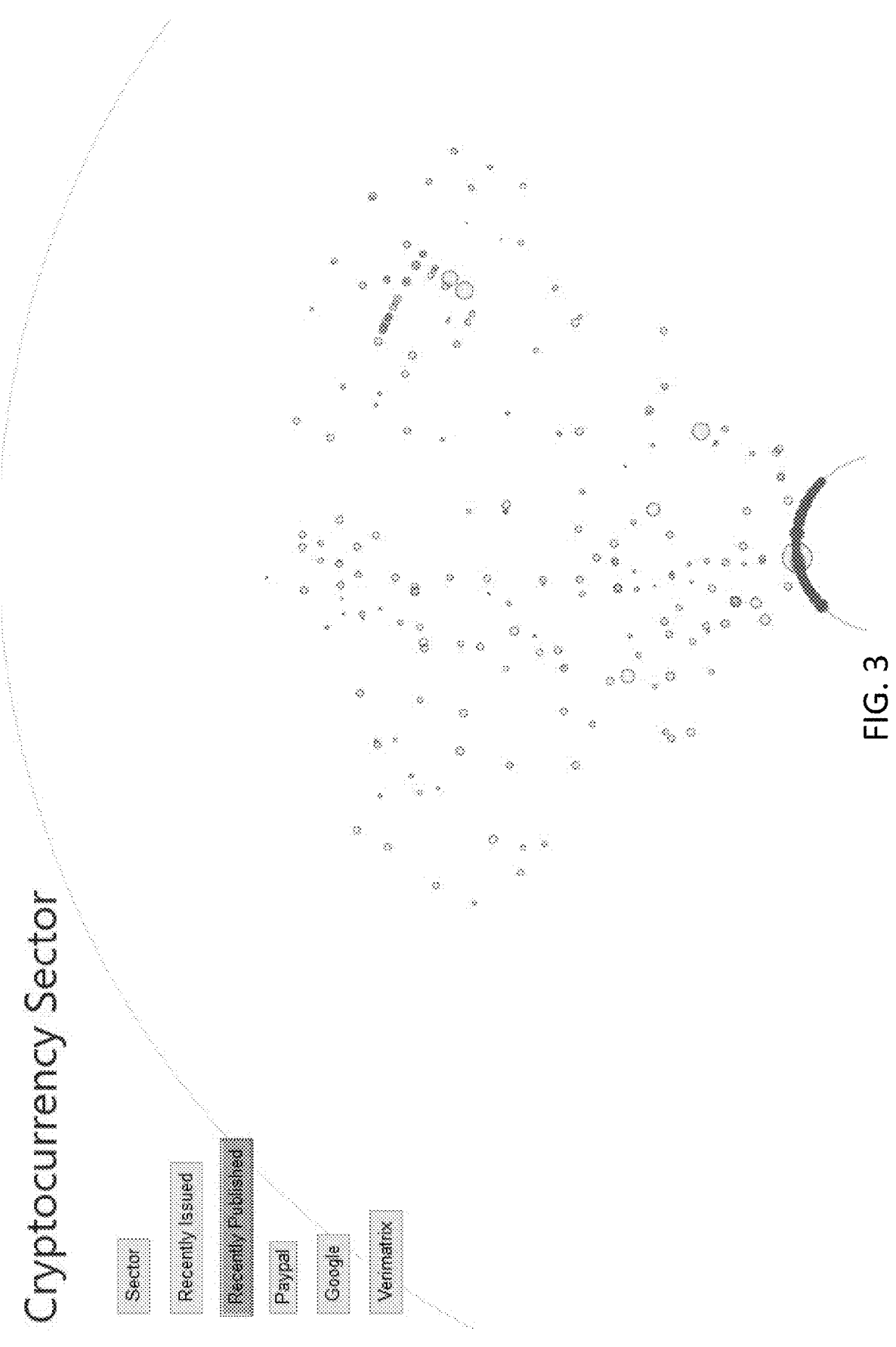
FIG. 3 is an image of a graphic user interface (GUI) according to one embodiment of the present invention.

The display provides for expanding and contracting time scales. In FIGS. 2 and 3, the diagram is displaying the recently issued patents or published applications, respectively. The current year's patent documents are displayed in an expanded manner, whereas the previous years' records are contracted onto the origin of the diagram.

Figure 4:
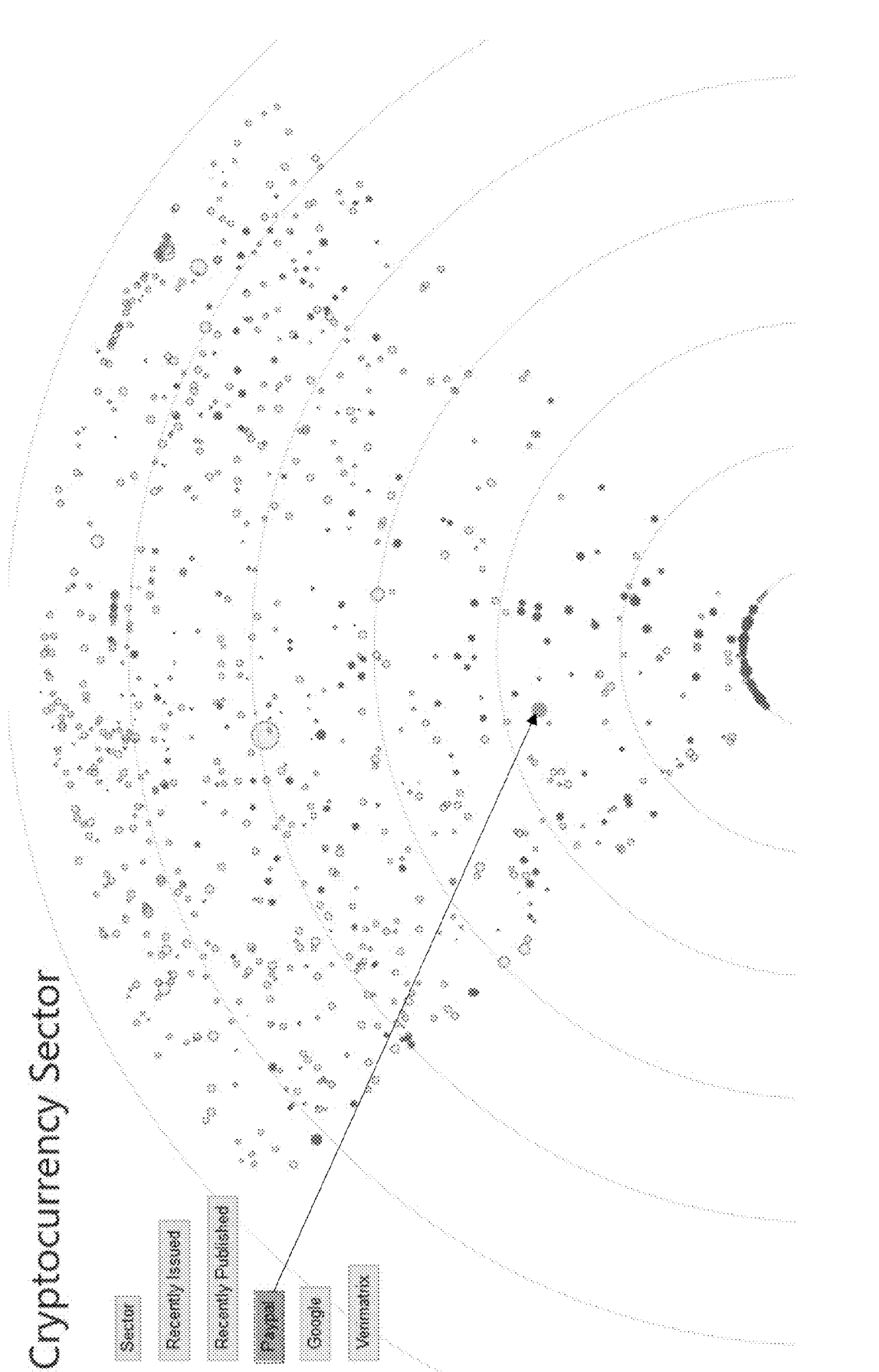
FIG. 4 is an image of a graphic user interface (GUI) according to one embodiment of the present invention.
Figure 5:
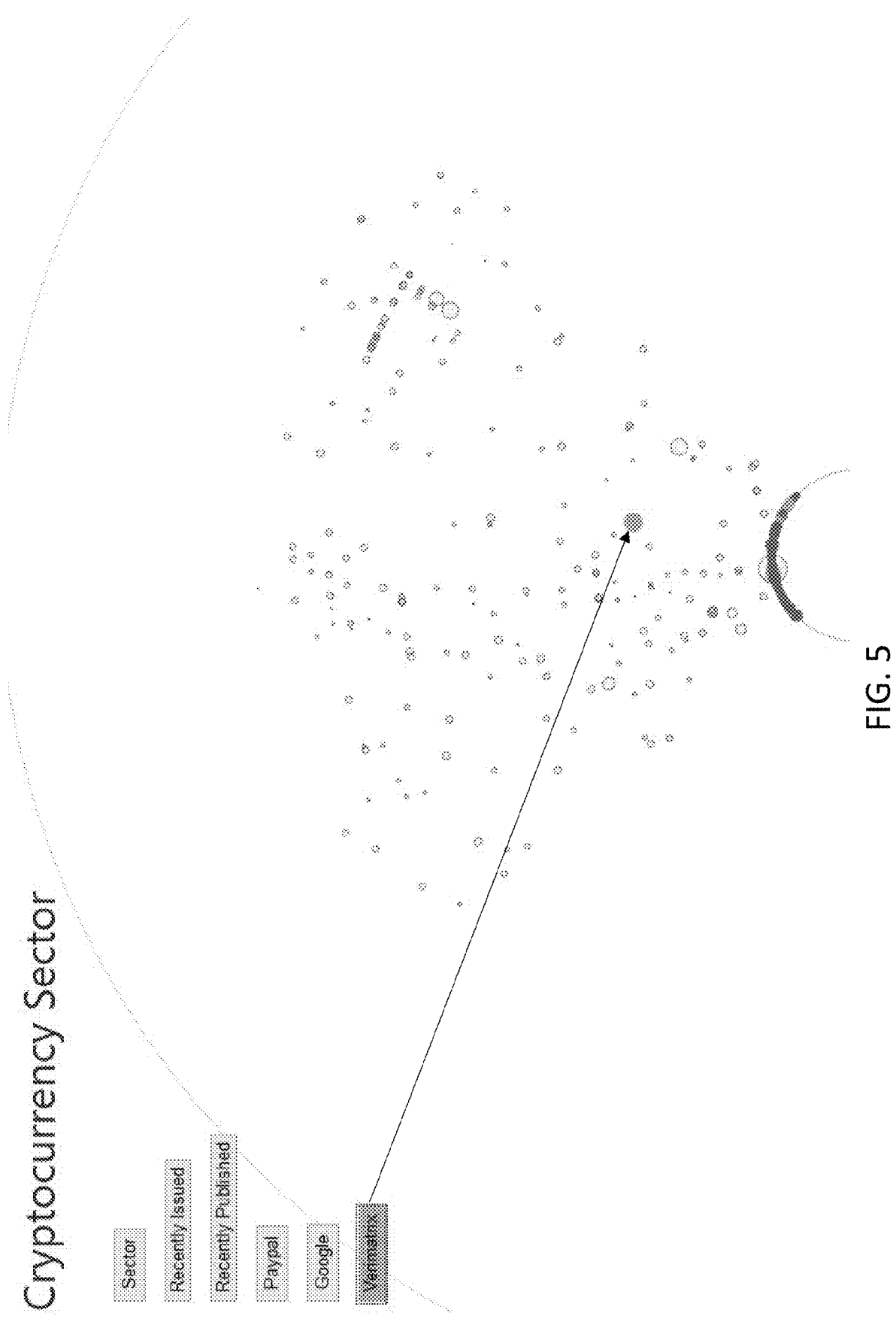
FIG. 5 is an image of a graphic user interface (GUI) according to one embodiment of the present invention.
Figure 7:
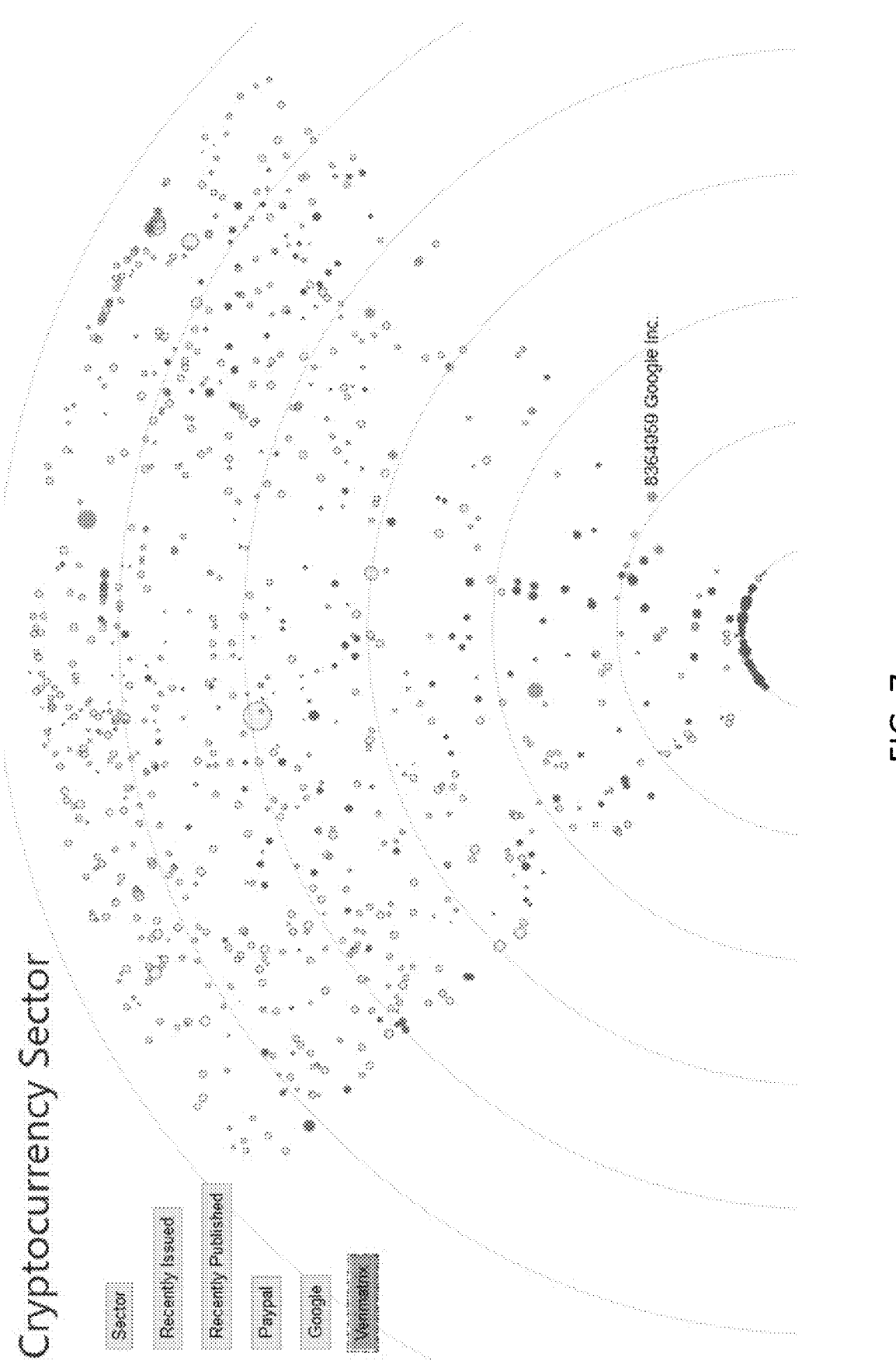
FIG. 7 is an image of a graphic user interface (GUI) according to one embodiment of the present invention.

The display provides for highlighting patent documents by assignee and other matching criteria. FIG. 4 shows a diagram with the assignee PAYPAL (RT) selected and the corresponding document highlighted. FIGS. 5 and 7 show diagrams with the assignee VERIMATRIX (RT) selected.

Figure 6:
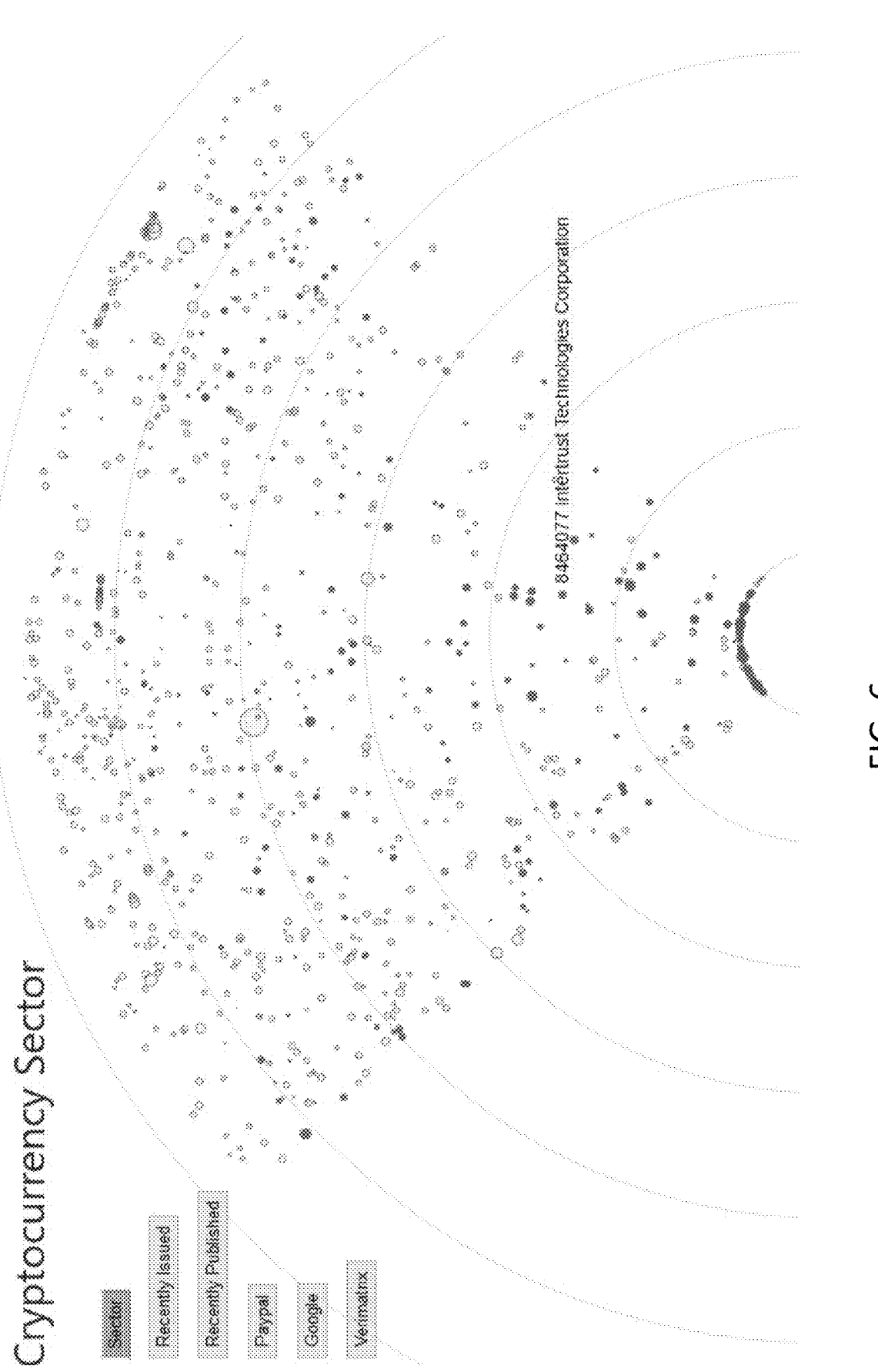
FIG. 6 is an image of a graphic user interface (GUI) according to one embodiment of the present invention.

The display provides for a roll-over pop-up of information, such as document number, assignee, title, abstract and the like. FIG. 6 shows a pop-up of the document number and the assignee. The display pop-up information is multi-platform aware, working on desktop, laptop, tablet, smartphone, and kiosk user interface technologies. The display pop-up enables the user to navigate to additional displays that provider more detailed information about the document, its components, and/or connected information. The system also provides for displaying records in bar charts by various criteria.

Figure 8:
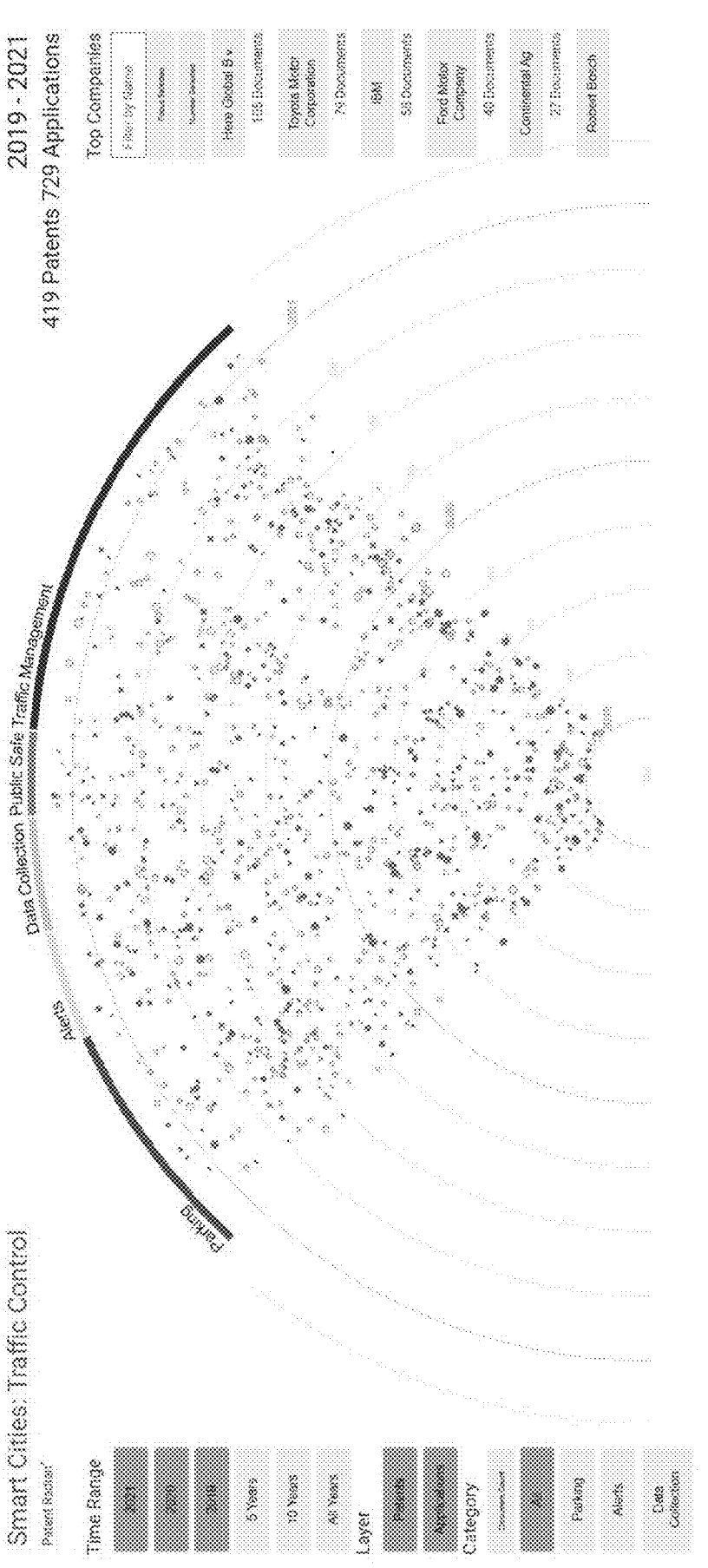
FIG. 8 is an image of a graphic user interface (GUI) displaying three years of data according to one embodiment of the present invention.
Figure 9:
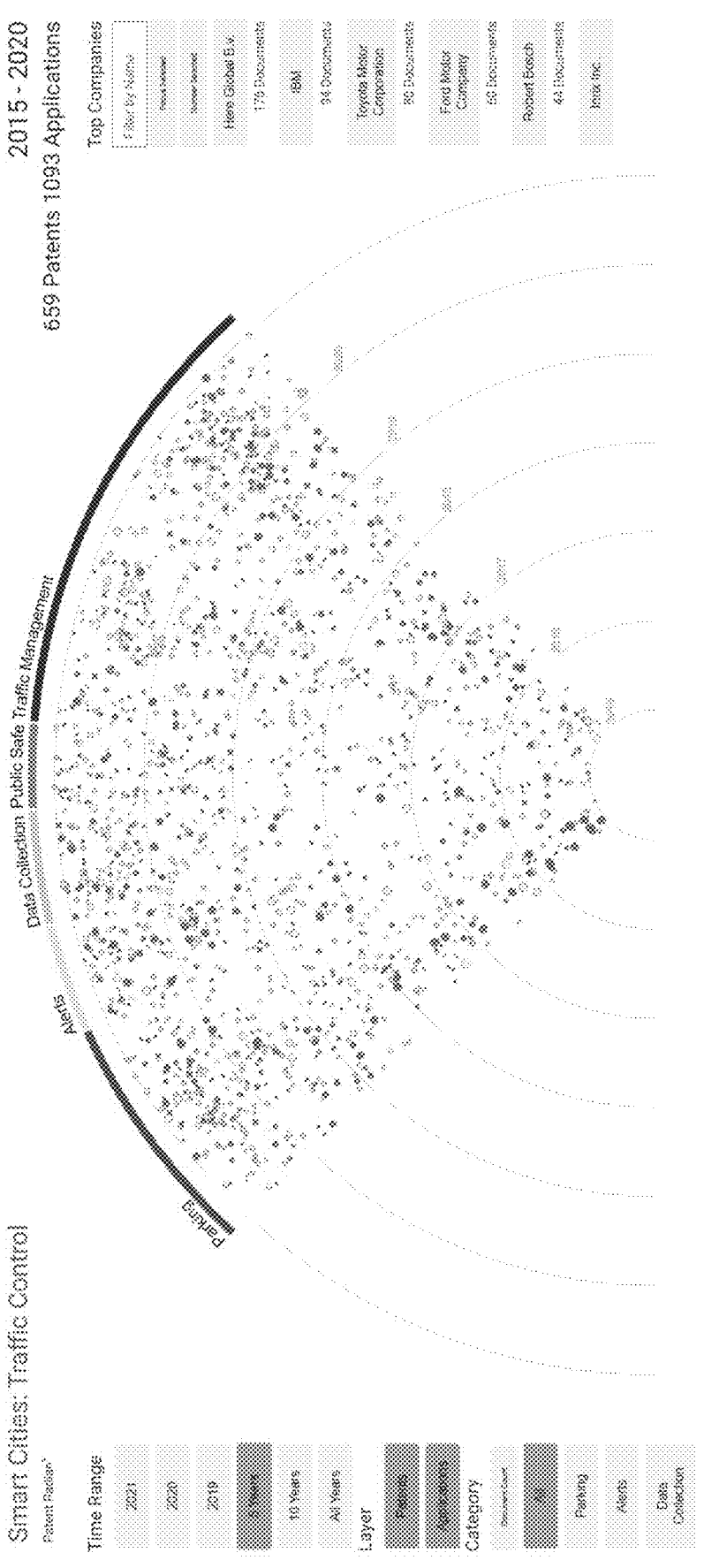
FIG. 9 is an image of a graphic user interface (GUI) displaying five years of data according to one embodiment of the present invention.

As shown in FIGS. 8 and 9, in one embodiment, the display provides for a selection of a time scale for the radial plot by a user device. In one embodiment, the time scales able to be selected for the radial plot include each of the previous three years (individually or in any combination), the previous five years, the previous ten years, and/or all years. In one embodiment, all years is defined as the oldest publication or issue date of any document provided with a category label within the technological sector associated with the display and all years subsequent to the oldest publication or issue date. Alternatively, in one embodiment, the time scales able to be selected includes at least one year within the range of all years.

Figure 10:
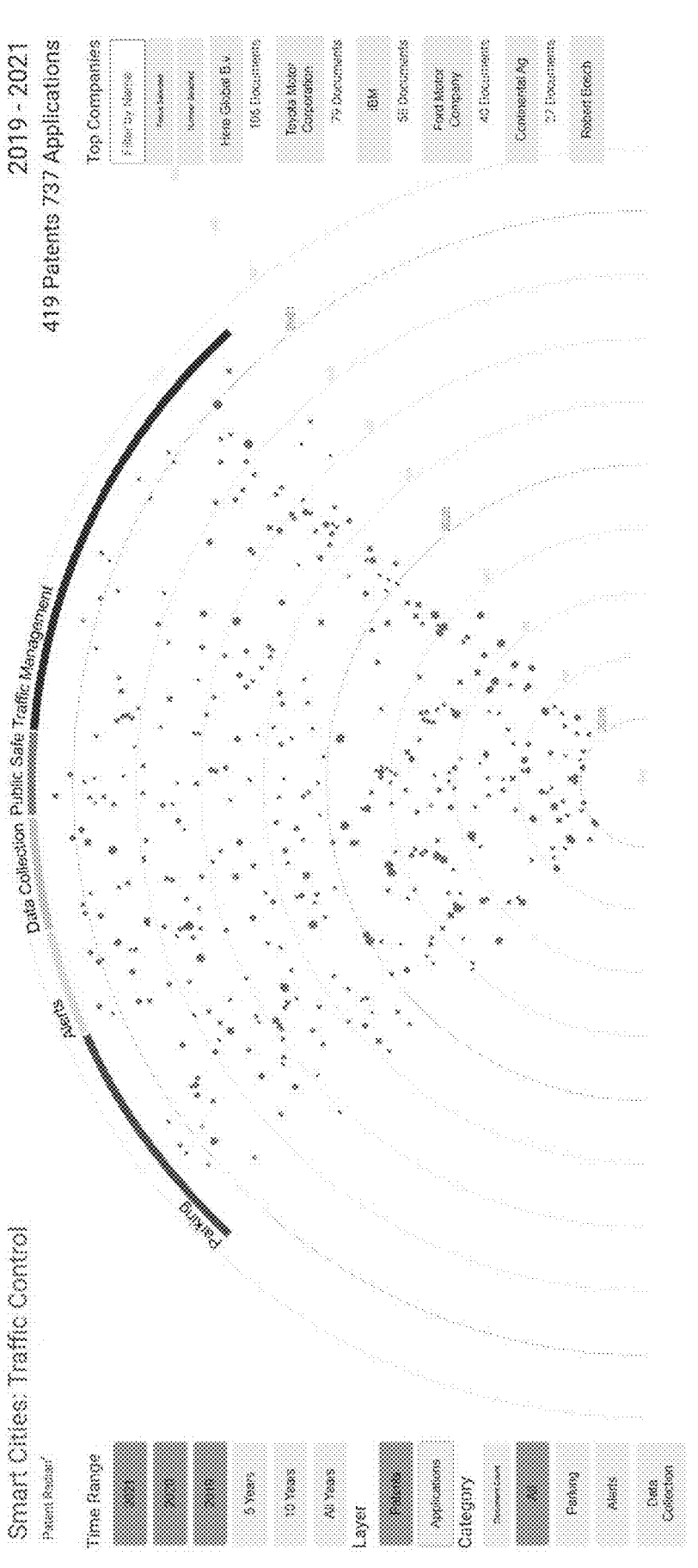
FIG. 10 is an image of a graphic user interface (GUI) displaying only issued patents according to one embodiment of the present invention.
Figure 11:
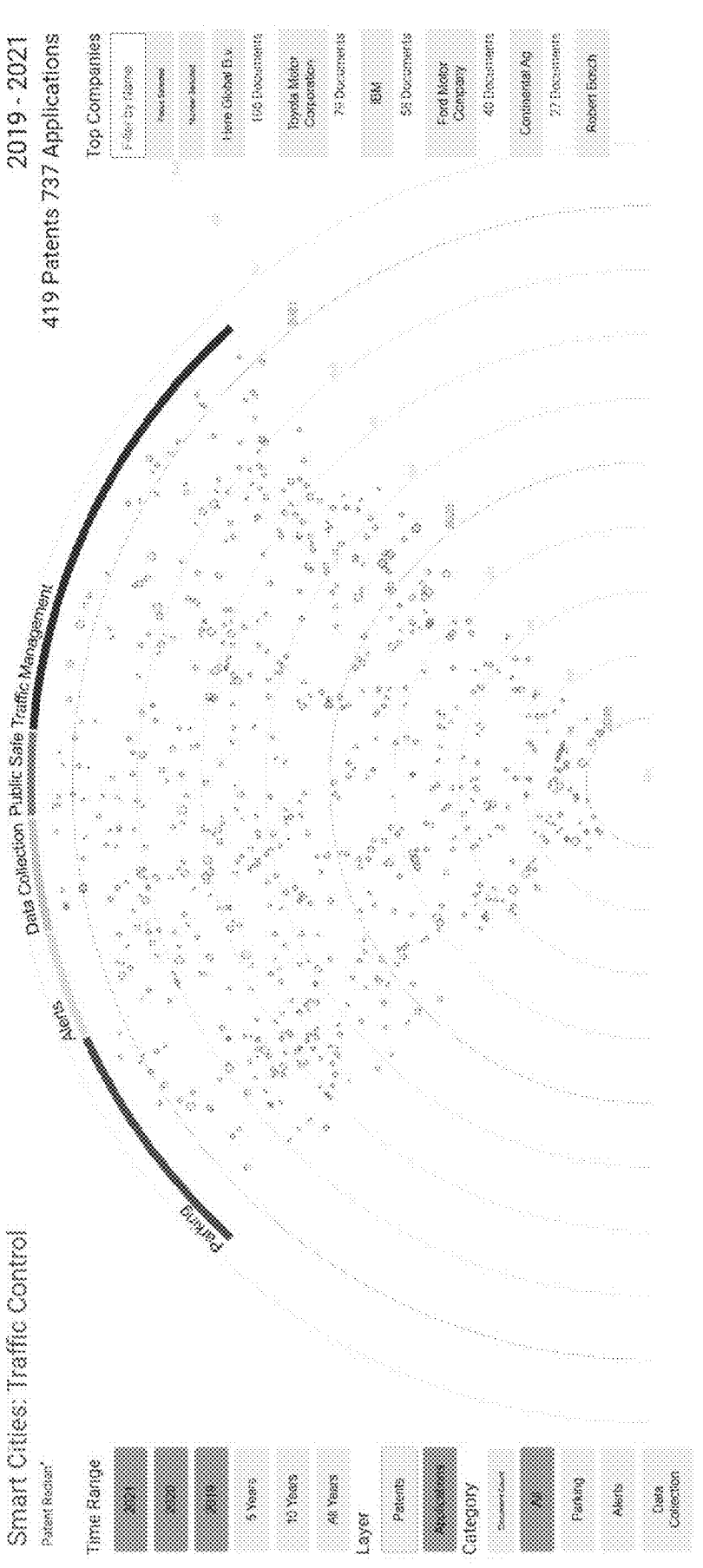
FIG. 11 is an image of a graphic user interface (GUI) displaying only published applications according to one embodiment of the present invention.

In one embodiment, the top perimeter of the radial plot of the display includes one or more color-coded sections corresponding to one or more categories within the technological sector associated with the display, each with a corresponding display label. In one embodiment, the display includes a list of assignees with a corresponding number of documents displayed adjacent to the name of each assignee. In one embodiment, the list of assignees includes the assignees with the largest number of documents assigned a category label within the technological sector associated with the display. As shown in FIGS. 10 and 11, in one embodiment, the display allows for the inclusion of only patents, only published applications, or both patents and published applications. As shown in FIG. 10, only patents are included in the radial plot of the display, as indicated by the radial plot only including filled circles. As shown in FIG. 11, only published applications are included in the radial plot of the display, as indicated by the radial plot only including unfilled circles.

Figure 12:
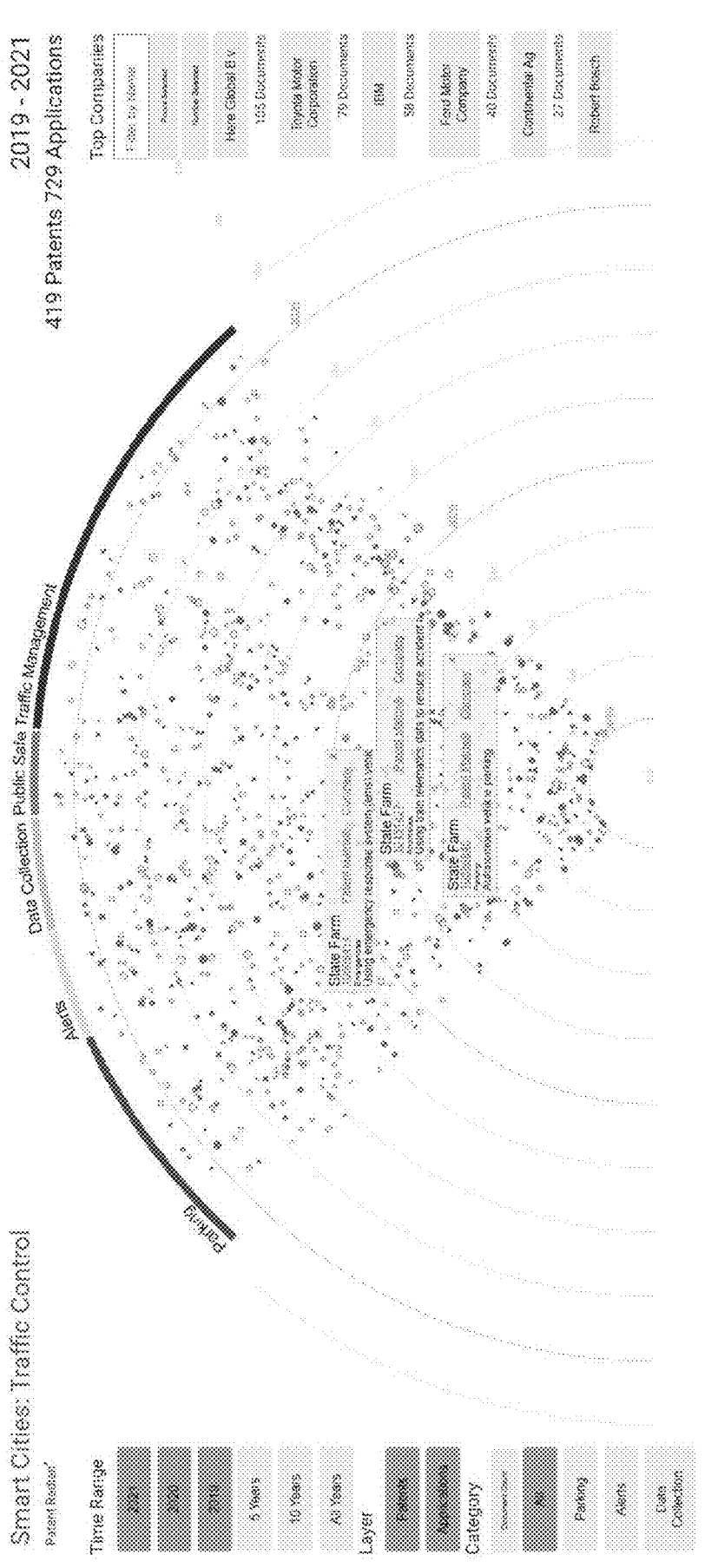
FIG. 12 is an image of a graphic user interface (GUI) according to one embodiment of the present invention.

As shown in FIG. 12, the display allows for click selection of each individual document. In one embodiment, click selection of each individual document generates a pop-up display providing one or more links correspond to the individual document, as well as the name of the assignee of the document and/or the name of the document. The display is able to display a plurality of pop-ups simultaneously, with each of the plurality of pop-ups able to be individually closed.

Figure 13:
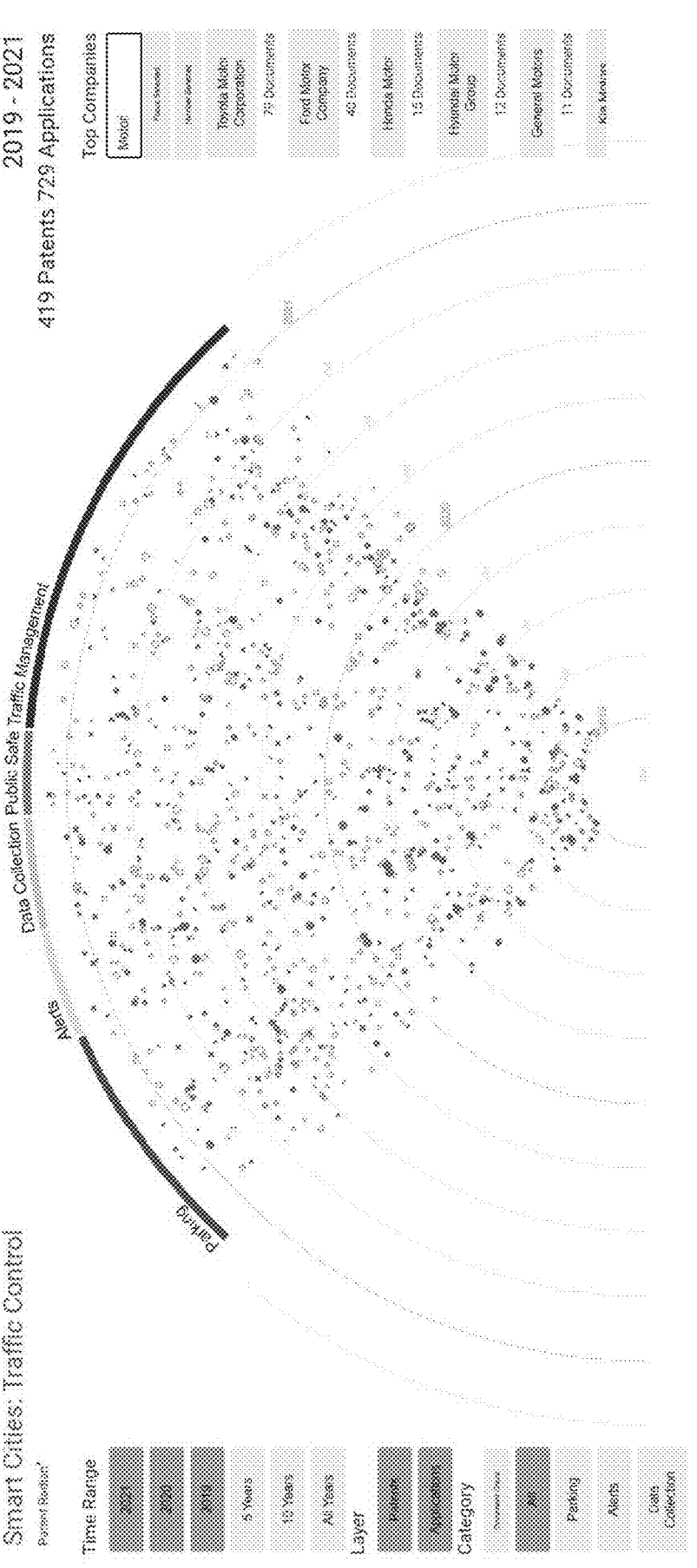
FIG. 13 is an image of a graphic user interface (GUI) including an assignee retrieval interface according to one embodiment of the present invention.

As shown in FIG. 13, in one embodiment, the display provides search functionality for generating a list of assignees associated with a search term. The list of assignees generated includes a number of documents associated with each assignee. In another embodiment, the display provides search functionality for generating a list of documents associated with a search term. In another embodiment, the display provides search functionality for generating a list of inventors associated with a search term, with a number of documents associated with each inventor displayed.

Figure 14:
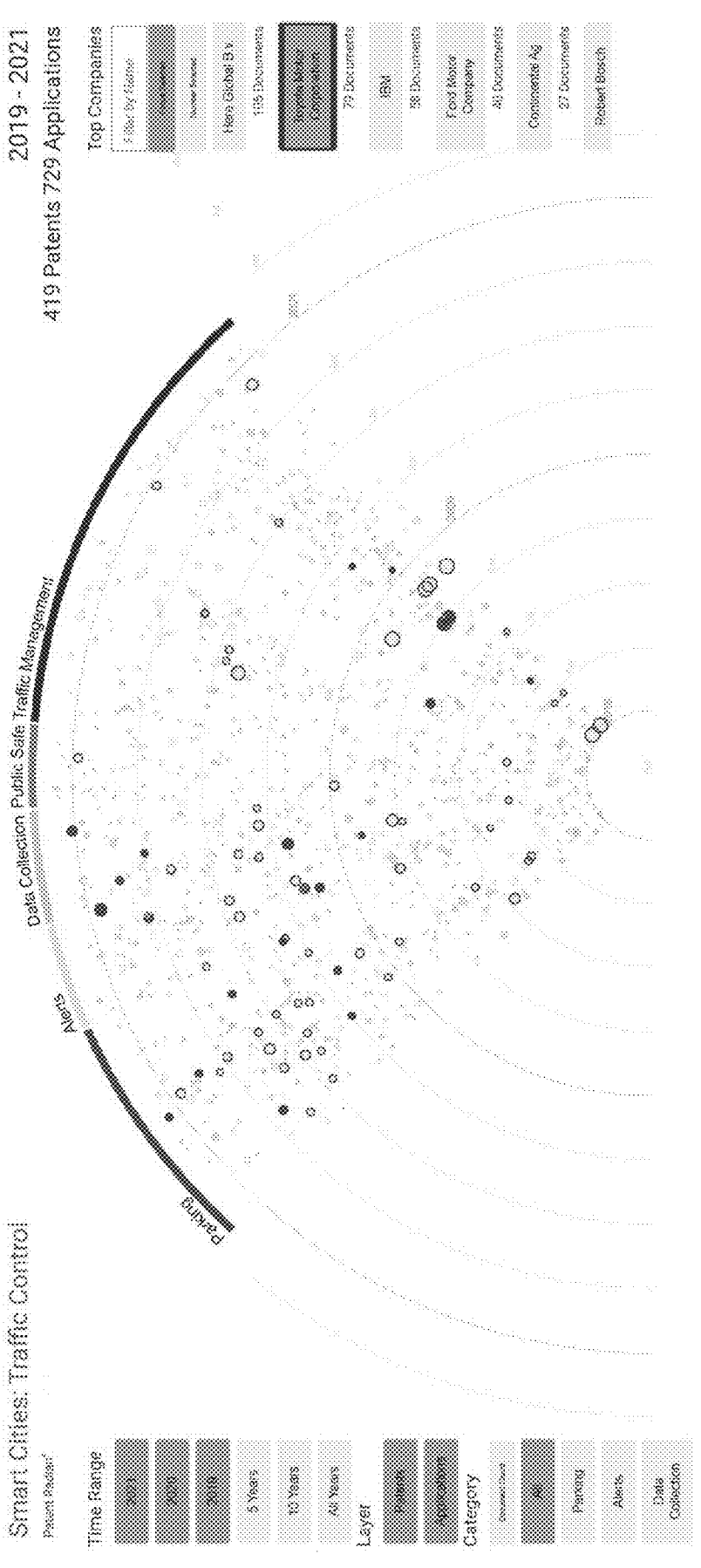
FIG. 14 is an image of a graphic user interface (GUI) with documents from a single assignee selected according to one embodiment of the present invention.

FIG. 14 is an image of a graphic user interface (GUI) with documents from a single assignee selected according to one embodiment of the present invention. In one embodiment, selecting an assignee causes graphics corresponding to documents not assigned to the selected assignee to fade, while graphics corresponding to documents assigned to the selected assignee to be differently colored and/or shaded. By providing graphics corresponding to documents assigned to the selected assignee to be different colored, the display allows users to more easily visualize in what years and in what categories the selected assignee has been most active. In one embodiment, more than one assignee is able to be selected at one time, with the graphics corresponding to each assignee having the same or different coloration and/or shading.

Figure 15:
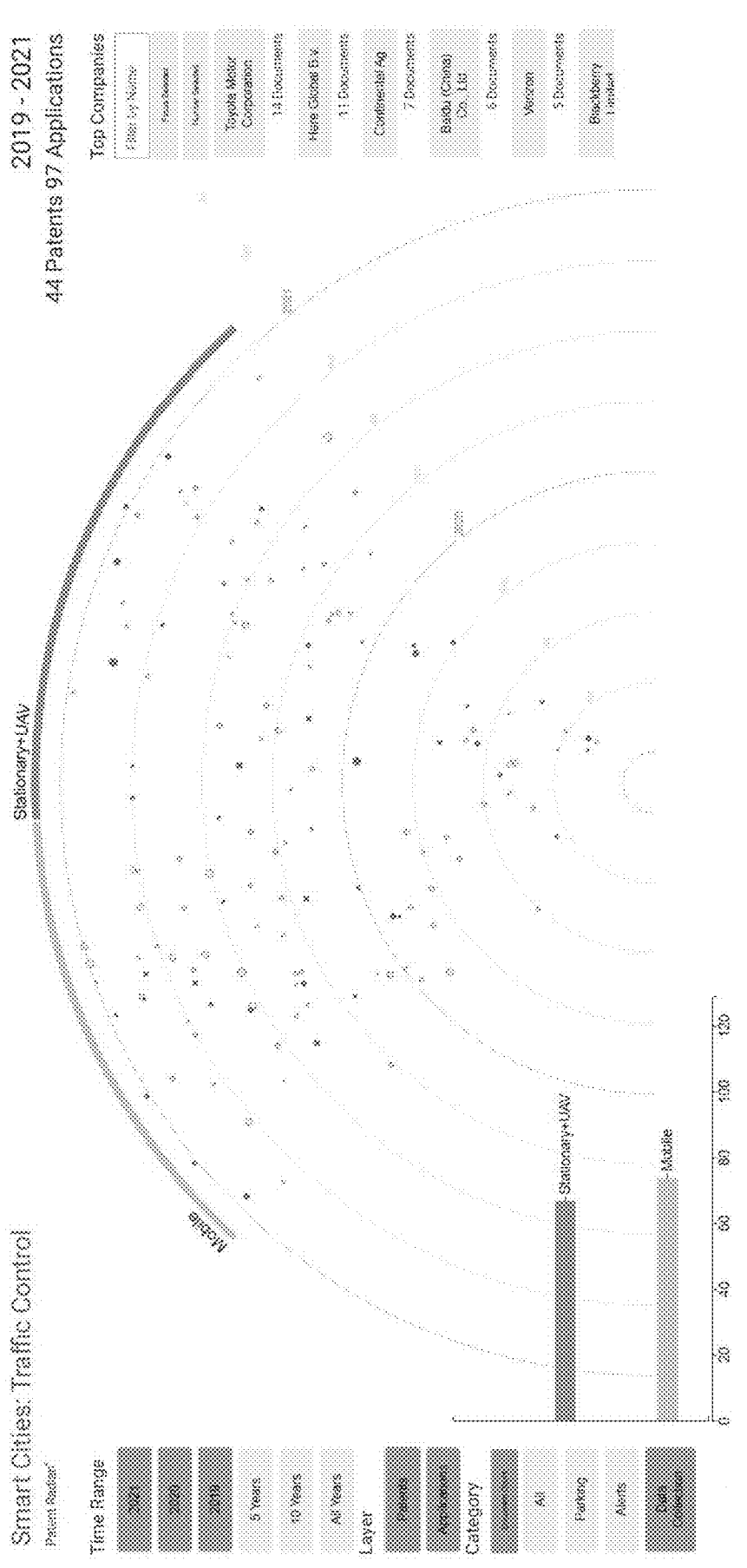
FIG. 15 is an image of a graphic user interface (GUI) displaying a single category according to one embodiment of the present invention.
Figure 16:
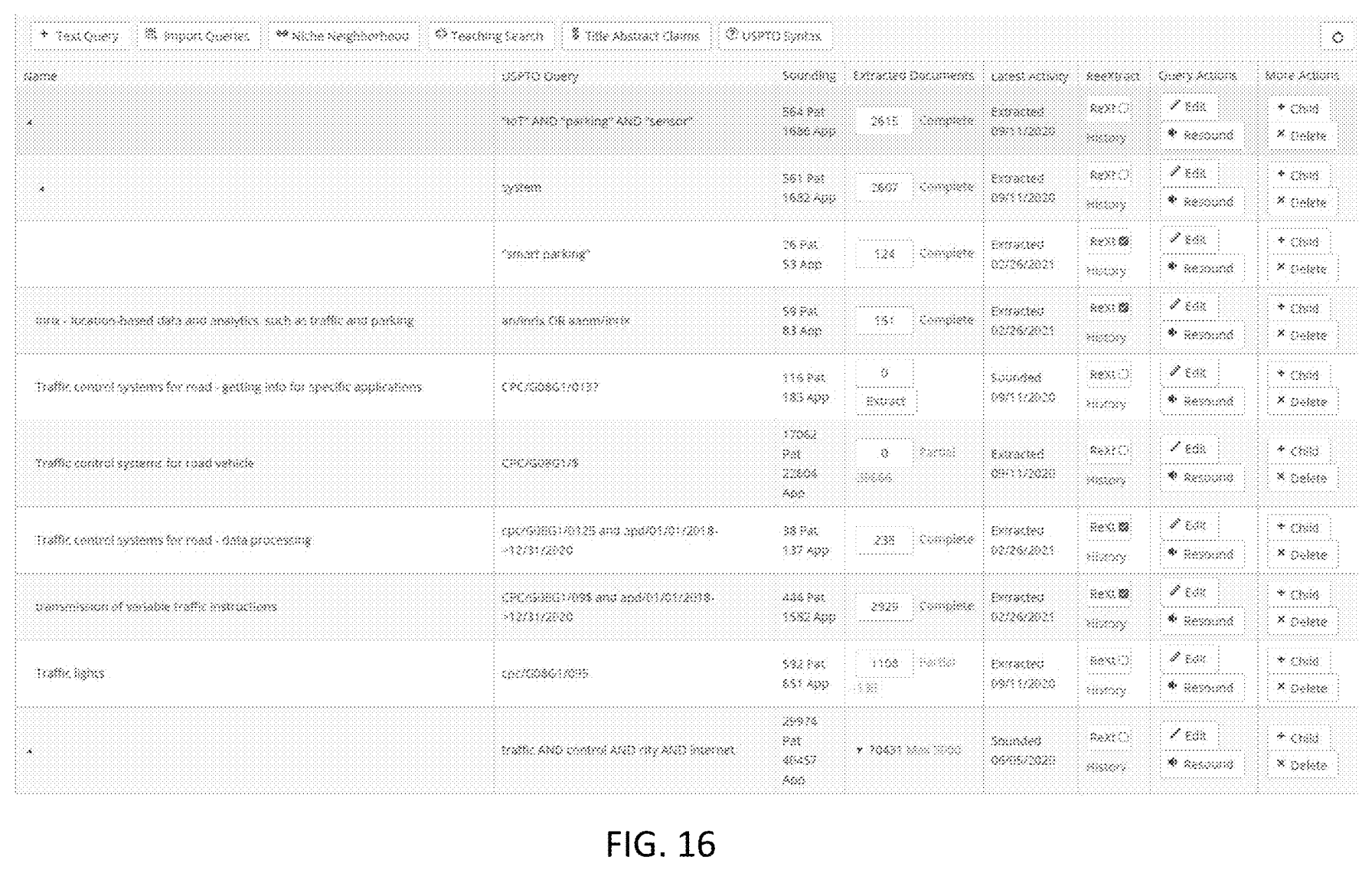

The display allows users to select a specific category within the technological sector associated with the display, as shown in FIG. 15. When a category is selected, the radial plot changes such that the top perimeter of the radial plot includes one or more color-coded sections corresponding to one or more subcategories of the selected category, each with a corresponding display label. The updated radial plot only includes documents provided with a label associated with the selected category. In one embodiment, the display includes at least one plot illustrating the number of documents in each of the one or more subcategories. In one embodiment, the at least one plot includes at least one horizontal bar chart, at least one vertical bar chart, at least one pie chart, and/or at least one other type of chart indicating the relative number of documents in each subcategory. In order to retrieve documents relevant to a technological sector, in one embodiment, the at least one server platform provides for the creation of a session associated with the technological sector. The session includes at least one query module, as shown in FIG. 16, which allows at least one user device to enter one or more search queries. The at least one server platform retrieves one or more patent documents corresponding to the one or more search queries from at least one national patent database. In one embodiment, the at least one server platform is operable to determine the number of patent documents corresponding to the one or more search queries, also known as sounding the one or more search queries, without importing the one or more patent documents into the session. The at least one user device is operable to instruct the at least one server platform to extract the one or patent documents and import each document into the session.

In one embodiment, the at least one server platform provides for the automatic creation of a session associated with a technological sector, using the intelligence engine module. Wherein the at least one server platform, using the intelligence engine, is operable to perform topic extraction for simple key words and is further operable to perform a patent document search for the key words in the descriptions of the claims and the claims. Wherein the session includes at least one query module, which is automatically extracted at set time intervals, such as, but not limited to, twice a week. The at least one server platform is operable to run categorization algorithms or clustering based on the original trained intelligence engine, or the at least one server platform performs a combination of categorization algorithms and clustering to generate a set of clusters, wherein a representation model takes the most frequent keywords from each cluster and creates a tag/category label in natural language for that cluster.

In one embodiment, the at least one server platform is operable to automatically create a technology sector about a company, including, but not limited to, company inventions and competitor inventions.

In one embodiment, the at least one server platform is operable to automatically create a technology sector associated with a specific patent document provided by a user.

In one embodiment, the at least one server platform is operable to automatically create a session based on a CPC classification code.

In one embodiment, the at least one server platform is operable to use a large learning model (LLM)-based topic extraction system to accept user input in natural language and synthesize a set of session queries that match the user query. In one embodiment, the at least one server platform is operable to use LLM-based topic extraction to combine company, individual document, CPC code, and keyword searches into a single session.

In one embodiment, the at least one server platform is operable to use a domain-specific semantic model trained to understand longer texts and claims of patent documents to provide enhanced category tag suggestion performance.

In one embodiment, the at least one server platform is operable to perform hierarchical clustering, operable to group lower-level categories into higher level clusters of patent documents. In one embodiment, the intelligence engine of the at least one server platform is operable to perform confidence-based tagging and outlier tagging of patent documents. In one embodiment, the intelligence engine of the at least one server platform is operable to automatically update technology sectors and sessions. In one embodiment, the at least one server platform is operable to perform graphics processing unit (GPU)-accelerated tagging. In one embodiment, the at least one server platform is operable to perform relevance detection algorithms when performing automated tagging of category tags to patent documents. In one embodiment, the at least one server platform is operable to perform CPC code tagging by adding primary CPC code category tags to patent documents.

Figure 17:
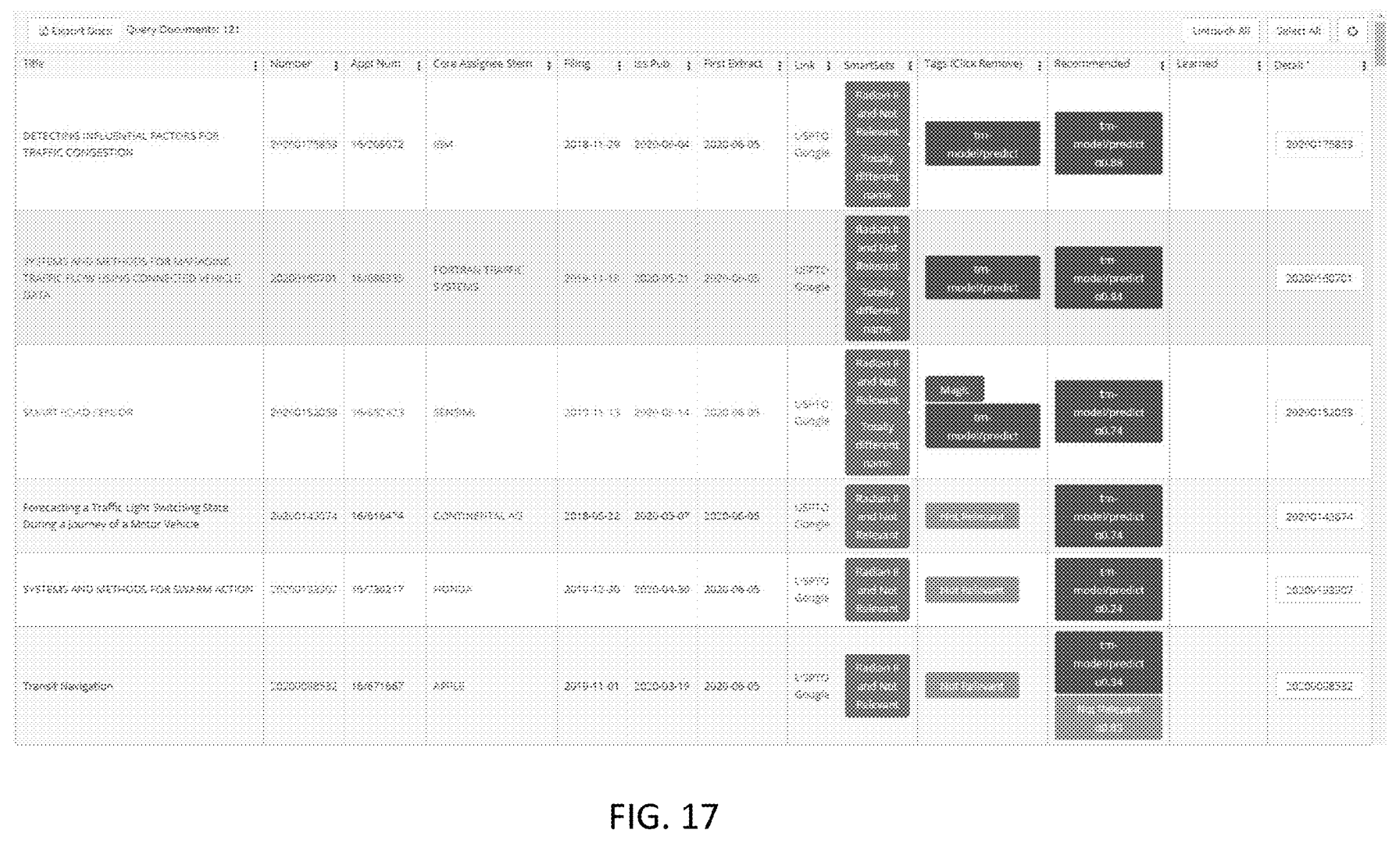

FIG. 17 is a screen view of a query results interface according to one embodiment of the present invention. Click selection of an individual query causes the at least one server platform to generate a list of query results, including each patent document imported as a result of the individual query. If multiple queries retrieve the same patent document, the patent document is not imported into the session for a second time, such that duplicate documents are not included in a single session. In one embodiment, the list of query results includes a name, application number, a publication number and/or a patent number, an assignee name, a filing date, a publication date, a date of extraction, at least one link to a national patent database, and/or a list of applied category labels for each patent document. When a user clicks on, or otherwise selects, a patent document and selects a category label, the GUI is operable to add or remove the selected category label from the selected patent document. In one embodiment, the at least one server platform includes a list of all documents without a category label and/or a list of all documents with at least one category label. In one embodiment, the list of query results further includes at least one artificial intelligence-generated suggestion for at least one of the patent documents on the list of query results. In one embodiment, the list of query results is able to be sorted alphabetically by the name of the document, sorted numerically by application number, publication number, and/or patent number, sorted chronologically or reverse chronologically by filing date, publication, and/or date of extraction, and/or sorted depending on whether each document has at least one assigned category label.

In one embodiment, category labels applied to a patent document in one session are not assigned to the patent document if it is imported into another session. In another embodiment, category labels applied to a patent document in one session are automatically assigned to the patent document when it is imported into another session. In one embodiment, the at least one server platform enables a user device to automatically "send" at least one patent document to another session. For example, if a document appears relevant to "semiconductors" in a healthcare related sector, then the user device is able to selectively send the document to the semiconductor sector. In one embodiment, sending the document to another sector deletes the copy of the document from the sector from which it was sent. In another embodiment, sending the document to another sector does not delete any copy of the document, but merely causes the document to also be imported into the destination sector. In one embodiment, each session includes an associated "sent folder" including all documents sent from another session. If a sent document was already in the session before being sent, then the send folder will not create a duplicate document and any category labels assigned to the document within the session will still be applied to the document within the sent folder.

In one embodiment, the at least one server platform includes at least one document importer module. The document importer module allows a user device to automatically import one or more patent documents into a session by entering a unique identifier, such as an application number, a publication number, or a patent number, for each of the one or more patent documents. In another embodiment, the document importer module further allows a user to specify at least one category label for each imported document, causing the document to automatically be assigned the at least one category label when it is imported into the session. Furthermore, if the document already exists within the session, then the document will be applied the at least one category label.

In one embodiment, the at least one server platform automatically re-sounds at least one search query at one or more predetermined times and automatically imports each of the sounded patent documents. In one embodiment, the automatic resounding and automatic importing is performed by at least one extractor module. In one embodiment, the at least one extractor module includes a plurality of extractor modules. When one extractor module goes offline or is unable to perform automatic resounding and/or automatic importing for a particular sector, the at least one server platform is operable to reassign a different one of the plurality of extractor modules to perform the automatic resounding and/or automatic importing for that particular sector. Therefore, the at least one server platform is able to better avoid errors that may occur with individual extractor modules.

By rerunning search queries, the session is able to add newly published and/or newly issued patent documents within the technological sector such that a user is able to easily keep up to date with the technological sector. As shown in FIG. 18, the at least one server platform includes a query scheduler displaying the number of new documents imported from each automatic re-sound. The query scheduler allows a user device to display a query results page only including the documents imported since the previous re-sound. By only displaying new documents, the query scheduler allows a user to more narrowly focus on updated documents, rather than sorting through all the results from every result in each query after every re-sound.

FIG. 19 is a screen view of a tag creation interface according to one embodiment of the present invention. In one embodiment, the tag creation interface allows a user device to generate one or more category labels. In one embodiment, the user device is operable to select whether each category label is only to be applied to a particular session or to all sessions. In one embodiment, the tag creation interface enables a user device to select a name, color, display name, display order, display category, and/or purpose for each category label. In one embodiment, each category label is also operable to be designated as private. In one embodiment, each session includes at least one core category label and at least one non-core category label. Each patent document within the session is able to be assigned more than one non-core category label, but is only able to be assigned a maximum of one core category label. Alternatively, in another embodiment, a patent document is able to be assigned more than one core category label. In one embodiment, at least one shortcut key is able to be assigned to each category label, such that a user device is operable to assign a patent document a category label by pressing the assigned at least one shortcut key.

In one embodiment, a patent document only appears on the radial plot associated with a particular session if the patent document is assigned at least one category label having a display order, display label, and/or a display category. In another embodiment, a patent document does not appear on the radial plot when it is assigned one or more category labels each having a display order, display label, and/or display category if each of the one or more category labels is also designated as private. In one embodiment, the at least one server platform generates a list of display categories based on the display category assigned to each category label. In another embodiment, the list of display categories only includes display categories associated with category labels that include a display order and/or display label, and which have been applied to at least one patent document. In one embodiment, when a radial plot associated with a particular session is opened, the categories displayed surrounding the upper perimeter of the radial plot include each entry on the list of display categories. In one embodiment, the color associated with each category displayed surrounding the upper perimeter of the radial plot is equivalent to the color assigned to at least one category label that designates the respective display category. In one embodiment, when a user device selects the option to only display a particular category on the radial plot, the subcategories shown on the upper perimeter of the radial plot include the display label of each category label designating the selected display category. The color associated with each subcategory is equivalent to the color assigned to the corresponding category label.

Figure 20:
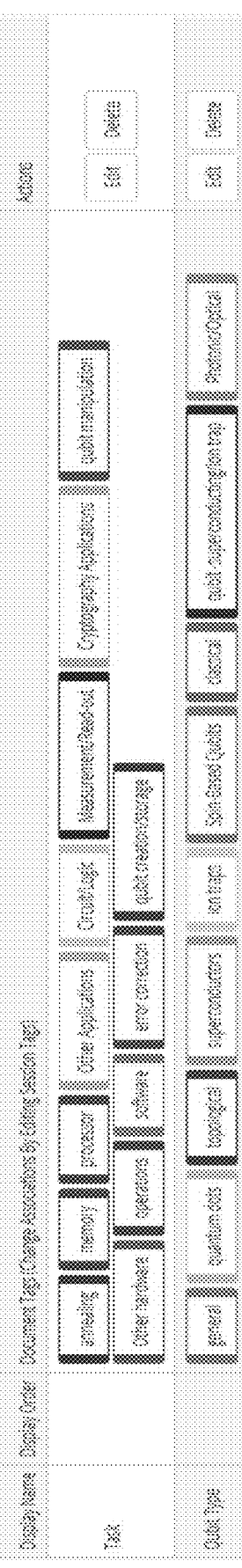
FIG. 20 is a screen view of a tag set organizer according to one embodiment of the present invention.

The at least one server platform enables a user device to create one or more tag sets. Each category label is able to be assigned to a tag set. In one embodiment, the tag creation interface allows a user device to specify a tag set to which the category label is assigned. In another embodiment, the at least one server platform includes a tag set management interface, as shown in FIG. 20. The tag set management interface is configured to receive user input via the user device to drag and drop category labels into and out of different tag sets and enables the user device to delete tag sets entirely. In one embodiment, if the user device deletes a tag set, the category labels assigned to the deleted tag set are not automatically deleted. In one embodiment, each patent document is only able to be assigned a maximum of one category label from each tag set.

In one embodiment, tag sets are able to designated with a rank and an order. If a tag set is designated with a rank of one, then the tag set is a primary tag set. If a tag set is designated with a rank of two, then the tag set is a secondary tag set. The radial plot is operable to radially group patent documents based on which category label within the primary tag set each patent document has been assigned. In one embodiment, if a patent document has not been assigned a category label from the primary tag set, then it does not appear on the radial plot. Display labels and colors corresponding to each category label within the primary tag set appear along the top perimeter of the radial plot. In one embodiment, only one tag set is able to be assigned a rank of 1. When a category is selected to be displayed on the radial plot, then the radial plot will group each patent document within the category based on which category label within a secondary tag set each patent document has been assigned. In one embodiment, if there is more than one secondary tag set, the radial plot will group each patent document based on the category label each patent document has been assigned within the secondary tag set with the lowest order. If multiple secondary tag sets have the same order, then the radial plot will group based on the alphabetical order of the name of each secondary tag set. In one embodiment, if a patent document has been assigned a category label from the primary tag set, but has not been assigned any category label from a secondary tag set, then the patent document will automatically be grouped into a subcategory designated "uncategorized." In another embodiment, if a patent document has been assigned a category label from the primary tag set, but has not been assigned any category label from a secondary tag set, then the patent document will not appear on the radial plot.

In one embodiment, if multiple tag sets have the same rank, then a user device is operable to select which tag set of the rank will be used to group the patent documents. For example, if the patent documents within a selected category are automatically grouped by category labels in a first secondary tag set, then a user device is able to select a second secondary tag set, which causes the at least one server platform to automatically repopulate the radial plot such that the patent documents within the selected category are automatically grouped by category labels in the second secondary tag set. In one embodiment, the at least one server platform is operable to repopulate the patent documents in the radial plot in real-time.

In one embodiment, the at least one server platform provides for an assignee search interface, as shown in FIG. 21. The at least one server platform is operable to automatically scrub the database for each imported patent document associated with an assignee name. The assignee search interface thereby retrieves a list of assignees associated with an entered search term. In one embodiment, the assignee search interface is operable to allow a user device to merge more than one of the assignee names on the list of assignees. Merging multiple assignees causes documents from both listed assignees to appear under a single name in the list of query lists and/or on the radial plot. Allowing a user to merge assignee names is advantageous especially in cases in which an assignee inconsistently lists its name on different applications, and in situations in which an assignee acquires another assignee. Without ensuring that assignee names are merged, the radial plot does not list the correct number of documents for a particular assignee in some situations. For example, if six documents list the assignee as "Company Inc.," six documents list the assignee as "Company," and six documents list the assignee as "Company Co.," then the radial plot would list each of these as three smaller assignees, rather than as a single assignee with a larger number of documents. In another embodiment, the at least one server platform includes an artificial intelligence assignee merger, which is trained to automatically merge assignees.

FIG. 22 is a screen view of an assignee detail interface according to one embodiment of the present invention. The assignee detail interface enables a user device to change the displayed name of the assignee, a summary of the assignee, a color associated with the assignee, a market profile, a corporate address, a logo, and/or a list of merged assignees associated with the assignee. In one embodiment, the color associated with the assignee is the color assigned to the symbols of the patent documents when the assignee is selected on the radial plot. In one embodiment, the assignee detail interface enables a user device to demerge two assignee names, causing each assignee name and documents associated with each assignee name to appear separately on the radial plot and/or list of query results.

Figure 23:
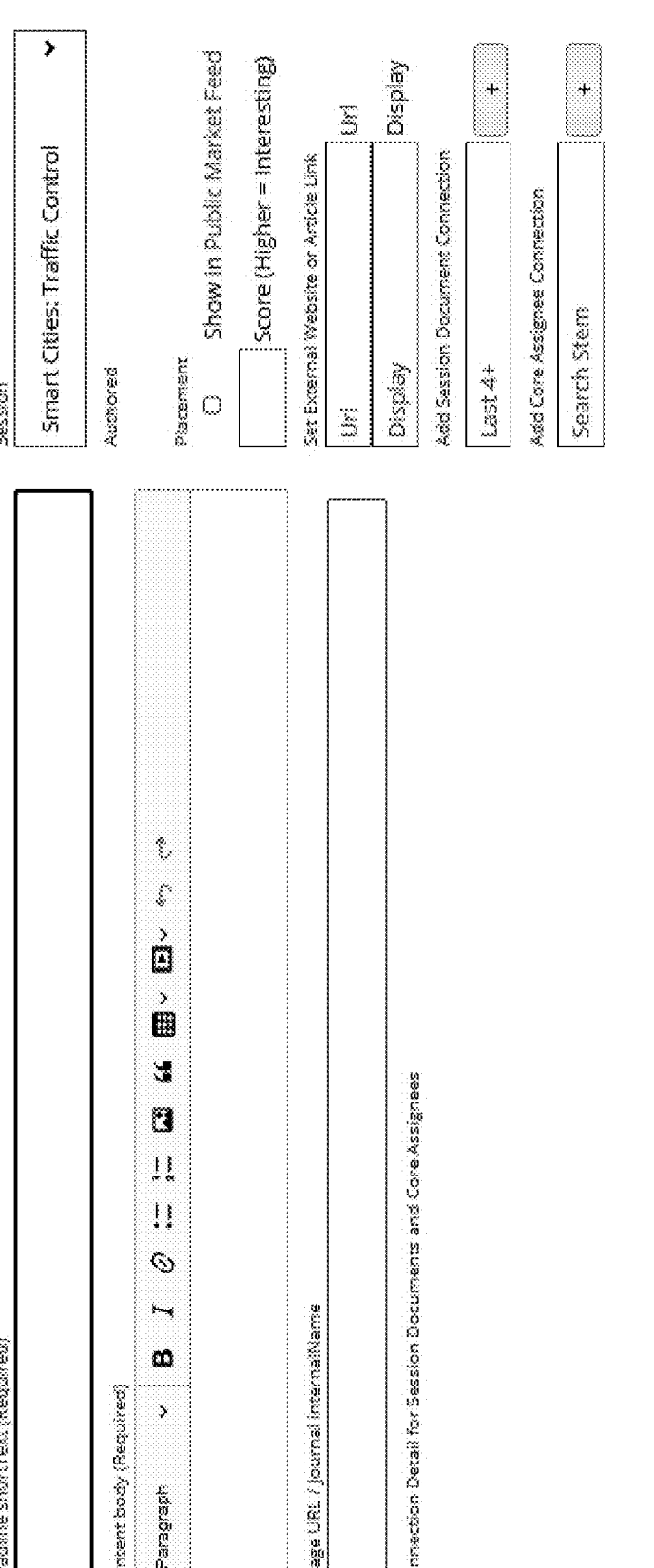
FIG. 23 is a screen view of an insight generator according to one embodiment of the present invention.

In one embodiment, the at least one server platform includes an insight generator, as shown in FIG. 23. The insight generator includes fields for generating an insight, including a name, a body of text, an image URL, an associated session, an external URL, at least one associated document, and at least one associated assignee. Insights provide a review and/or commentary on a technological sector and/or one or more patent documents associated with a particular session. Further, the insight generator allows a user device to designate each insight as public or private. In one embodiment, if an insight is designated as public, then the insight is automatically uploaded for public view and/or attached to an email distributed to a predetermined list of people at a predetermined time. In one embodiment, the insight generator is operable to be accessed and/or scrubbed by a compiler, wherein the compiler is operable to extract at least one insight from the insight generator and upload the at least one insight for public view.

Figure 24:
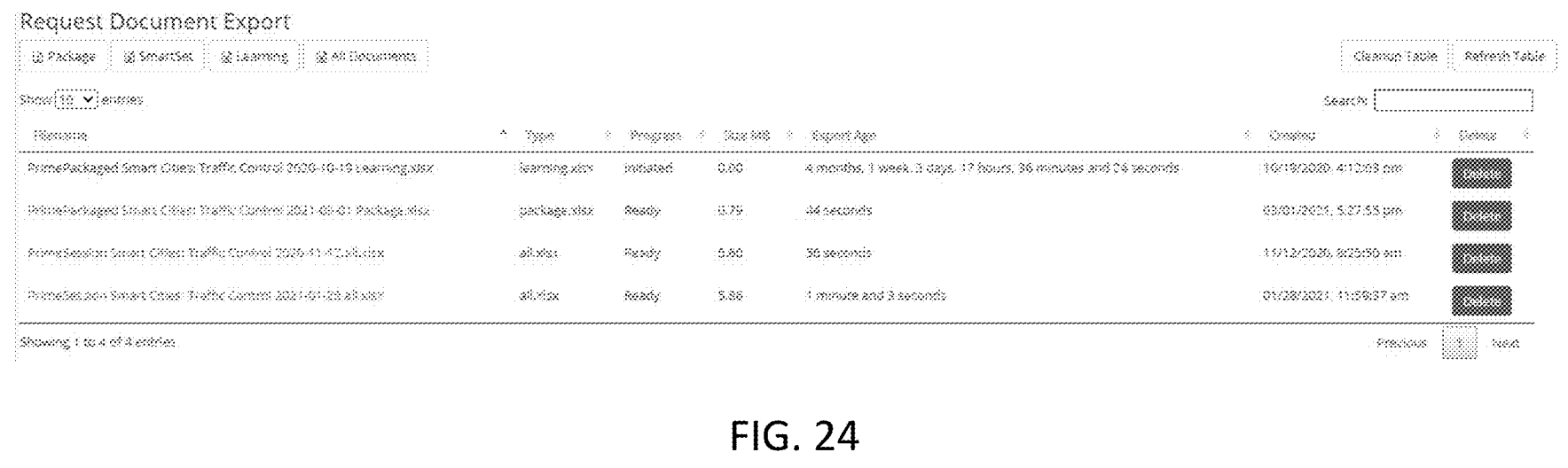

In one embodiment, the at least one server platform includes a document exporter, as shown in FIG. 24. The document exporter automatically generates at least one spreadsheet corresponding to all patent documents or a subset of patent documents within a particular session. The spreadsheet includes a name, an application number, a publication or patent number, a filing date, a publication or issue date, an extraction date, at least one link to a national patent database, an abstract, at least one CPC, at least one category label assigned to the patent document, and/or an assignee name for each patent document.

In one embodiment, the at least one server platform includes an analysis module for each session. In one embodiment, the analysis module is operable to generate at least one score for each assignee based on at least one of: a total number of patent documents assigned to the assignee, a percentage of published applications by the assignee that mature into issued patents, a number of patent documents assigned to the assignee in a particular time period, and/or a number of category labels applied to at least one patent document assigned to the assignee. In another embodiment, the at least one score for each assignee is further based on market data for the assignee, including at least one of: revenue data for the assignee, profit data for the assignee, a market capitalization for the assignee, a valuation for the assignee, a debt-to-equity ratio for the assignee, a price-to-earnings ratio for the assignee, a price-to-book ratio for the assignee, a free cash flow for the assignee, and/or a price/earnings-to-growth ratio for the assignee. In one embodiment, market data for the assignee is compiled via the operation of at least one web crawler. In one embodiment, the analysis module is operable to generate and display a list of top assignees, wherein the assignees are ranked according to the at least one score for each assignee.

In one embodiment, the at least one server platform generates an automatic alert whenever patent documents appear and are assigned to an assignee that previously had no patent documents in the session. In another embodiment, the automatic alert is generated when a number of patent documents are imported that exceeds a particular threshold number of patent documents and/or a particular threshold number of patent documents within a particular time period to an assignee that previously had no patent documents in the session. In one embodiment, the analysis module automatically calculates an average number of patents filed by an assignee, an average number of patents published for an assignee, and/or an average number of patents issued to an assignee over time (e.g. an average of 3 patents filed every year, an average of 7 patents issued every three months, etc.). In another embodiment, the analysis module provides an automatic alert if the number of patents filed, the number patent published, and/or the number of patents issued for a particular assignee over a particular time period differs considerably from the average number of patents filed, average number of patent published, and/or average number of patents issued to that assignee over a particular time period. In one embodiment, differing considerably is defined as one number being at least 25% greater than or less than another number. In another embodiment, differing considerably is defined as one number being at least 50% greater than or less than another number. In yet another embodiment, differing considerably is defined as one number being at least 100% greater than or less than another number. Alternatively, differing considerably is defined as a statistical measurement of a dataset. For example, differing considerably is defined as a first number being at least one standard deviation greater than or less than a second number, wherein the second number is based on the dataset.

In one embodiment, the at least one server platform is connected to at least one internal database. In one embodiment, every time a document is imported into an individual session, the document is added to the at least one internal database. The at least one internal database provides search functionality for individual documents as well as a listing of all category labels assigned to each patent document in every session. In one embodiment, the search functionality is operable to allow a user to search for patent documents by category, corresponding to at least one CPC code, at least one International Patent Classification (IPC) code, at least one category label, or another categorization scheme. In one embodiment, the search functionality is operable to return a ranked listing of the most relevant documents based on the category selected and at least one keyword. In one embodiment, the AI model is operable to automatically rank the relevancy of the documents based on the number of times the at least one keyword appears in the patent document as a whole, the number of times the at least one keyword appears in the claims, the number of times the at least one keyword appears in the abstract, the number of times the at least one keyword appears in the description, and/or other factors. In another embodiment, the at least one internal database automatically imports all or substantially all patent documents from at least one national patent database, not just those that are imported into individual sessions.

In one embodiment, the at least one server platform includes an inventor investigation module. For applications imported into a session that are associated only with at least one individual inventor, and not with a company, the inventor investigation module performs an automatic search for information regarding the at least one individual inventor. In one embodiment, the inventor investigation module provides an automatic alert if the individual inventor is associated with a company. For example, in one embodiment, the inventor investigation module includes at least one web crawler operable to search each inventor's LINKEDIN profile in order to determine for what company each inventor works.

As illustrated in FIGS. 25-36, the Patent Matrix systems and methods were developed as a software tool to facilitate patent examination and analysis by providing a visual representation of independent and dependent claims in hierarchy and relationship to each other, wherein the visual representation includes both a claim separator or box and the substantive content of each claim, switchable between a collapsed independent claims view and an expanded total claims view. A primary goal of the software is to reduce the amount of information users need to review in order to make a judgment relating to the claims of a patent or patent application; the Patent Matrix dynamic diagrams are preferably interactively linked with the result sets and accessible from within the visualization of the present invention via click select electronic link in an interactive GUI. U.S. application Ser. No. 14/822,405, filed on Aug. 10, 2015, which is a continuation of U.S. application Ser. No. 12/633,917, filed on Dec. 9, 2009; which is a continuation of U.S. application Ser. No. 10/983,458, filed on Nov. 8, 2004, which claims the priority filing benefit of U.S. Provisional Patent No. 60/518,119 filed Nov. 7, 2003 describe Patent Matrix diagrams and related technology, and each of the above listed applications is hereby incorporated by reference in its entirety.

The Patent Matrix diagram is automatically generated by and/or visually linked and presented on a GUI by the at least one computer, which is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series; and wherein the software is operable for receiving sub-element selections, analyzing the sub-element selections for technology content, searching the at least one database for matching technology content, retrieving the matching technology content, receiving a study purpose; analyzing in real-time a matching technology content record for matching study purpose, retrieving in real-time the matching technology and study purpose content, displaying matching technology and study purpose content thumbnail images beside the patent claims diagram, and displaying matching technology content thumbnail images beside the patent claims diagram, and linking the thumbnail images to their sub-element.

To assist in rapid review of claims, the Patent Matrix software performs these essential functions: automated import of patent claims, automated parsing of the claims into their hierarchy, and compression/expansion functionality of the parsed claims to/from the independent claim level.

The software and system used to generate the claims diagrams, also referred to as Patent Matrix diagrams are operable to automatically and substantially instantly import issued or granted patents and patent application publications (grants/applications) directly from US Patent Office website or other database housing documents or patents, by simply selecting "File, Import", typing in the grant/application number, and selecting the appropriate database. In the example shown in FIG. 25, a graphic user interface on a computer screen is shown with interactive elements permits a user to enter a document identifier, in this example, the document identifier is a number: U.S. patent application Ser. No. 20020068013 is being imported from a predetermined database of documents or data, in this example, the US published patent applications database.

Claims Display—A method of the present invention includes the steps of: a user entering/inputting a unique grant/application identifier into the software via a graphical user interface (GUI) or prompt; the software identifying the grant/publication from a database using the unique identifier; importing/selecting the grant/application from the database;

parsing the claims to separate each claim as an element of a Patent Matrix diagram; arranging the claims in a hierarchy according to the claims numbering and relationship to other claims; compressing the claims in the hierarchy to display at least only the independent claims to the user via the GUI; the user selectively expanding the compressed claims and compressing the expanded claims as desired.

The document, grant, and/or application is imported, parsed into its hierarchical order, and compressed to the highest level for initial display on an interactive graphical user interface of a computer screen or electronic display, as shown in FIG. 26. The independent claims of US Pub. No. 20020068013 alone are displayed initially, claims 1, 8, 15, and 19 of US Pub. No. 20020068013; a plus sign indicator to the left of the independent claim number indicates whether or not sub-elements (parsed elements of the independent claim) and/or dependent claims are available to be shown in an expanded, or uncompressed view. Alternative indicators are also used, such as a number following the claim text indicating the number of compressed elements connected to that independent or higher level element. Note also that some sub-elements also have compressed elements associated with them, even though the sub-elements are not themselves independent claims or the highest level in a hierarchical relationship.

The diagrammatic user interactive compression of claims is particularly useful for persons examining large numbers of grants/applications. The user can quickly look at the independent claims to ascertain if the claims are relevant to the technology being examined. Dependent claims normally only further delimit independent claims. Therefore, usually if an invention falls outside of the scope of an independent claim, there is no need to further examine the dependent claims. For grants/applications where the claims are close to describing the examined invention, these claims should be examined in details.

Figure 27:
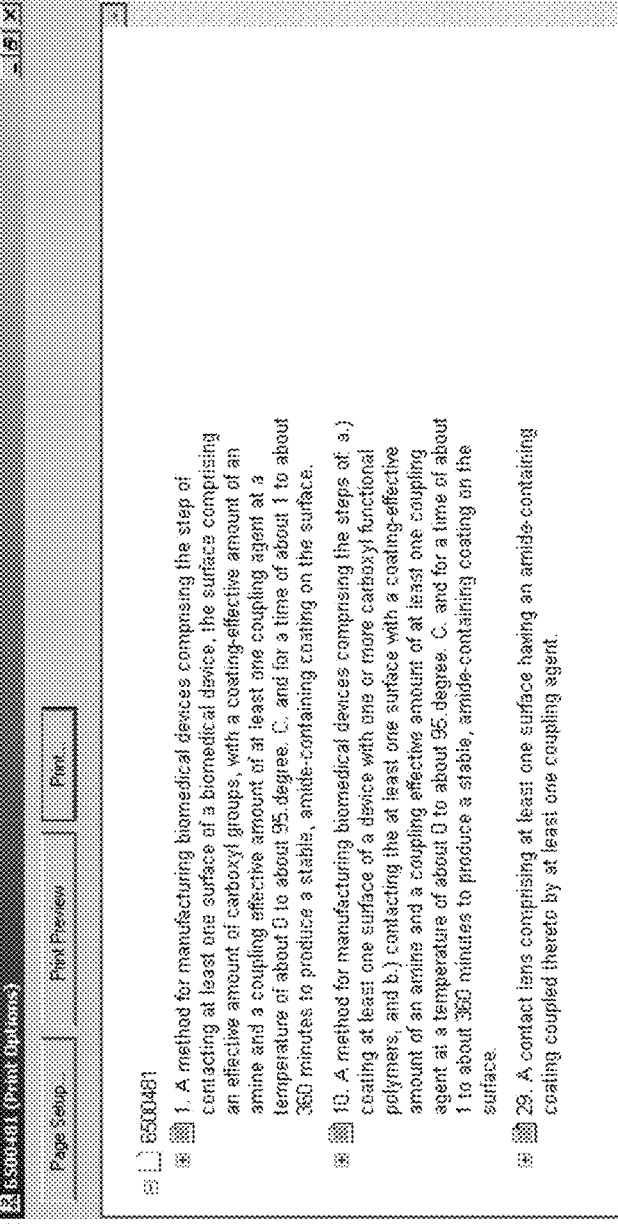
FIG. 27 is a screen view of an automated system according to one embodiment of the present invention.

The independent claims can also be compared to other grants/applications by opening two or more grants/applications in the Patent Matrix. Shown in FIG. 27 is an issued U.S. Pat. No. 6,500,481 related to the technology of the preceding application. Once again, compressed claims are shown in the diagram: claims 1, 10, and 20 are the independent claims series for U.S. Pat. No. 6,500,481. The plus sign to the left of each of these claims numbers indicates that some sub-element or dependent claim exists under each compressed claim in the diagram. Note how much easier it is to compare these two inventions when only the independent claims are visible. Compare this method with a claims comparison using the entire grants/applications by retrieving these patents from the USPTO website.

Figure 28:
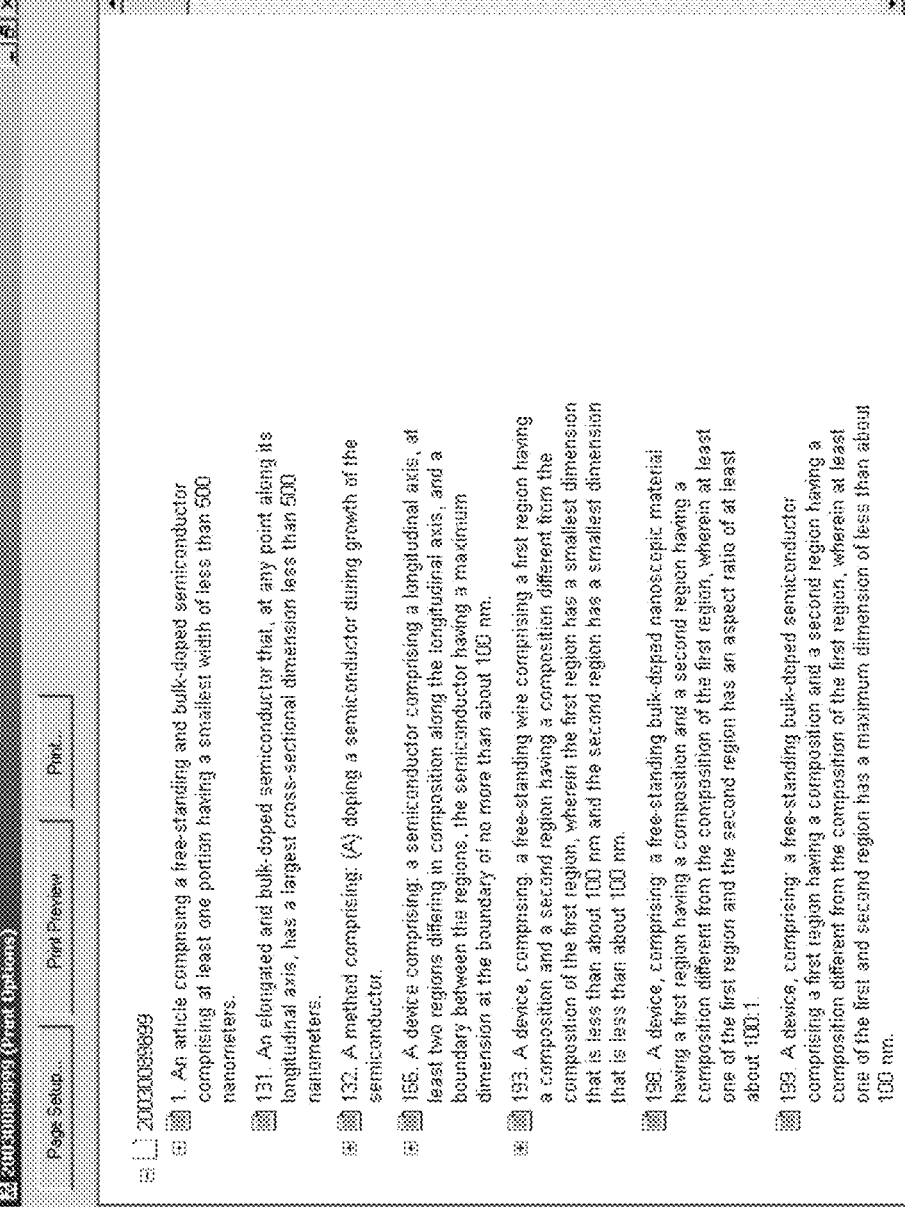
FIG. 28 is a screen view of an automated system according to one embodiment of the present invention.

The utility of the Patent Matrix software increases as the number of claims increases. For example, U.S. patent application Ser. No. 20030089899 was imported using the Patent Matrix software. Shown in FIG. 28 is a screen shot of the first seven (7) independent claims. Note how easy it is to examine the seven independent claims without the intervening 192 dependent claims. This is one of the patent applications with a large number of claims mentioned earlier—709 total claims and 72 independent claims. Additionally, independent series of claims can be group by moving claims series up or down relative to one another.

Figure 29:
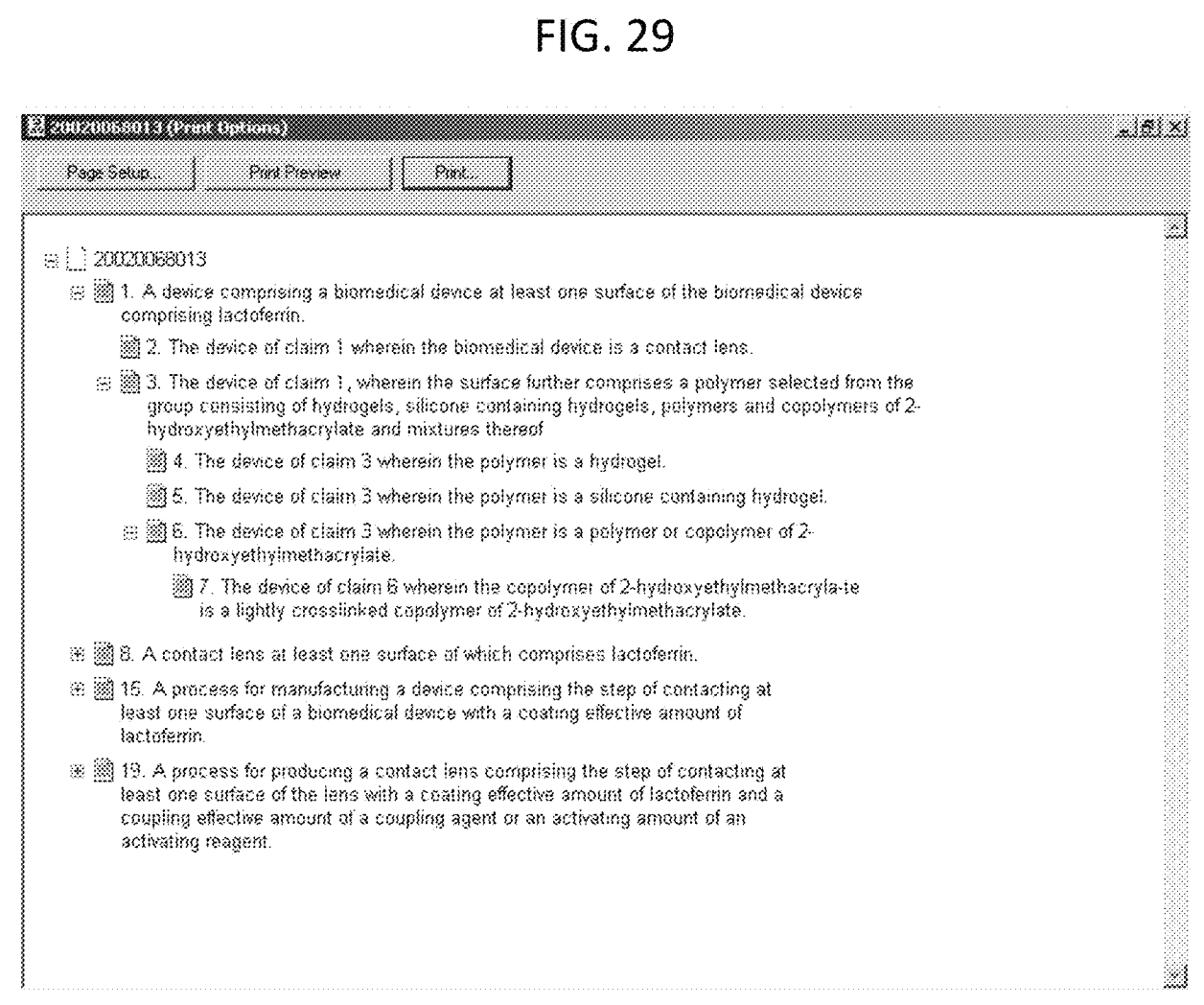

Expanding the claims to view dependent claims—For grants and/or applications where the independent claims are close to describing the examined invention and may cover the invention, the claims should be examined in detail, including the dependent claims. Independent claim #1 from the U.S. application Ser. No. 20020068013 has been completely expanded, as shown in FIG. 29. Note the hierarchical dependency of dependent claims 2 through 7, automatically created by the Patent Matrix software import function.

Figure 31:
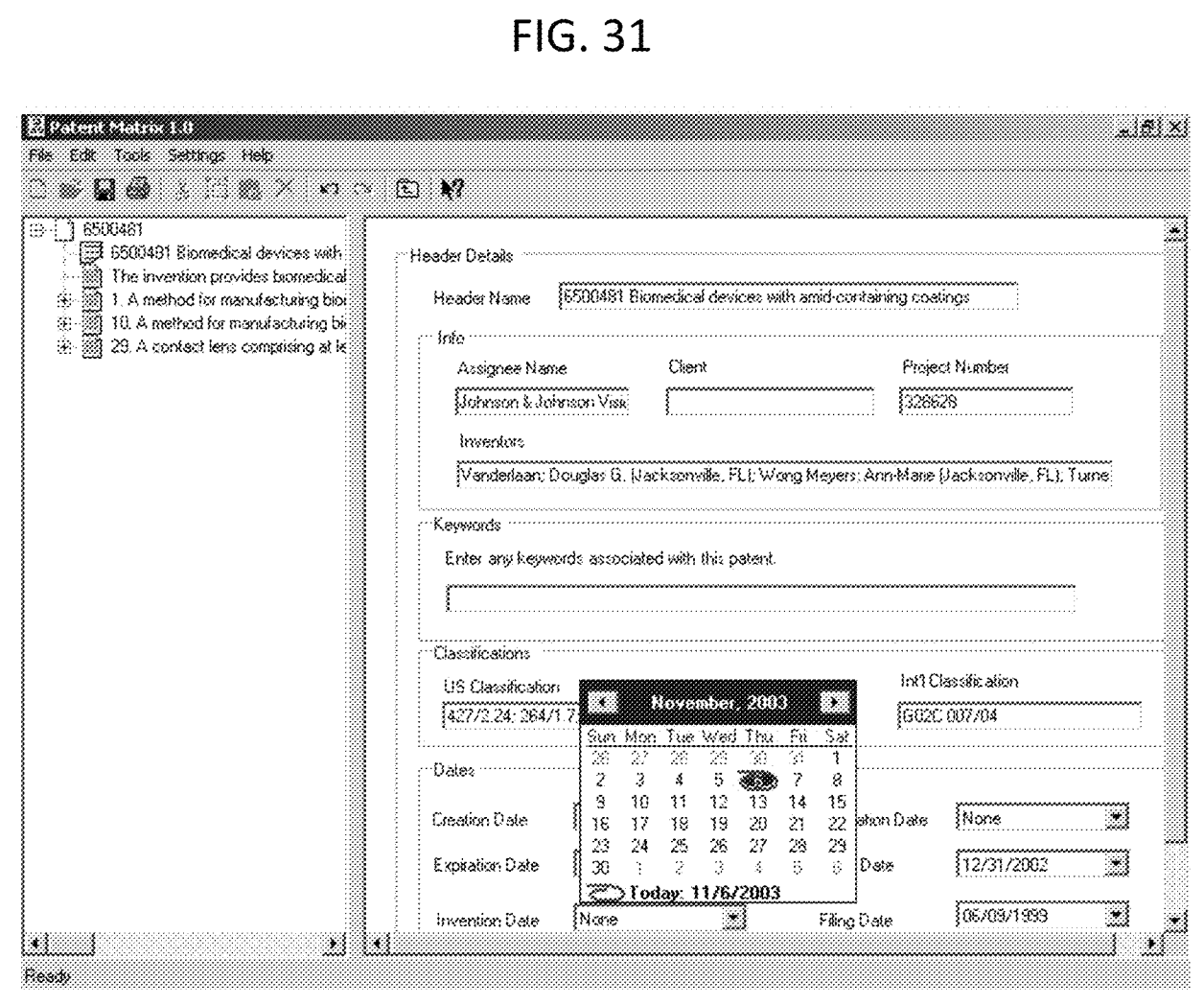

Other fields—In a preferred embodiment of the present invention, the Patent Matrix software also imports other important fields from a grant/application. In addition to the abstract, as shown in FIG. 30, the filing date, inventors, assignees, etc. are imported into their respective fields in the grant/application header, shown in FIG. 31. The date fields include a pop-up calendar to check or change the date and avoid confusion with International/LTS date formats. This header information facilitates the use of Patent Matrix files in an invention or disclosure management system.

Figure 32:
FIG. 32 is another user interface of a compressed claims diagram according to one embodiment of the present invention.
Figure 33:
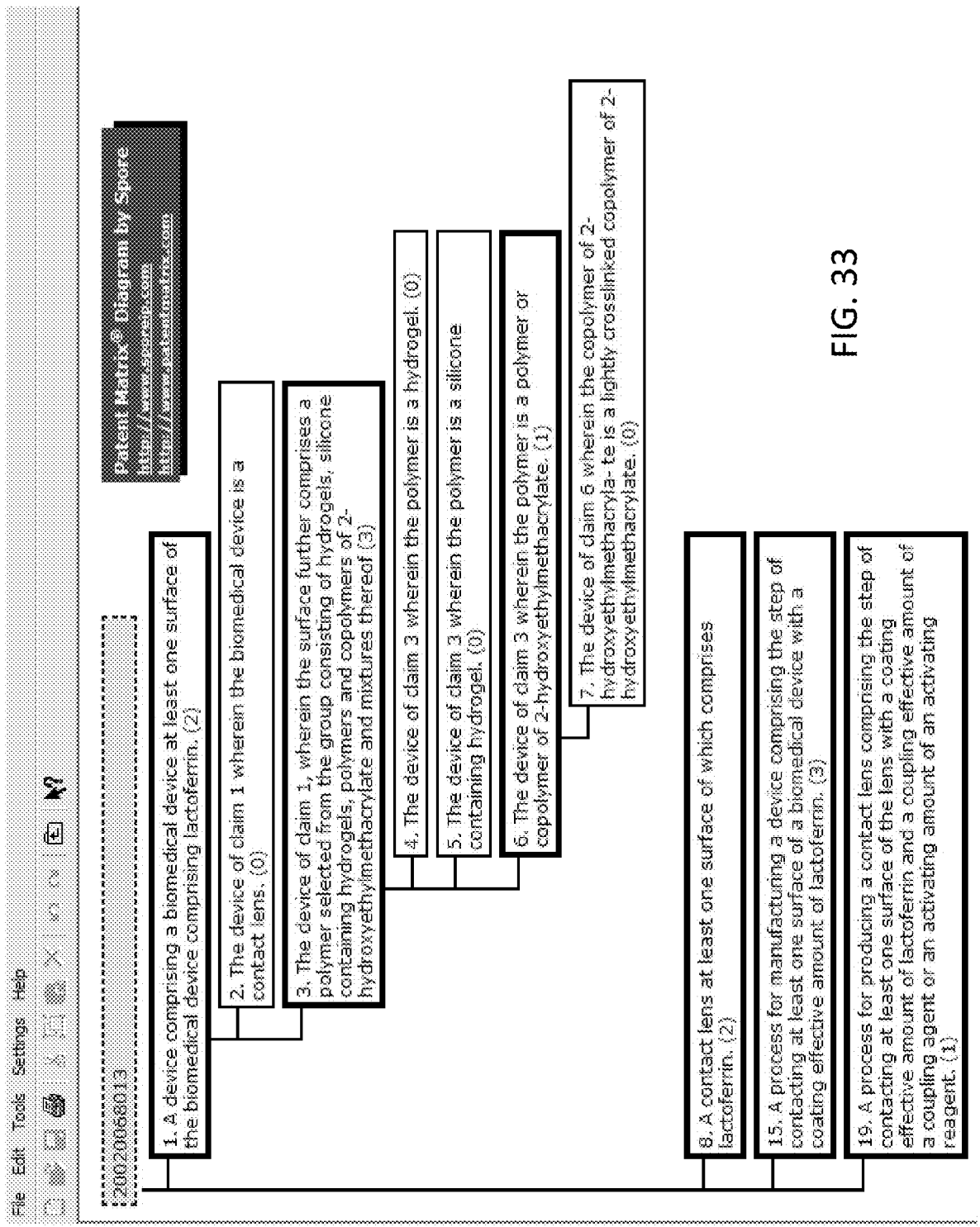
FIG. 33 is another user interface of an expanded view for the claims diagram for the document shown in FIG. 32 according to one embodiment of the present invention.

FIG. 32 is another user interface of a compressed claims diagram. In this example, outlining of elements and sub-elements is provided to further enhance user viewing and analysis, as well as interaction with the diagram and its elements. Coloration, as well as shading and/or font changes are also used to further distinguish hierarchical elements and sub-elements. FIG. 33 is another user interface of an expanded view for the claims diagram for the document shown in FIG. 32.

Thus, the present invention provides a system for displaying patent claims, the system including: at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series.

Furthermore, the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The imported claims include an entire claims series, an entire patent's claims, multiple patents' claims, and/or at least part of a patent claims series from more than one patent. Further subcomponent parsing is optionally provided for the user.

In the system, the computer is a single computer, a server, or a computer network. The at least one input device communicates with the computer directly, remotely, wirelessly, via the Internet, and combinations, depending upon the system. The at least one output devices is an electronic output device with graphic user interface.

The present invention further provides for a method for displaying patent claims, the method steps comprising:
a. providing a system as in the foregoing;
b. selecting at least part of a patent claims series;
c. importing the at least part of a patent claims series into the data processor running the software;
d. parsing the at least part of a patent claims series into the claims hierarchy of at least part of a patent claims series;
e. displaying the parsed at least part of a patent claims series in an interactive format that permits expansion and compression of the at least part of a patent claims series according to the hierarch of the at least part of a patent claims series.

As in the foregoing system, the method provides for steps operable to provide for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The present invention further provides for an interactive user interface for providing a diagram of patent claims, the diagram including: an interactive graphical user interface (GUI) viewable on an electronic display, the GUI including a diagram of at least part of a patent claims series; wherein the claims are parsed hierarchically, and the claims are compressible hierarchically.

Furthermore, the GUI of the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The present invention further provides for a patent quality metric score shown on the Patent Matrix Diagram, wherein the patent quality metric represents a quality scale based on a multiplicity of factors, including, but not limited to, the length of the description, the scope of the claims, and the number of drawings.

Figure 34:
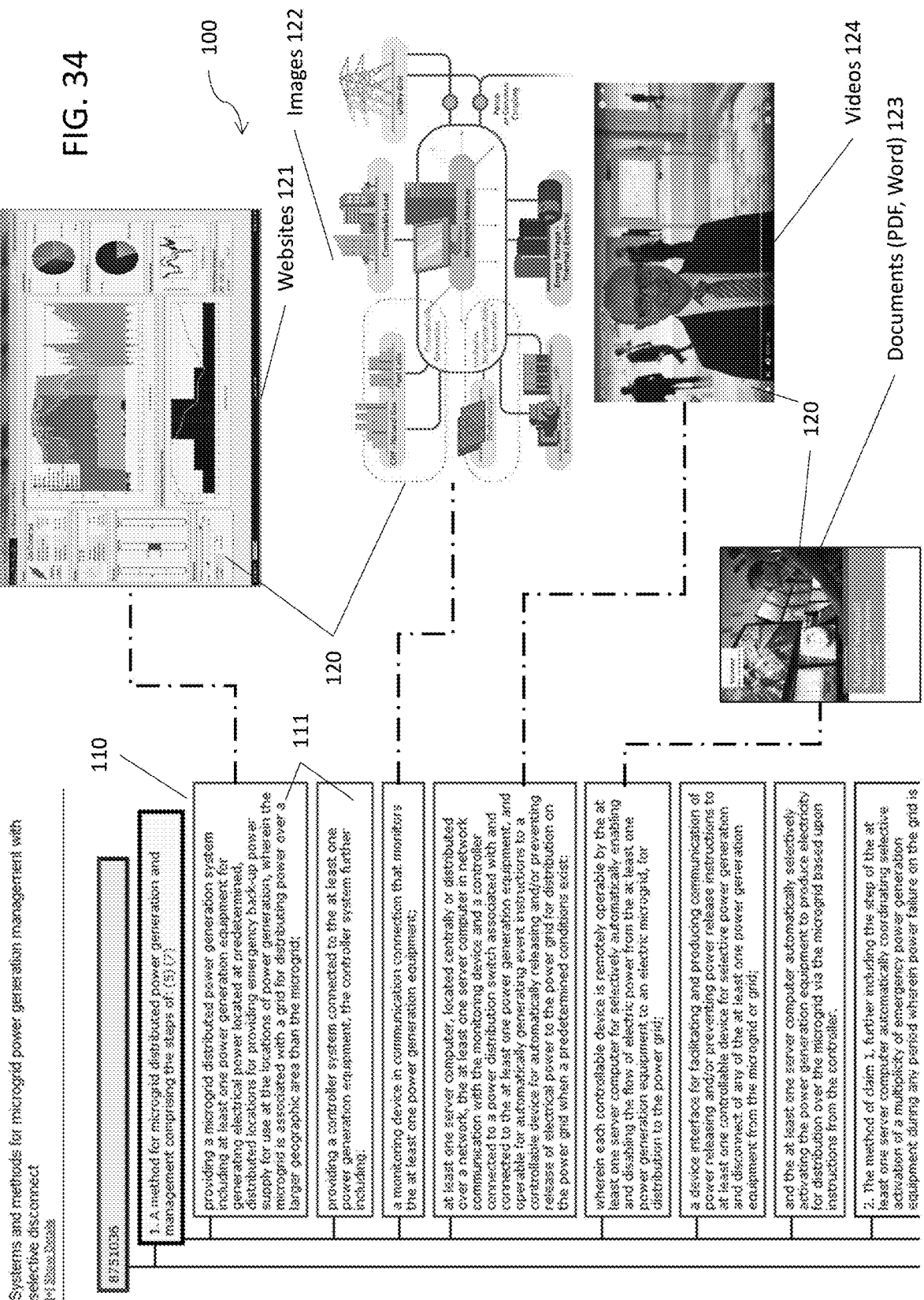
FIG. 34 is a user interface of a claims diagram with relevant technology content thumbnail images according to one embodiment of the present invention.

The present invention further provides for real-time, automated analysis of claims to assist in determining infringement by competitors in real-time or near-real-time. An interface provides a patent claims diagram as previously described with additional content of potential patent claims infringers shown diagrammatically connected to the claims elements and sub-elements. FIG. 34 illustrates an embodiment of this feature, showing a user interface, generally described as 100, with sub-elements 111 of a patent claims diagram 110 linked to matching technology content thumbnail images 120. The content is selected from at least one form of media, by way of example and not limitation, websites 121, images 122, documents (PDF, Word) 123, videos 124, product specifications, user manuals, advertisements, marketing collateral, competitive product comparisons and the like.

The present invention analyzes the elements or sub-elements and then searches in real-time for matching technology content. Once content is located, a semantics engine analyzes in real-time the meaning of the content to determine if it qualifies as matching technology content. Once it is determined to be matching technology content, the semantics engine determines in real-time if the purpose of the content meets the requirements of the study. By way of example and not limitation, the semantics engine would analyze the content and its context to determine if the content was an offer to sell, which would qualify as matching technology content, or a technology review article, which would not qualify.

Figure 35:
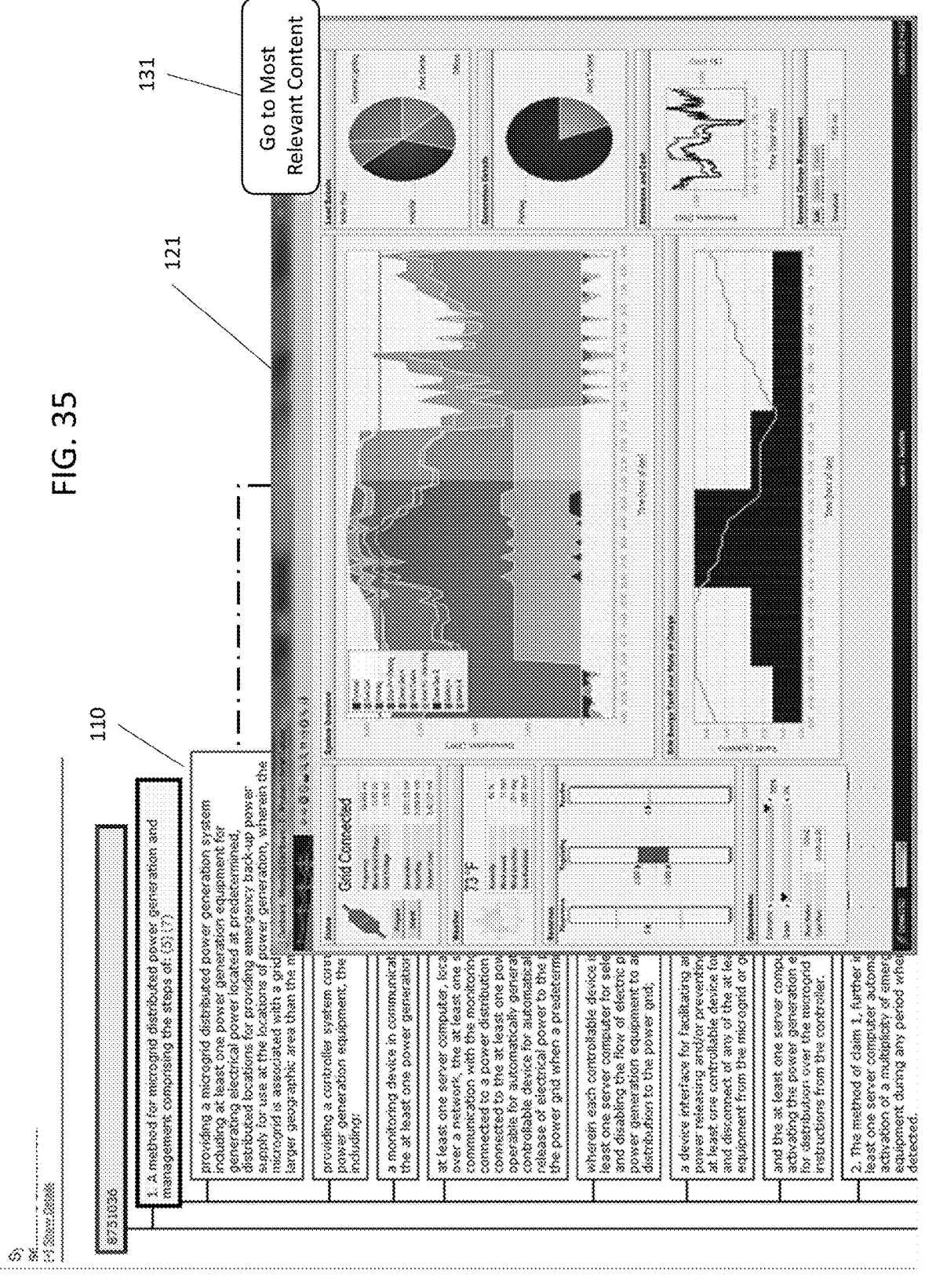
FIG. 35 is a user interface of a claims diagram and relevant technology content with a relevant technology content expanded for examination according to one embodiment of the present invention.
Figure 36:
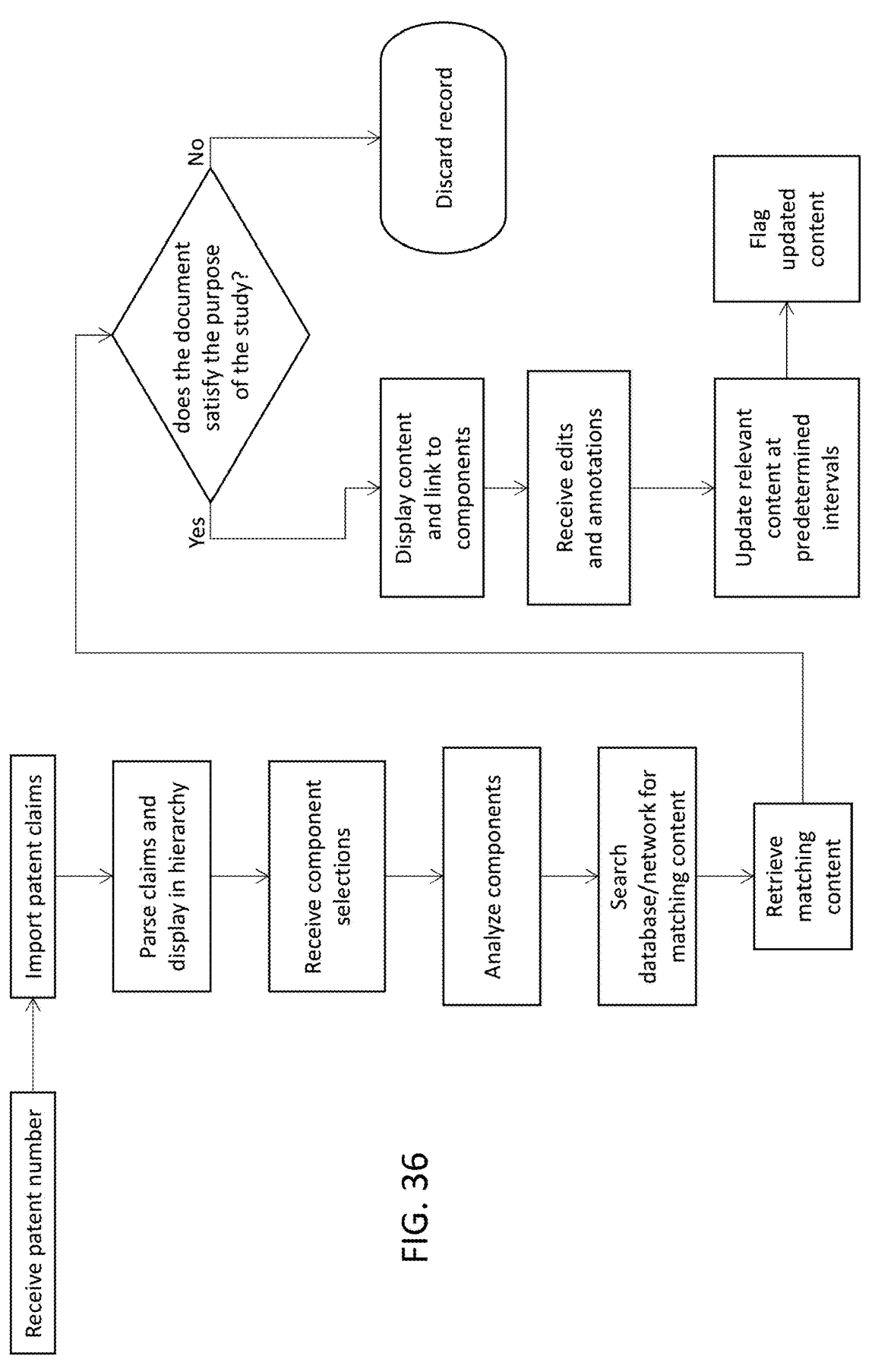
FIG. 36 is a flow diagram of a process according to one embodiment of the present invention.

Selecting a matching technology content thumbnail image brings the content to the foreground and expands it to fill the interface, to fill a predetermined pane in the interface, or to a predetermined size (FIG. 35). Preferably, the expanded content does not obscure the parent linked key component.

A method according to the present invention (FIG. 36) includes the steps of 1) receiving a patent number or other means of identification, 2) importing the patent claims, 3) parsing the claims and displaying them diagrammatically, 4) receive sub-element selections, 5) analyzing the selected sub-elements to determine keywords, 6) searching a database for matching technology content using the keywords, 7) retrieving matching technology content, 8) analyzing the retrieved content to determine if the record is relevant to the purpose of the study, 9) if relevant, displaying the matching technology content thumbnail images beside the patent claims diagram and linking the thumbnail images to the appropriate sub-element(s), and 10) periodically updating the search results for matching relevant content. If the retrieved record is not relevant, then the record is discarded. Additional steps include receiving edits and annotations to the diagram components.

Figure 37:
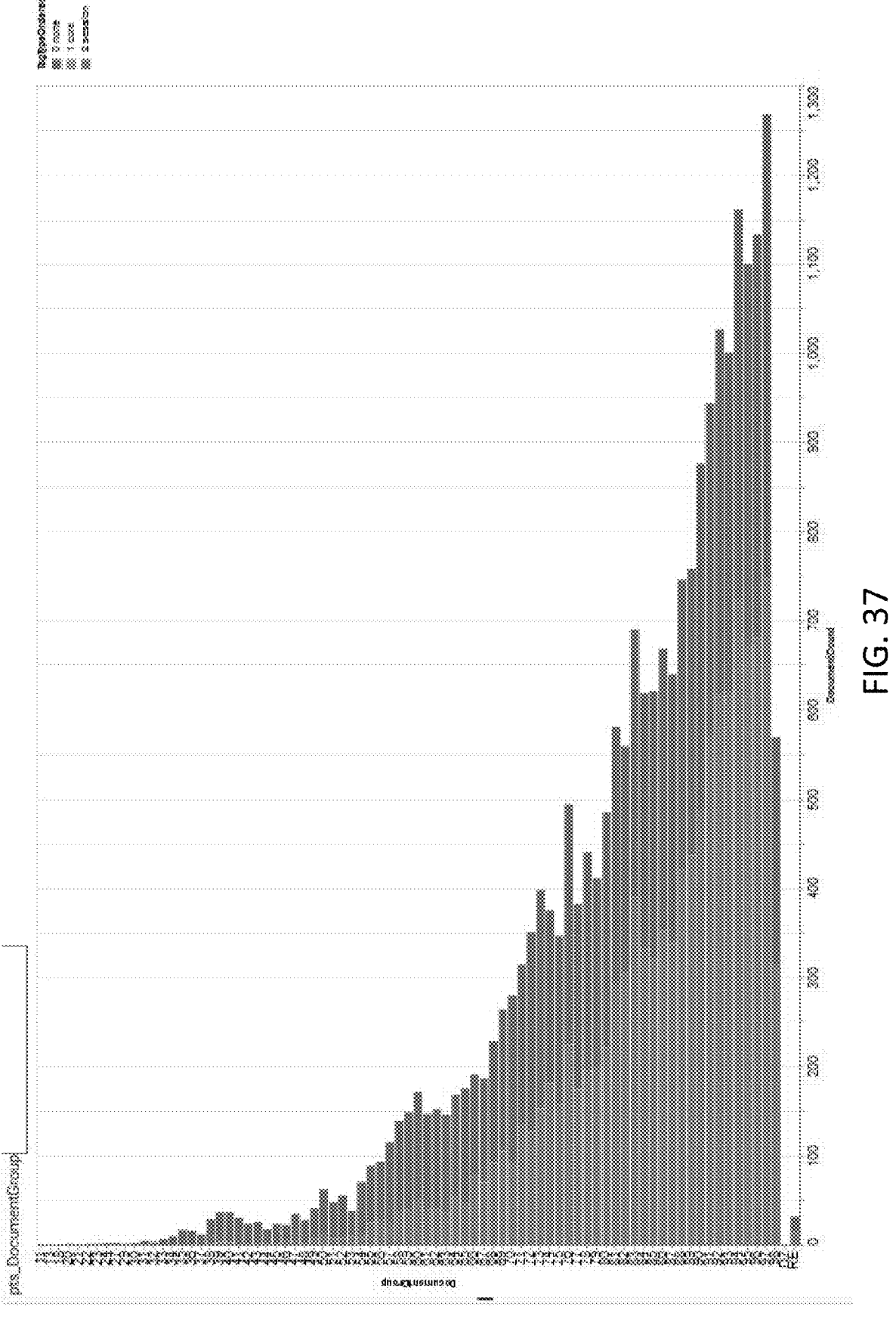
FIG. 37 shows a screen shot view according to one embodiment of the present invention.
Figure 38:
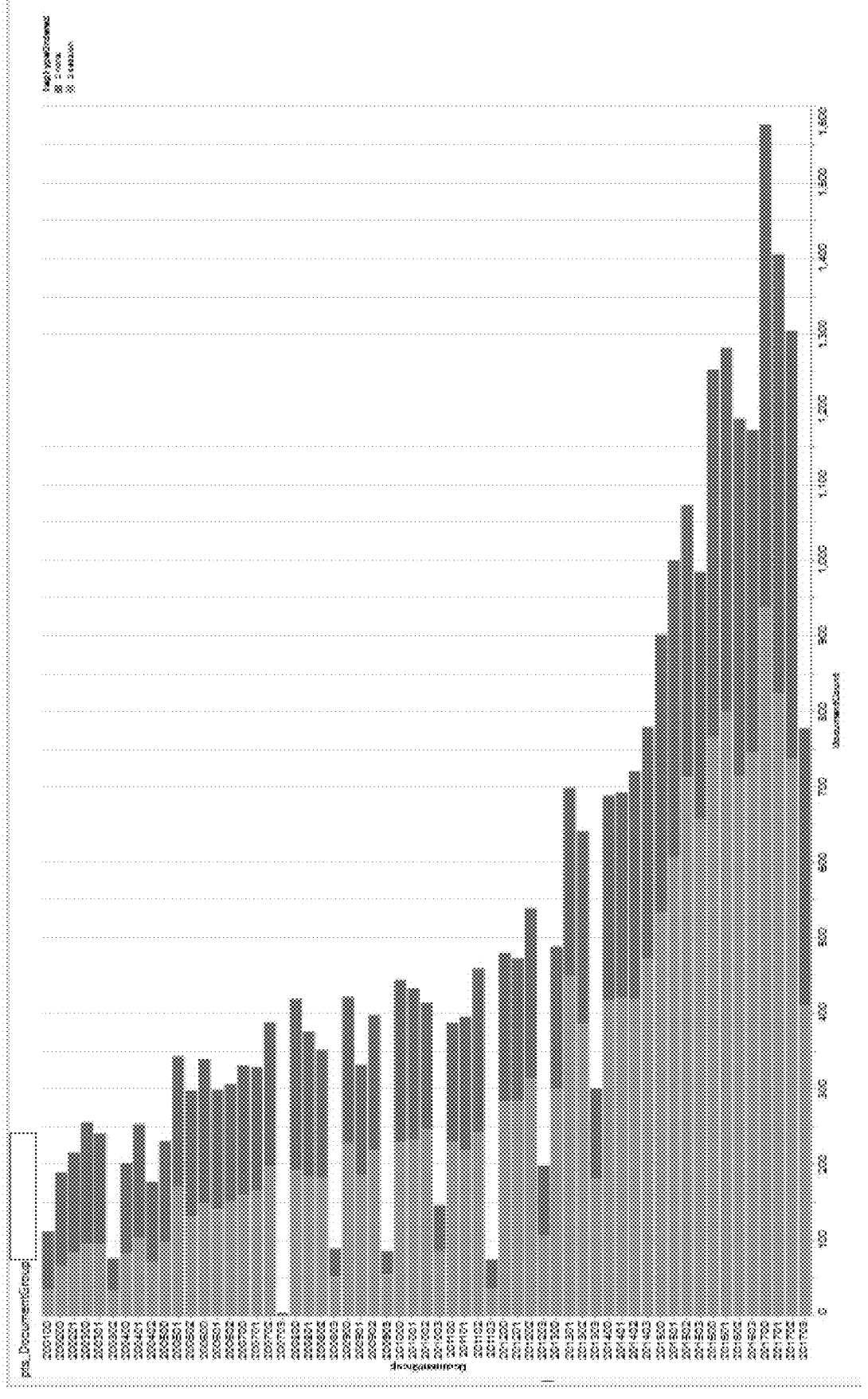
FIG. 38 shows another screen shot view according to one embodiment of the present invention.

FIG. 37 shows patents sorted by the first two digits of their document numbers. FIG. 38 shows publications sorted by first six digits of their document numbers.

Note that the same content can satisfy the criteria for more than one sub-element, and therefore be linked to multiple sub-elements. In these cases, the system links a sub-element to the location in the document that is most relevant, based on semantic analysis of the sub-element.

The present invention is necessarily rooted in computer technology in order to overcome a problem specifically arising in the realm of computer networks. More specifically, the present invention electronically searches and parses, in real-time, millions of websites, documents, images and videos from around the planet to find the ones that are relevant. This immense amount of content, which cannot be parsed in real-time or near-real-time by humans, was not available prior to the advent of the Internet. Prior to the Internet, litigators would have to deal with hundreds or maybe thousands of documents per case, which required a large amount of time. Now, with the availability of millions of articles of content, there are not enough persons trained in litigation to review all the content in real-time or near-real-time. Thus, this is a problem created by the Internet that is addressed by the systems and methods of the present invention.

Additionally, the majority of these documents are only offered electronically and only through the Internet. Thus, it is not possible for users to search these documents except by using computer and electronic networking technology, including GUIs.

The GUIs described in the present invention are also a product of computer technology and Internet connectivity, and as such were unavailable before the Internet. Specifically, the sector interactive and dynamic visualization diagram provides for automatic expansion and collapse of data point within the sector according to a timeline or date range, as illustrated in the figures, in particular in FIGS. 1-3. Also, in the Patent Matrix hierarchical claims diagram displays and the expansion mechanisms, which are operable to expand dependent claims and dependent claim text were not available before computing technology and the Internet.

Additionally, the present method differs from prior art manual methods. Specifically, the present method first searches for technology keywords, and then determines if the document is relevant to the purpose of the study. In prior art manual methods, the searcher would first determine if a document was relevant to the purpose of the study, and then determine if the technology content in the document was relevant.

Furthermore, the high-throughput, real-time screening necessitated by the enormous number of documents along with the constraints of computer displays requires technological features that did not exist before the Internet. Specifically, the need to review multiple electronic documents in real-time within a fixed display requires an interactive method that can switch rapidly between documents. The dynamic, interactive and electronically linked GUIs described in the present invention provide this ability.

Figure 39:
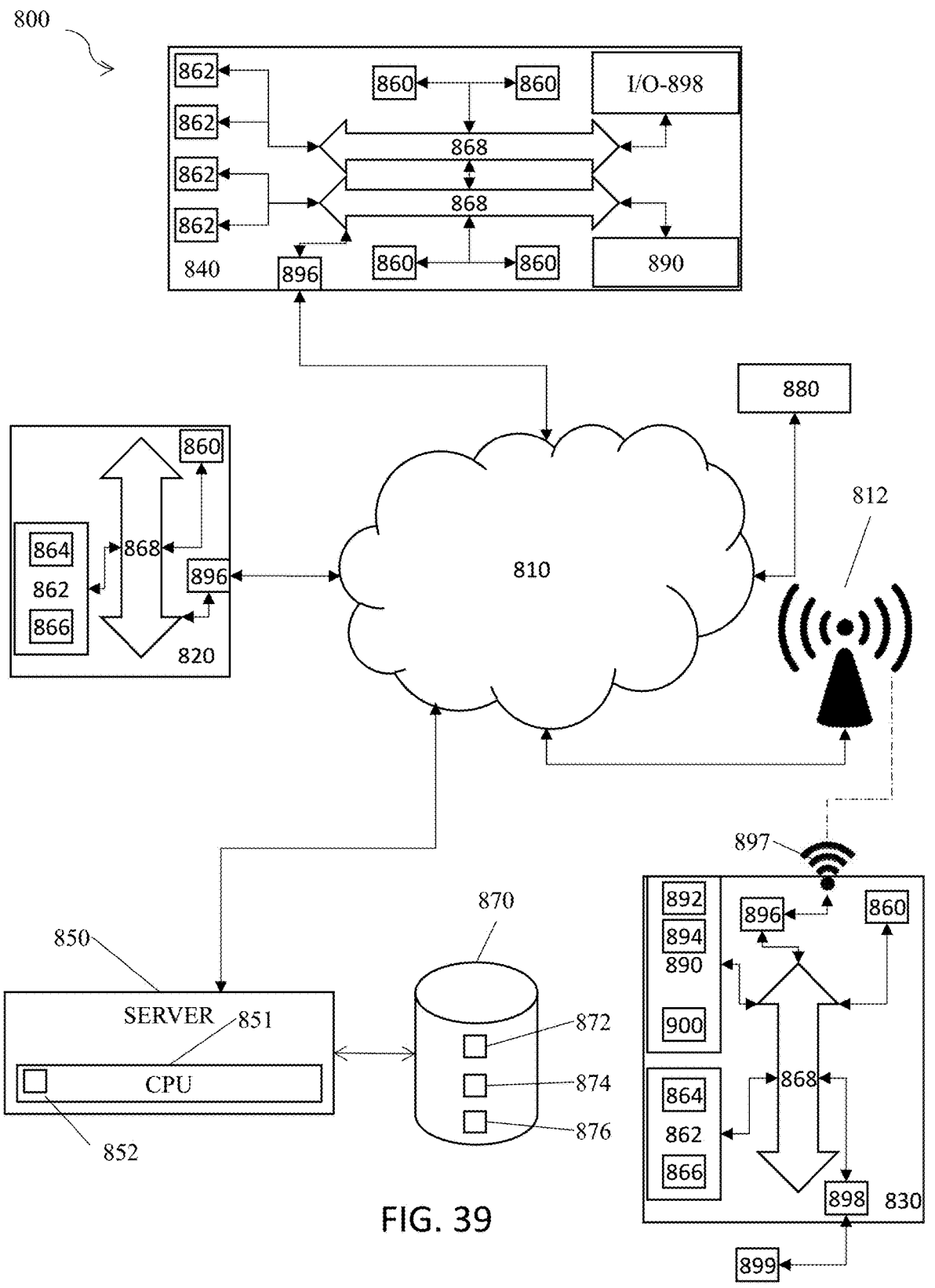
FIG. 39 is a schematic of a computer network system according to one embodiment of the present invention.

FIG. 39 is a schematic diagram of an embodiment of the invention illustrating a computer system, generally described as 800, having a network 810, a plurality of computing devices 820, 830, 840, a server 850 and a database 870. In one embodiment, the system is in electronic communication with at least one national patent office depository database 880.

The server 850 is constructed, configured and coupled to enable communication over a network 810 with computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 39, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 39, may include other components that are not explicitly shown in FIG. 39, or may utilize an architecture completely different than that shown in FIG. 39. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Figure 40:
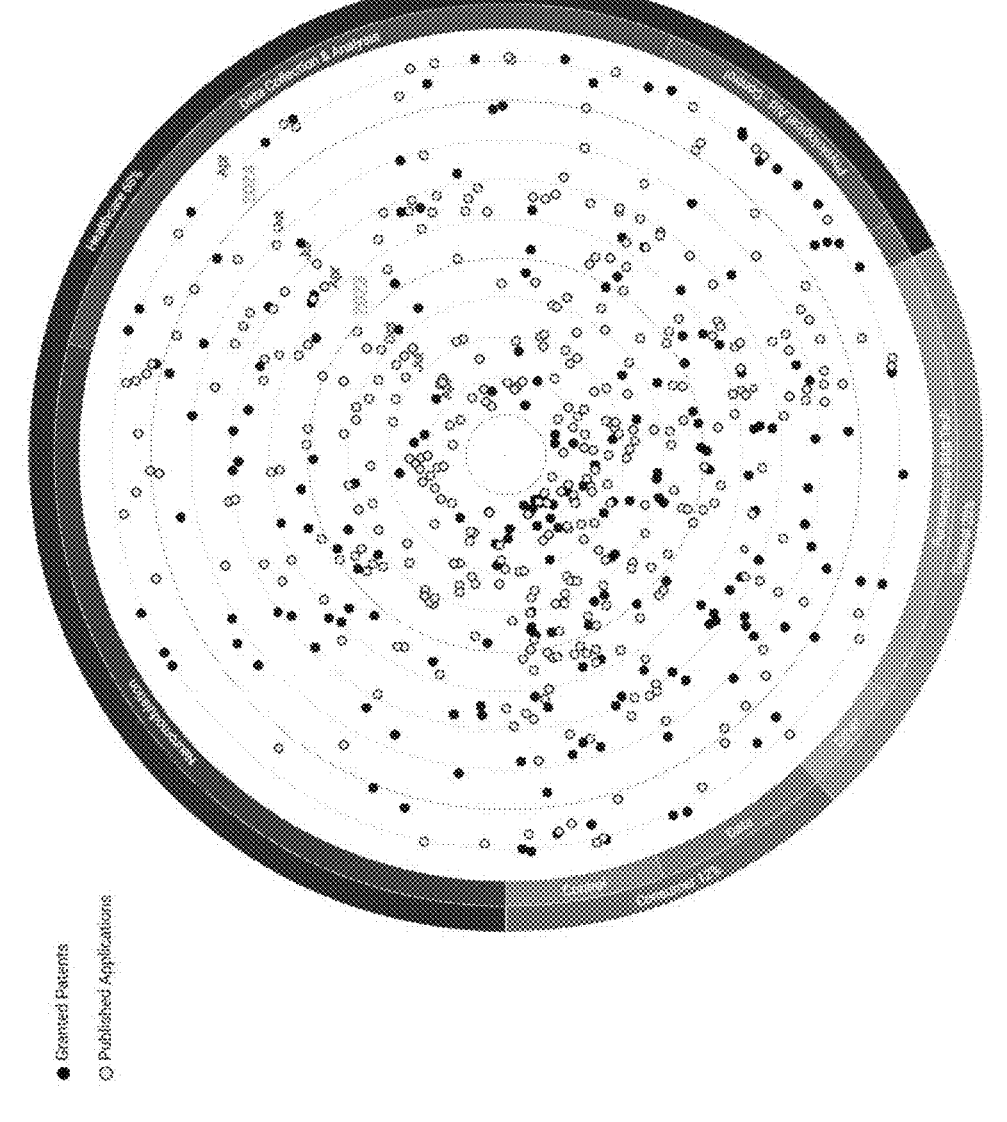
FIG. 40 is an image of a graphic user interface (GUI) displaying three years of data according to one embodiment of the present invention.

The display provides for expanding and contracting time scales comprising a dynamic timeline. As shown in FIGS. 40 and 41, in one embodiment, the display provides for a selection of a time scale for the circular diagram by a user device. In one embodiment, the time scales able to be selected for the circular diagram include each of the previous three years (individually or in any combination), the previous five years, the previous ten years, and/or all years. In one embodiment, "all years" is defined as the oldest publication or issue date of any document provided with a category label within the technological sector associated with the display and all years subsequent to the oldest publication or issue date. Alternatively, in one embodiment, the time scales able to be selected includes at least one year within the range of all years. In one embodiment, when a selection of a different time scale is received, the display is automatically updated in real time, with the display expanding or contracting about the center of the circular diagram, as appropriate.

In one embodiment, the outer perimeter of the circular diagram of the display includes one or more color-coded sections corresponding to one or more categories within the technological sector associated with the display, each with a corresponding display label. In one embodiment, the inner perimeter of the circular diagram of the display includes one or more color-coded sections corresponding to one or more sub-categories within the technological sector associated with the display, each with a corresponding display label.

Figure 42:
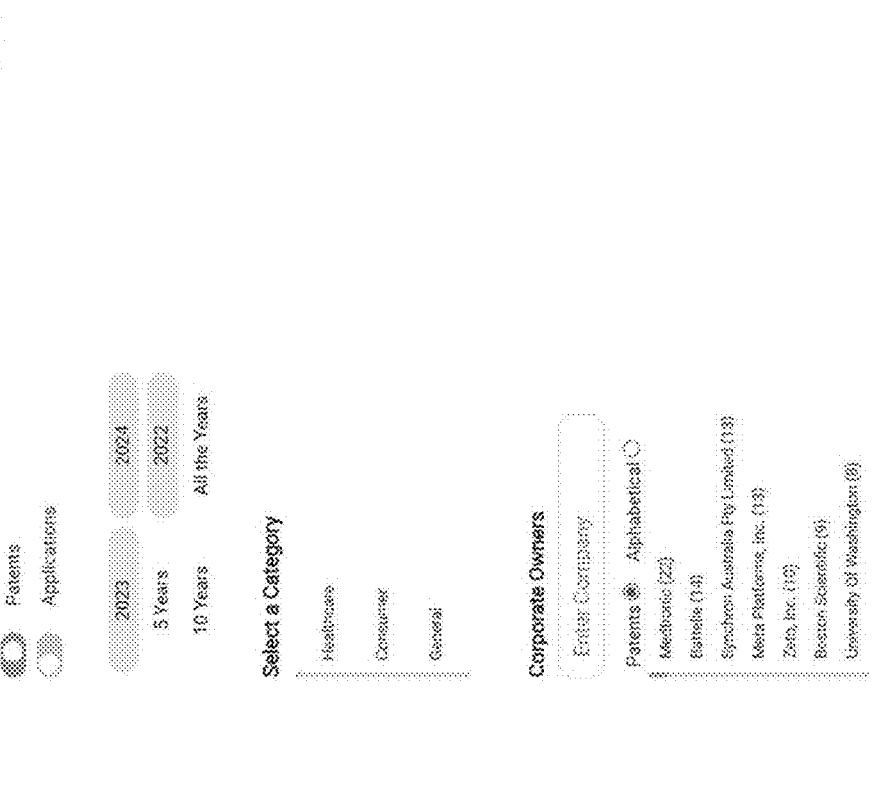
FIG. 42 is an image of a graphic user interface (GUI) displaying only issued patents according to one embodiment of the present invention.

In FIGS. 42 and 43, the diagram is displaying the recently issued patents or published applications, respectively.

The display provides for a roll-over pop-up of information, such as document number, patent owner, title, abstract and the like. FIG. 44 shows a pop-up of the document number and the patent owner. The display pop-up information is multi-platform aware, working on desktop, laptop, tablet, smartphone, and kiosk user interface technologies. The display pop-up enables the user to navigate to additional displays that provide more detailed information about the document, its components, and/or other connected information. The system is also operable to display records in the form of bar charts, or other charts, by various criteria.

As shown in FIG. 45, in one embodiment, the display provides search functionality for generating a list of patent owners associated with a search term. The list of patent owners generated includes a number of documents associated with each patent owner. In another embodiment, the display provides search functionality for generating a list of documents associated with a search term. In another embodiment, the display provides search functionality for generating a list of inventors associated with a search term, with a number of documents associated with each inventor displayed.

FIG. 46 is an image of a graphic user interface (GUI) with documents from a single patent owner selected according to one embodiment of the present invention. In one embodiment, selecting a patent owner causes graphics corresponding to documents not assigned to the selected patent owner to fade, while graphics corresponding to documents assigned to the selected patent owner to be differently colored and/or shaded (e.g., become bolder). By providing graphics corresponding to documents assigned to the selected patent owner to be differently colored, the display allows users to more easily visualize in what years and in what categories the selected patent owner has been most active, and to be able to more especially click select those documents associated with the selected patent owner. In one embodiment, more than one patent owner is able to be selected at one time, with the graphics corresponding to each patent owner having the same or different coloration and/or shading.

Figure 47:
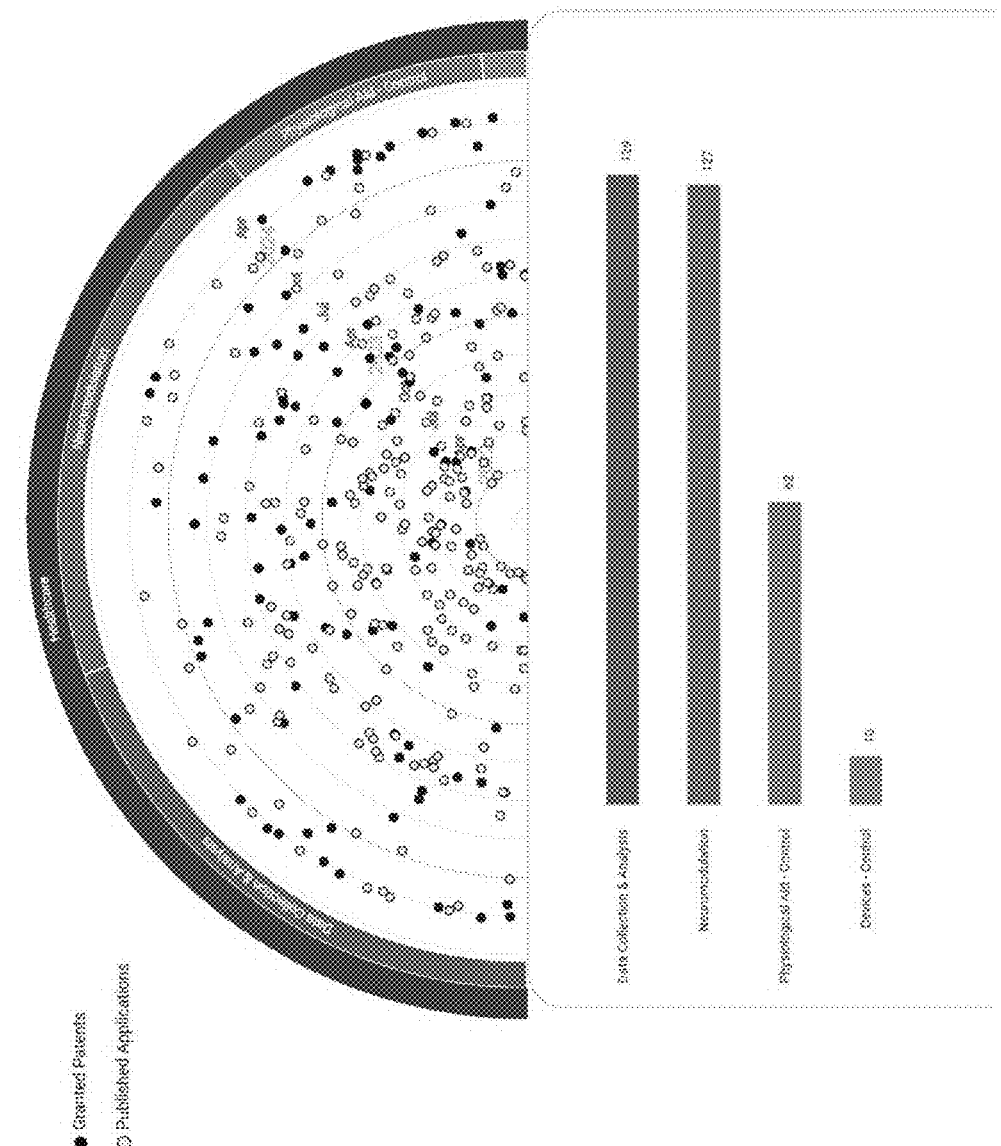
FIG. 47 is an image of a graphic user interface (GUI) displaying a single category according to one embodiment of the present invention.

The display allows users to select a specific category within the technological sector associated with the display, as shown in FIG. 47. In one embodiment, when a category is selected, the circular diagram dynamically changes such that the diagram is a semi-circular interactive visualization, including one or more color-coded sections corresponding to one or more subcategories of the selected category, each with a corresponding display label, as shown in FIG. 47. In one embodiment, this dynamic change does not include reloading the diagram, but rather expands (or contracts) the selected category section of the circular diagram to fit the semicircular shape, while dropping the remainder of the diagram (i.e., the other category sections). The updated semi-circular diagram only includes documents provided with a label associated with the selected category. In one embodiment, the display includes at least one plot illustrating the number of documents in each of the one or more subcategories. In one embodiment, the at least one plot includes at least one horizontal bar chart, at least one vertical bar chart, at least one pie chart, and/or at least one other type of chart indicating the relative number of documents in each subcategory of the selected category.

When a category is selected, the circular diagram changes such that the top perimeter of the radial plot includes one or more color-coded sections corresponding to one or more subcategories of the selected category, each with a corresponding display label. The updated radial plot only includes documents provided with a label associated with the selected category. In one embodiment, the display includes at least one plot illustrating the number of documents in each of the one or more subcategories. In one embodiment, the at least one plot includes at least one horizontal bar chart, at least one vertical bar chart, at least one pie chart, and/or at least one other type of chart indicating the relative number of documents in each subcategory.

FIG. 48 is an image of a graphic user interface (GUI) with documents from a single patent owner selected according to one embodiment of the present invention. In one embodiment, selecting a patent owner causes graphics corresponding to documents not assigned to the selected patent owner to fade, while graphics corresponding to documents assigned to the selected patent owner to be differently colored and/or shaded.

Figure 49:
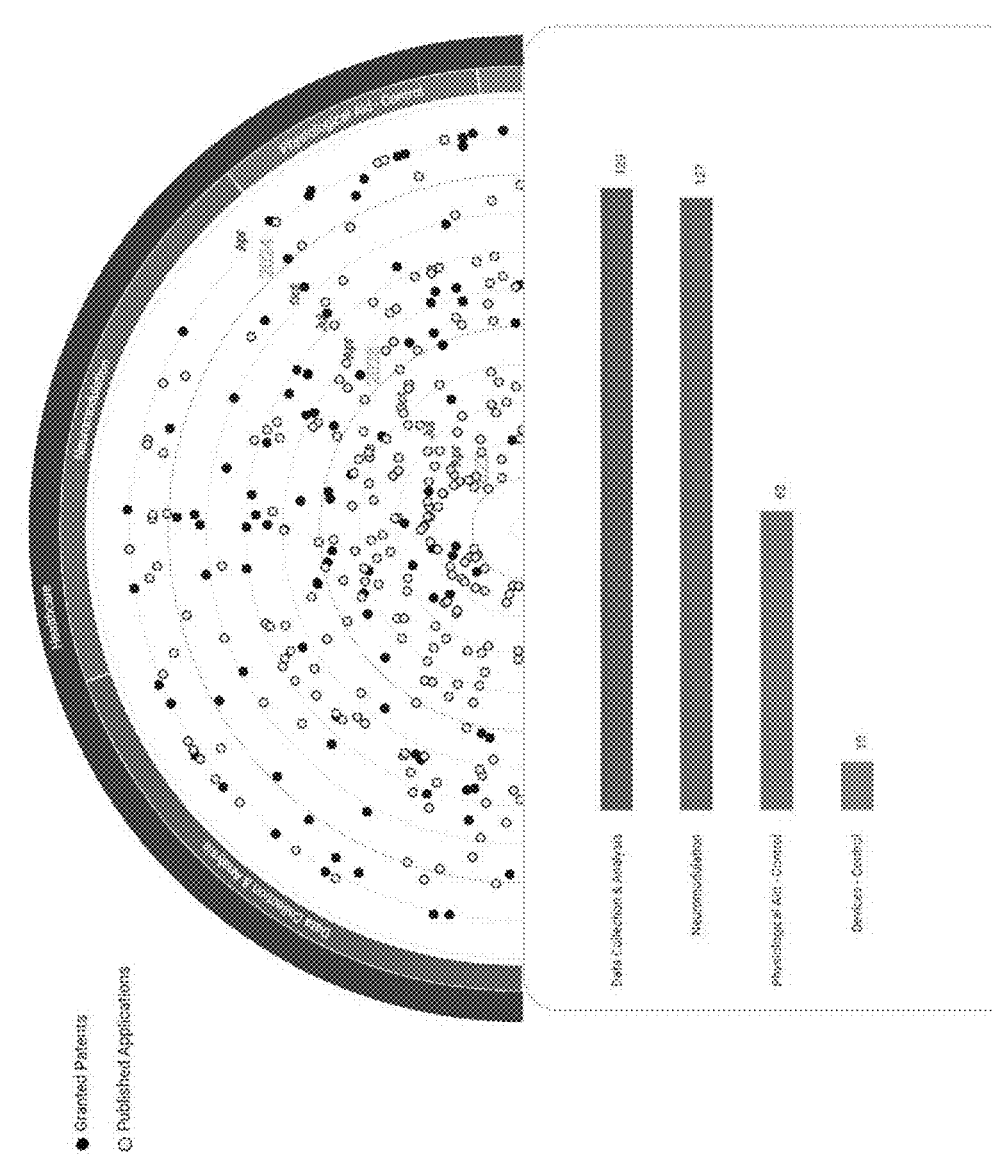
FIG. 49 is an image of a graphic user interface (GUI) displaying a single category including a patent owner retrieval interface according to one embodiment of the present invention.

As shown in FIG. 49, in one embodiment, the display provides search functionality for generating a list of patent owners associated with a search term while in the semi-circular subcategory view of the diagram. The list of patent owners generated includes a number of documents associated with each patent owner. In another embodiment, the display provides search functionality for generating a list of documents associated with a search term. In another embodiment, the display provides search functionality for generating a list of inventors associated with a search term, with a number of documents associated with each inventor displayed.

Figure 50:
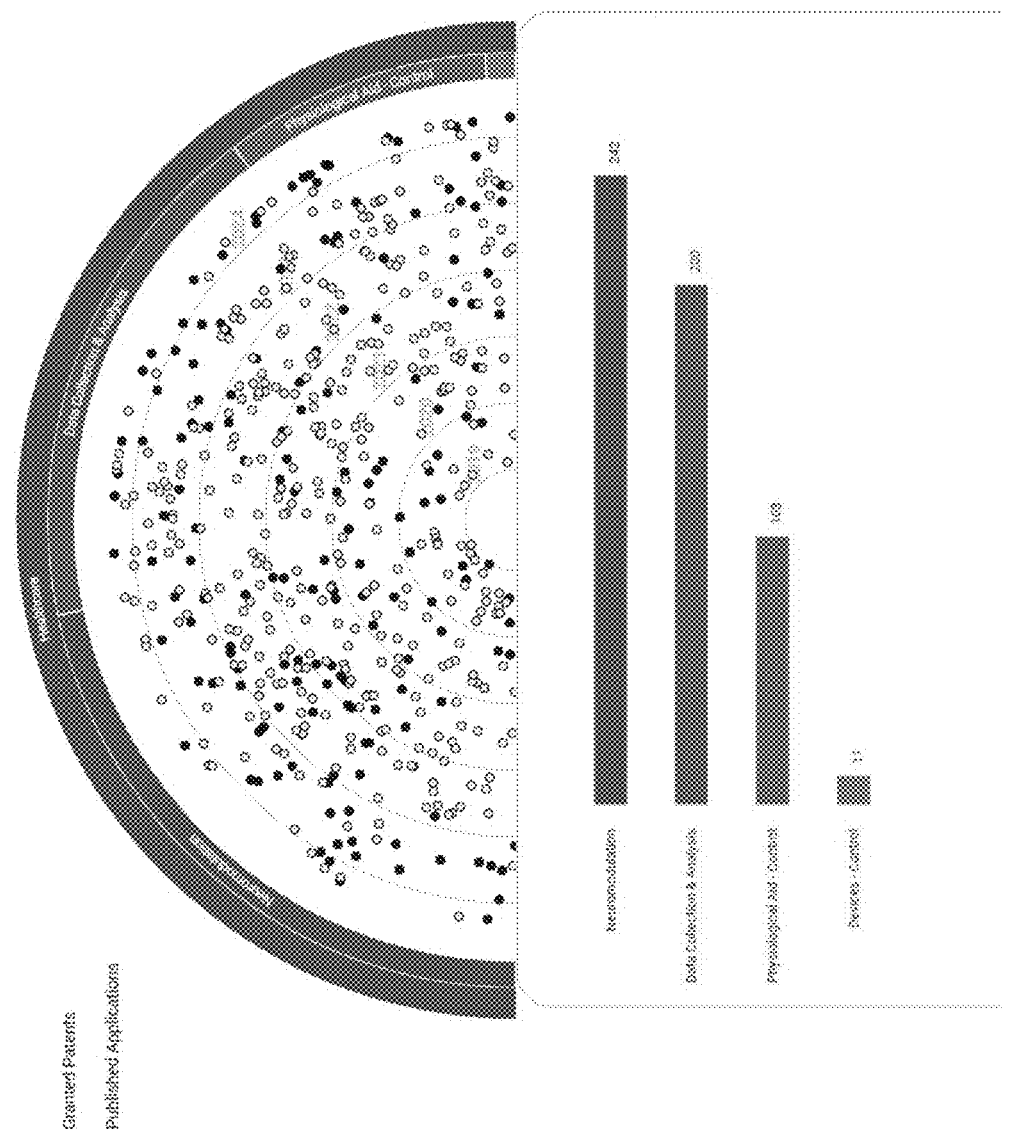
FIG. 50 is an image of a graphic user interface (GUI) displaying a single category displaying five years of data according to one embodiment of the present invention.

FIG. 50 is an image of a graphic user interface (GUI) displaying a single category displaying five years of data according to one embodiment of the present invention.

Figure 52:
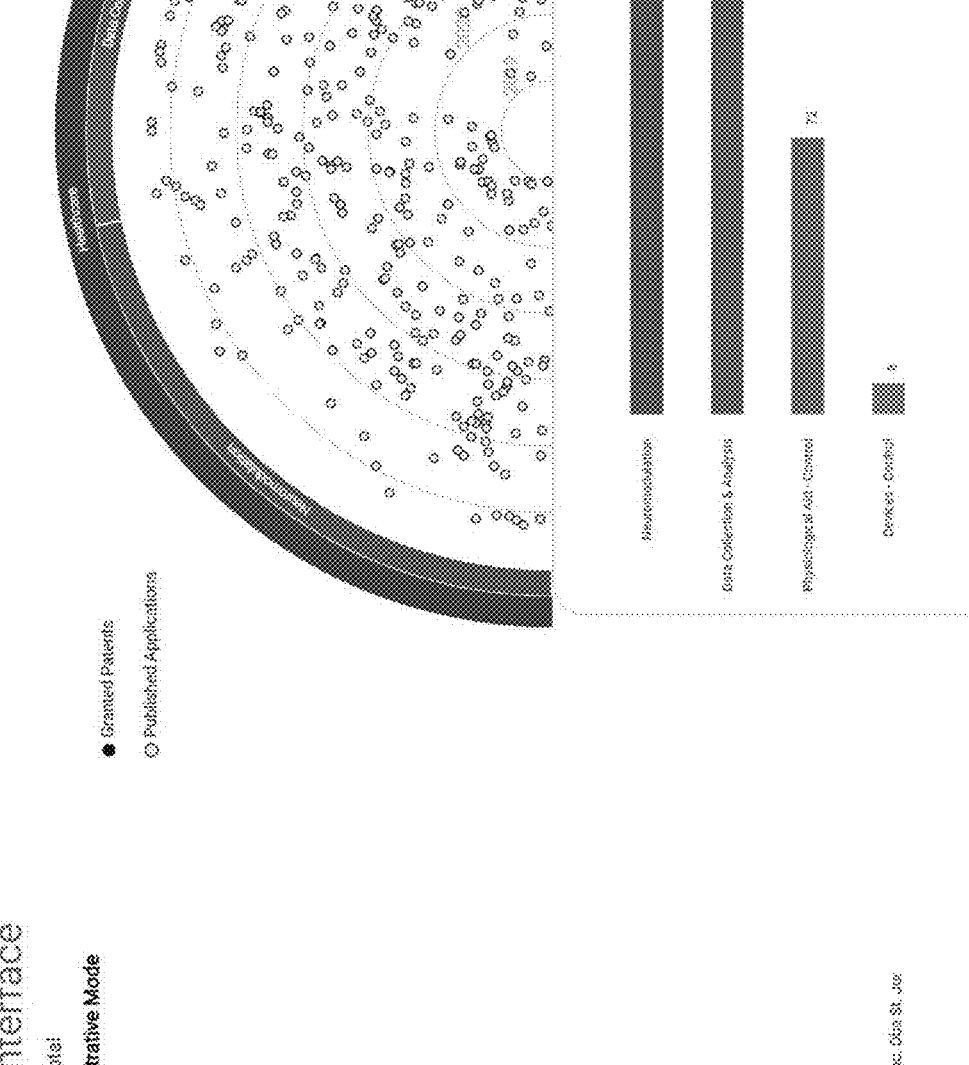
FIG. 52 is an image of a graphic user interface (GUI) displaying a single category displaying only published patents according to one embodiment of the present invention.

In FIGS. 51 and 52, the diagram displays only the recently issued patents or published applications, respectively, within the single category semi-circular display view.

Figure 53:
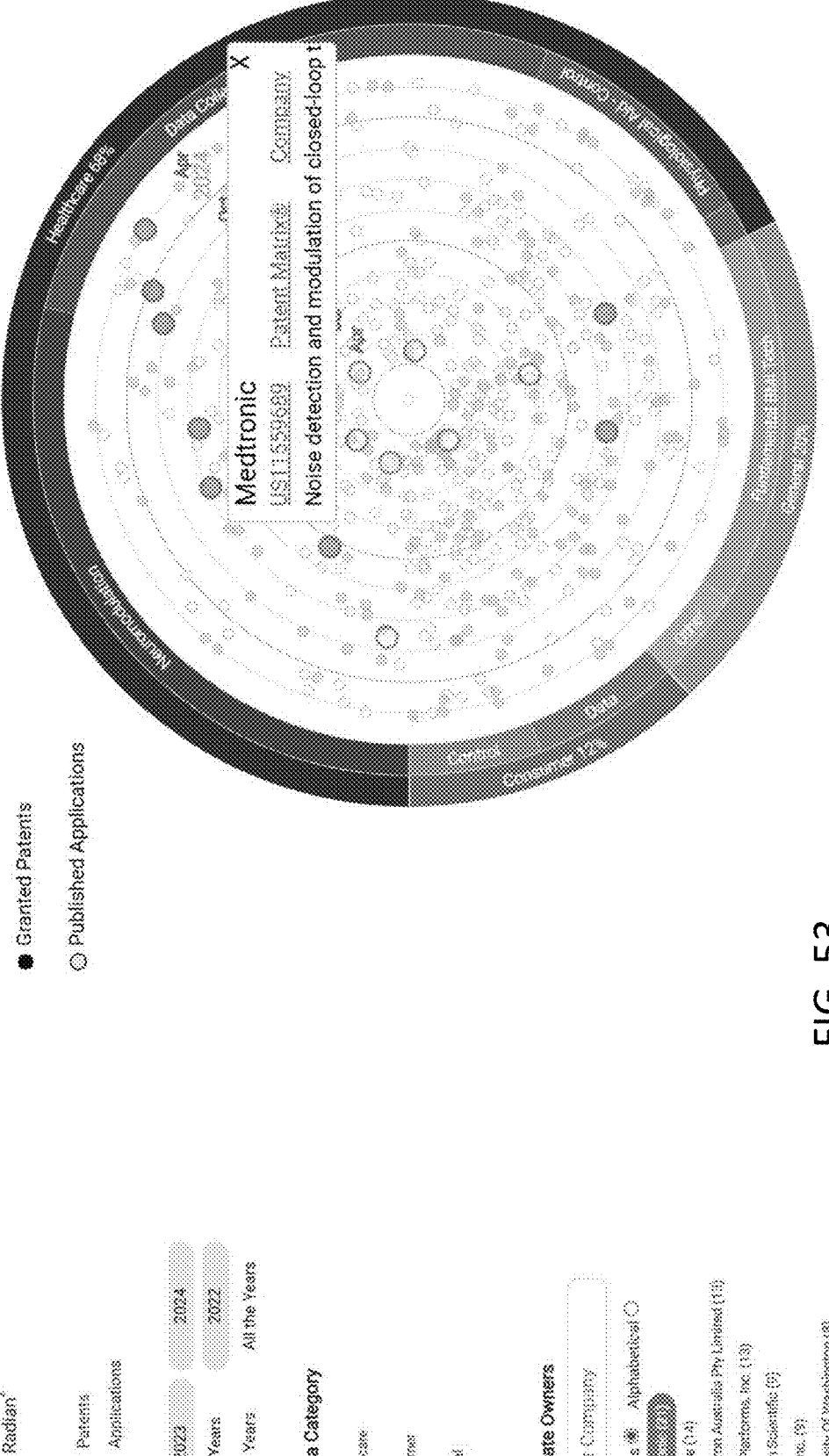
FIG. 53 is an image of a graphic user interface (GUI) with documents from a single patent owner selected according to one embodiment of the present invention.

FIG. 53 is an image of a graphic user interface (GUI) with documents from a single patent owner selected according to one embodiment of the present invention. In one embodiment, the display provides for a roll-over pop-up of information, such as document number, patent owner, title, abstract and the like. FIG. 53 shows a pop-up of the document number and the patent owner. The display pop-up information is multi-platform aware, working on desktop, laptop, tablet, smartphone, and kiosk user interface technologies. The display pop-up enables the user to navigate to additional displays that provide more detailed information about the document, its components, and/or connected information such as the company profile. FIG. 54 is an image of a company profile interface according to the present invention.

Figure 55:
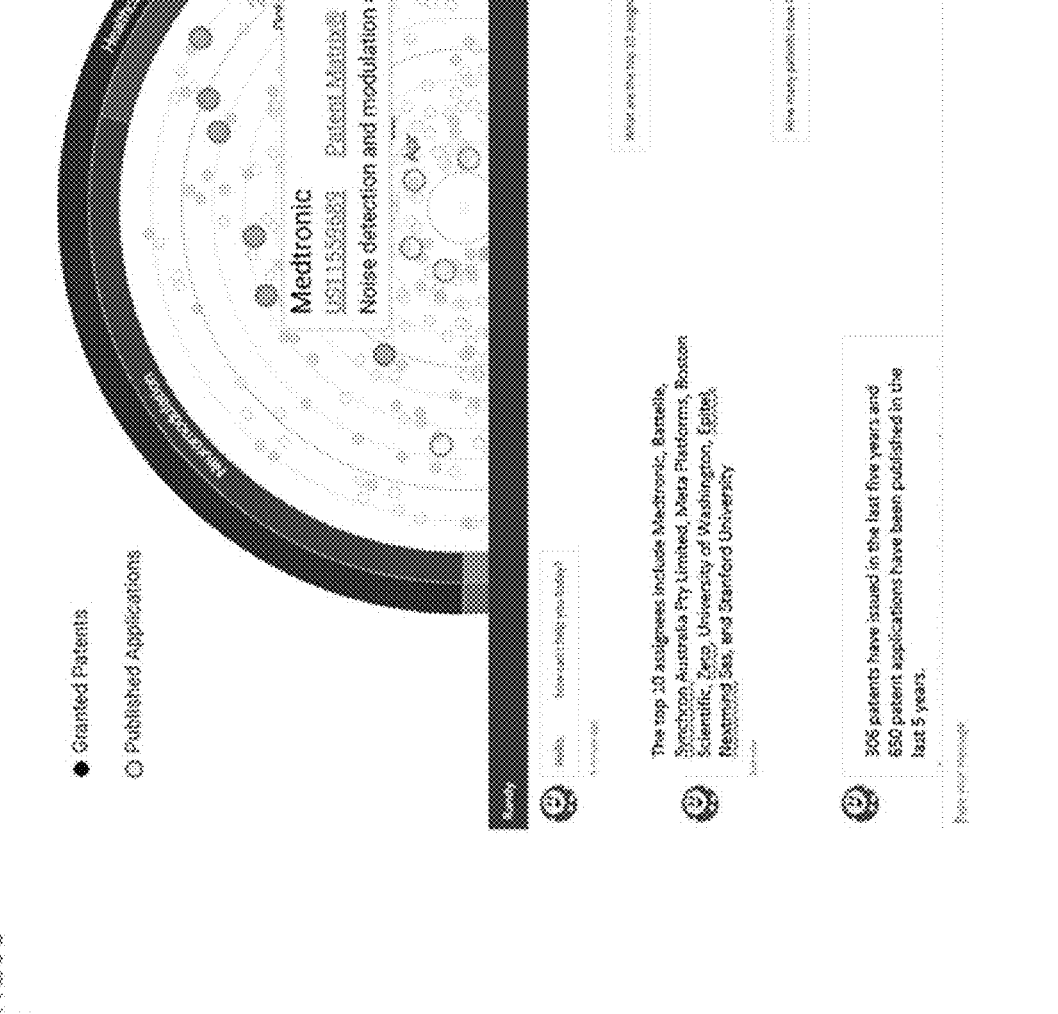
FIG. 55 is an image of a graphical user interface (GUI) displaying an AI chatbot according to one embodiment of the present invention.

The present invention further provides for an AI chatbot. FIG. 55 is an image of a graphical user interface (GUI) displaying an AI chatbot according to one embodiment of the present invention. In one embodiment, the AI chatbot is integrated into a server platform and is operable to use a plurality of learning techniques to train and/or fine-tune the AI chatbot's knowledge including, but not limited to, knowledge of patent documents and patent related information obtained from various public databases on the internet.

In one embodiment, the AI chatbot includes a large language model (LLM). In one embodiment, the AI chatbot is operable to receive queries and process queries via natural language processing (NLP) and non-natural language processing to determine user goals and/or query objective, including determining a response to the query. In one embodiment, the queries are text, image, video, voice, and/or sound queries.

In one embodiment, the AI chatbot utilizes conversational AI to engage in conversations with a user. In one embodiment, the conversation is a text conversation between the AI chatbot and a user. In one embodiment, the conversation is an audio and speech conversation between the AI chatbot and the user.

In one embodiment, the AI chatbot is operable to generate a response to a query. In one embodiment, the response includes text, image(s), video(s), and/or sound. In one embodiment, the response includes patent data, wherein the patent data includes an issued patent number, a publication number, an application number, inventor(s), applicant(s), a filing data, a priority date, a publication date, the abstract, the claims, and/or the description/specification. In one embodiment, the AI chatbot automatically generates the response based on a plurality of public databases and information, including but not limited to patent data from the United States Patent and Trademark Office (USPTO), the European Patent Office (EPO), and/or any other patent data source.

In one embodiment, after determining the user goals, the AI chatbot is operable to analyze data within any embodiment described herein to accomplish the user goal and/or generate a response to a query. In one embodiment, the AI chatbot is operable to summarize relevant data and output a result as a natural language output, displayed on a GUI of a user device.

In one embodiment, the AI chatbot is operable to analyze the data within a specific technological sector. In one embodiment, the AI chatbot is operable to only analyze the data within a specific technological sector, without considering other publicly available data outside of the technological sector. In one embodiment, the AI chatbot is operable to analyze any publicly available data and/or information, including but not limited to patent data. In one embodiment, the AI chatbot is operable to analyze publicly available market data.

In one embodiment, the AI chatbot is operable to analyze the data within a specific technological sector, further within a specific time period based on the dynamic timeline. In one embodiment, the AI chatbot is operable to analyze the specific time period, including the current year, each of the previous two years, each of the previous five years, each of the previous ten years, and/or all years.

In one embodiment, the AI chatbot is operable to analyze the data within a specific technological sector, further within a specific category and/or subcategory of the technological sector.

In one embodiment, the AI chatbot is operable to summarize any information within a patent document, including issued patents, published patent applications, office action documents, including a non-final rejection document and/or a final rejection document, information disclosure statement (IDS) documents, applicant data sheet (ADS) documents, assignment documents, patent term adjustment document, and/or any other information about a patent document, including but not limited to, any public document from the USPTO.

In one embodiment, the AI chatbot is operable to summarize any information within a technological sector. For example, in one embodiment, information within and/or about a technological sector includes, but is not limited to, what patent owners are in a technological sector, top patent owners within a technological sector, how many patents were filed over a specified period of time, revenues of owners within a technological sector, acquisitions of companies within a technological sector, categorical information, including a breakdown of the patent documents within a technological sector into respective categories and/or subcategories, patent data information, including but not limited to, assignment information, patent term adjustment information, how many office actions an issued patent or publication received, types of rejections in an office action, information disclosure statement data, and/or any other information relating to patent documents.

In one embodiment, the AI chatbot is operable to perform at least one function, including but not limited to, summarizing and/or generating points of novelty for particular patents within a technological sector, generating a new patent visualization diagram, adjusting the patent diagram visualization view, dynamically adjusting the diagram, dynamically adjusting the timeline of the diagram, summarizing trends in patent data over a period of time, performing keyword searches, and/or identifying information within a patent such as whether a company claims a particular feature in any of a patent owned by a company within a technological sector. Importantly, the AI chatbot is operable to analyze and respond to queries about content within a patent document and/or content not within a patent document that is publicly available on the internet.

In one embodiment, the AI chatbot is operable to select a patent document on the diagram based on a user query and/or request. In one embodiment, the AI chatbot is operable to select and open a company profile page on the diagram.

In one embodiment, the AI chatbot is operable to compare at least one technological sector against at least one different technological sector.

In one embodiment, the AI chatbot is operable to compare the patent documents within a technological sector that are owned by one owner against patent documents within the same technological sector that are owned by a different owner.

In one embodiment, the AI chatbot is operable to analyze the data within a technological sector and produce descriptions of trends observed within the technological sector. In one embodiment the trends include, but are not limited to, trends over time, trends by and/or in a category, trends by and/or in a subcategory, trends by owners of the patent documents within the technological sector, and/or any other trend identified by the AI chatbot.

Certain modifications and improvements will occur to those skilled in the art upon a reading of the foregoing description. By way of example, the diagrams are preferably operable to provide for user annotation. Also, it is preferred that the diagrams are representable in a multiplicity of formats, depending upon user preference, such as .html. Also, electronic representations of the diagrams are electronically linked to the underlying documents from which the patent numbers were identified, for providing quick analysis or comparison between them. All modifications and improvements have been deleted herein for the sake of conciseness and readability but are properly within the scope of the following claims.

What is claimed is:

1. A system for interactive patent visualization, comprising:

at least one computer processor including at least one memory having instructions stored therein; and at least one platform operating on the at least one computer processor configured for network communication with at least one user device; and wherein the at least one platform includes an intelligence engine module;

wherein the at least one platform includes an artificial intelligence (AI) chatbot;

wherein the at least one platform is operable to provide a graphical user interface (GUI) to the at least one user device;

wherein the at least one platform is operable to automatically generate a diagram based on patent data from at least one database using the intelligence engine;

wherein the diagram is a circular interactive visualization comprising a multiplicity of graphical elements distributed based on a dynamic radial timeline, wherein each graphical element represents a patent document, wherein the multiplicity of graphical elements are distributed from a central origin of the dynamic radial timeline based on a publication date or an issue date of the patent documents represented by the multiplicity of graphical elements;

wherein the dynamic radial timeline is modifiable;

wherein a timeline indicator is shown within the diagram, wherein the central origin of the dynamic radial timeline represents an oldest date in time and a perimeter of the dynamic radial timeline represents a most recent date in time;

wherein the at least one user device is operable to display the diagram and the AI chatbot via the GUI;

wherein the GUI is operable to expand and contract the scaling of the diagram based on a selected time scale;

wherein the at least one platform is operable to assign each of a multiplicity of documents with one of a multiplicity of primary category labels automatically using the intelligence engine or based on a user selection;

wherein the intelligence engine module is operable to automatically generate at least one suggested category label for at least one additional document based on the multiplicity of primary category labels assigned to the multiplicity of documents;

wherein the distribution throughout the circular interactive visualization is grouped based on at least one of the multiplicity of primary category labels and further distributed by at least one sub-category label, wherein the selection of the at least one category label dynamically changes the diagram to an interactive semi-circular interactive visualization;

wherein the at least one platform is operable to automatically apply at least one color and/or at least one shading to each of the multiplicity of graphical elements representing a multiplicity of documents assigned to at least one patent owner upon receiving a selection of the at least one patent owner; and wherein at least one color and/or at least one shading of each of a multiplicity of graphical elements representing a multiplicity of documents not assigned to the at least one patent owner is different than the at least one color and/or the at least one shading of each of the multiplicity of graphical elements representing the multiplicity of documents assigned to at least one patent owner;

wherein the AI chatbot is operable to analyze data;

wherein the AI chatbot is operable to receive at least one query; and wherein the AI chatbot is operable to answer the at least one query based on the analyzed data.

2. The system of claim 1, wherein the selected time scale includes the current year, each of the previous two years, each of the previous five years, each of the previous ten years, and/or all years.

3. The system of claim 1, wherein the selected time scale includes at least one year within the range of all years.

4. The system of claim 1, wherein the size of the graphical elements representing a multiplicity of documents represents the specification length or other quality indicators of the patent document.

5. The system of claim 1, wherein the diagram is operable to be selected by company, category, sub-category, or other parameters within the circular interactive visualization view.

6. The system of claim 1, wherein a patent quality metric score is generated on a patent matrix diagram to score patent documents based on a multiplicity of factors, including, but not limited to, the length of the description, the scope of the claims, and the number of drawings, as compared to other patent documents in the same area.

7. The system of claim 1, wherein the at least one platform is operable to automatically generate company profiles based on third-party data, including, but not limited to, financial information, current operating status, employee count, and number of exits, wherein the platform is operable to automatically update the third-party data at set time intervals.

8. The system of claim 1, wherein the at least one platform is operable to automatically assign the multiplicity of documents with one of a multiplicity of secondary category labels, and wherein the at least one platform is operable to group the multiplicity of documents grouped by each primary category label by the multiplicity of secondary category labels.

9. The system of claim 1, wherein the at least one platform is operable to automatically apply the at least one color and/or the at least one shading to each of the multiplicity of graphical elements representing the multiplicity of documents not assigned to the at least one patent owner.

10. A method for interactive patent visualization, comprising:

providing at least one platform configured for network communication with at least one user device, wherein the at least one platform includes an intelligence engine module and at least one artificial intelligence (AI) chatbot, wherein the at least one platform provides a graphical user interface (GUI) to the at least one user device;

the at least one platform automatically generating at least one diagram based on patent data from at least one database using the intelligence engine, wherein at least one diagram is a circular interactive visualization comprising a multiplicity of graphical elements distributed based on a dynamic radial timeline, wherein each graphical element represents a patent document, wherein the multiplicity of graphical elements are distributed from a central origin of the dynamic radial timeline based on a publication date or an issue date of the patent documents represented by the multiplicity of graphical elements, wherein the dynamic radial timeline is modifiable;

the at least one diagram including a timeline indicator shown within the at least one diagram, wherein the central origin of the dynamic radial timeline represents an oldest date in time and a perimeter of the dynamic radial timeline represents a most recent date in time;

the at least one platform causing the at least one user device to display the at least one diagram and the at least one AI chatbot via the GUI;

the GUI expanding or contracting the scaling of the at least one diagram based on a selected time scale;

the at least one platform assigning each of a multiplicity of documents with one of a multiplicity of primary category labels automatically using the intelligence engine or based on a user selection;

the intelligence engine module automatically generating at least one suggested category label for at least one additional document based on the multiplicity of primary category labels assigned to the multiplicity of documents;

the at least one platform distributing the multiplicity of documents throughout the circular interactive visualization based on at least one grouping of the multiplicity of primary category labels and further distributing the multiplicity of documents based on at least one grouping of at least one sub-category label, wherein the selection of the at least one category label dynamically changes the diagram to an interactive semi-circular interactive visualization;

the at least one platform automatically applying at least one color and/or at least one shading to each of the multiplicity of graphical elements representing a multiplicity of documents assigned to at least one patent owner upon receiving a selection of at least one patent owner;

the at least one AI chatbot analyzing data;

the at least one AI chatbot receiving at least one query; and the at least one AI chatbot answering the at least one query based on the analyzed data.

11. The method of claim 10, further comprising the at least one platform automatically generating company profiles based on third-party data, including, but not limited to, financial information, current operating status, employee count, and number of exits, wherein the platform automatically updates the third-party data at set time intervals.

12. The method of claim 10, further comprising the at least one platform generating a patent quality metric score on a patent matrix diagram to score patent documents based on a multiplicity of factors, including, but not limited to, the length of the description, the scope of the claims, and the number of drawings, as compared to other patent documents in the same area.

13. The method of claim 10, wherein the at least one diagram is operable to be selected by company, category, sub-category, or other parameters within the circular interactive visualization view.

14. The method of claim 10, wherein the size of the graphical elements representing a multiplicity of documents represents the specification length or other quality indicators of the patent document.

15. The method of claim 10, wherein the selected time includes the current year, each of the previous two years, each of the previous five years, each of the previous ten years, and/or all years, wherein the selected time scale includes at least one year within the range of all years.

16. A system for interactive patent visualization, comprising:

at least one computer processor including at least one memory having instructions stored therein; and at least one platform operating on the at least one computer processor configured for network communication with at least one user device;

wherein the at least one platform includes an intelligence engine module and an artificial intelligence (AI) chatbot;

wherein the at least one platform is operable to provide a graphical user interface (GUI) to the at least one user device;

wherein the at least one platform is operable to automatically generate a diagram based on patent data from at least one database using the intelligence engine;

wherein the diagram is a circular interactive visualization comprising a multiplicity of graphical elements distributed based on a dynamic radial timeline, wherein each graphical element represents a patent document, wherein the multiplicity of graphical elements are distributed from a central origin of the dynamic radial timeline based on a publication date or an issue date of the patent documents represented by the multiplicity of graphical elements;

wherein the dynamic radial timeline is modifiable;

wherein a timeline indicator is shown within the diagram, wherein the central origin of the dynamic radial timeline represents an oldest date in time and a perimeter of the dynamic radial timeline represents a most recent date in time;

wherein the at least one platform is operable to assign each of a multiplicity of documents with one of a multiplicity of primary category labels automatically using the intelligence engine or based on a user selection;

wherein the intelligence engine module is operable to automatically generate at least one suggested category label for at least one additional document based on the multiplicity of primary category labels assigned to the multiplicity of documents;

wherein the distribution throughout the circular interactive visualization is grouped based on at least one of the multiplicity of primary category labels and further distributed by at least one sub-category label, wherein the selection of the at least one primary category label dynamically changes the diagram to an interactive semi-circular interactive visualization;

wherein the at least one platform is operable to receive a selection of at least one patent owner;

wherein the at least one platform is operable to automatically apply at least one color and/or at least one shading to each of the multiplicity of graphical elements representing a multiplicity of documents assigned to the at least one patent owner upon receiving the selection of the at least one patent owner;

wherein the at least one platform is operable to automatically reduce the opacity of each of the multiplicity of graphical elements representing a multiplicity of docu-ments not assigned to the at least one patent owner upon receiving the selection of the at least one patent owner;

wherein the AI chatbot is operable to analyze patent data;

wherein the AI chatbot is operable to receive at least one query; and wherein the AI chatbot is operable to answer the at least one query based on the analyzed patent data.

17. The system of claim 16, wherein the selected time scale includes the current year, each of the previous two years, each of the previous five years, each of the previous ten years, and/or all years, wherein the selected time scale further includes at least one year within the range of all years.

18. The system of claim 16, wherein the size of the graphical elements representing a multiplicity of documents represents the specification length or other quality indicators of the patent document.

19. The system of claim 16, the diagram is operable to be selected by company, category, sub-category, or other parameters within the circular interactive visualization view.

20. The system of claim 16, wherein the at least one platform is operable to automatically generate company profiles based on third-party data, including, but not limited to, financial information, current operating status, employee count, and number of exits, wherein the platform is operable to automatically update the third-party data at set time intervals.

* * * * *